US006696806B2

(12) United States Patent

Study et al.

(10) Patent No.: US 6,696,806 B2
(45) Date of Patent: Feb. 24, 2004

(54) METHOD AND APPARATUS FOR FACILITATING CONTROL OF A MOVABLE BARRIER OPERATOR

(75) Inventors: Robert S. Study, Arlington Heights, IL (US); Terence E. Crimmins, Westford, MA (US)

(73) Assignee: The Chamberlain Group, Inc., Elmhurst, IL (US)

( * ) Notice: Subject to any disclaimer, the term of this patent is extended or adjusted under 35 U.S.C. 154(b) by 0 days.

(21) Appl. No.: 10/132,617

(22) Filed: Apr. 25, 2002

(65) Prior Publication Data

US 2003/0038604 A1 Feb. 27, 2003

Related U.S. Application Data

(60) Provisional application No. 60/286,473, filed on Apr. 25, 2001.

(51) Int. Cl.$^{7}$ .................................................. H02P 1/00

(52) U.S. Cl. ....................... 318/280; 318/282; 318/286; 318/466; 318/468; 318/461; 318/257

(58) Field of Search ................................ 318/257, 280, 318/282, 286, 461, 466, 468; 49/197, 199

(56) References Cited

U.S. PATENT DOCUMENTS

| | | | | | |
|---|---|---|---|---|---|
| 4,980,618 | A | * | 12/1990 | Milnes et al. | 318/265 |
| 5,218,282 | A | * | 6/1993 | Duhame | 318/603 |
| 5,278,480 | A | * | 1/1994 | Murray | 318/626 |
| 5,587,565 | A | * | 12/1996 | Schroder-Brumloop et al. | 187/316 |
| 5,929,580 | A | * | 7/1999 | Mullet et al. | 318/466 |
| 6,184,641 | B1 | * | 2/2001 | Crimmins et al. | 318/466 |
| 6,326,751 | B1 | * | 12/2001 | Mullet et al. | 318/434 |
| 6,528,961 | B1 | * | 3/2003 | Fitzgibbon et al. | 318/283 |

* cited by examiner

*Primary Examiner*—Rina I. Duda
(74) *Attorney, Agent, or Firm*—Fitch, Even, Tabin & Flannery

(57) ABSTRACT

A movable barrier operator (11) receives movement sensing signals from a sensor (13) and calculates corresponding speed of movement of a movable barrier. Such speed measurements lead to development of a median speed value over a monitoring window. The median speed value is used in a subsequent monitoring window to facilitate determining when speed of movement for the movable barrier has slowed in a way that likely corresponds to the movable barrier having encountered an obstacle.

34 Claims, 4 Drawing Sheets

METHOD AND APPARATUS FOR FACILITATING CONTROL OF A MOVABLE BARRIER OPERATOR

This application claims the benefit of Provisional Application No. 60/286,473 filed Apr. 25, 2001.

TECHNICAL FIELD

This invention relates generally to movable barrier operators and more particularly to obstacle detection.

BACKGROUND

Movable barrier operators are known in the art. Such operators, including garage door operators, are often provided with a mechanism to detect when an obstacle lies in the path of the movable barrier. Upon sensing such an obstacle, movement of the movable barrier can be altered to avoid damage or injury to the obstacle and/or the movable barrier.

In some systems, a force limit (or force sensitivity) can be manually set. When this value is exceeded during movement of the movable barrier, as will typically occur when the movable barrier contacts an obstacle, an appropriate response can be effected. For example, the direction of travel of the movable barrier can be reversed to move the movable barrier away from the obstacle. In other systems, the speed of door travel is monitored. If the speed slows or stops, the operator determines that the movable barrier has contacted an obstacle and again the movable barrier can be stopped or its movement reversed.

One problem with such systems derives from the fact that the amount of force required to move a movable barrier over its entire travel limit may vary from place to place. Variations can also exist in a given place between closing and opening the movable barrier. In addition, mechanical noise due to sticking of the movable barrier can also contribute detectable artifacts that can simulate rapid force changes that can in turn cause an unwanted operator response.

Some prior art systems seek to remedy such problems by adjusting force sensitivity to make the operator less sensitive to such conditions. Unfortunately, reducing sensitivity in this way will also often make the operator less sensitive to detecting a genuine obstacle impact.

Other systems use so-called force profiling. Historical force information is stored in a force table and possibly updated from time to time to account for changes over time. Unfortunately, these systems, too, are sometimes subject to false triggering due at least in part to measurement anomalies during the operation of the movable barrier.

BRIEF DESCRIPTION OF THE DRAWINGS

The above needs are at least partially met through provision of the method and apparatus for facilitating control of a movable barrier operator described in the following detailed description, particularly when studied in conjunction with the drawings, wherein.

Figure 1:
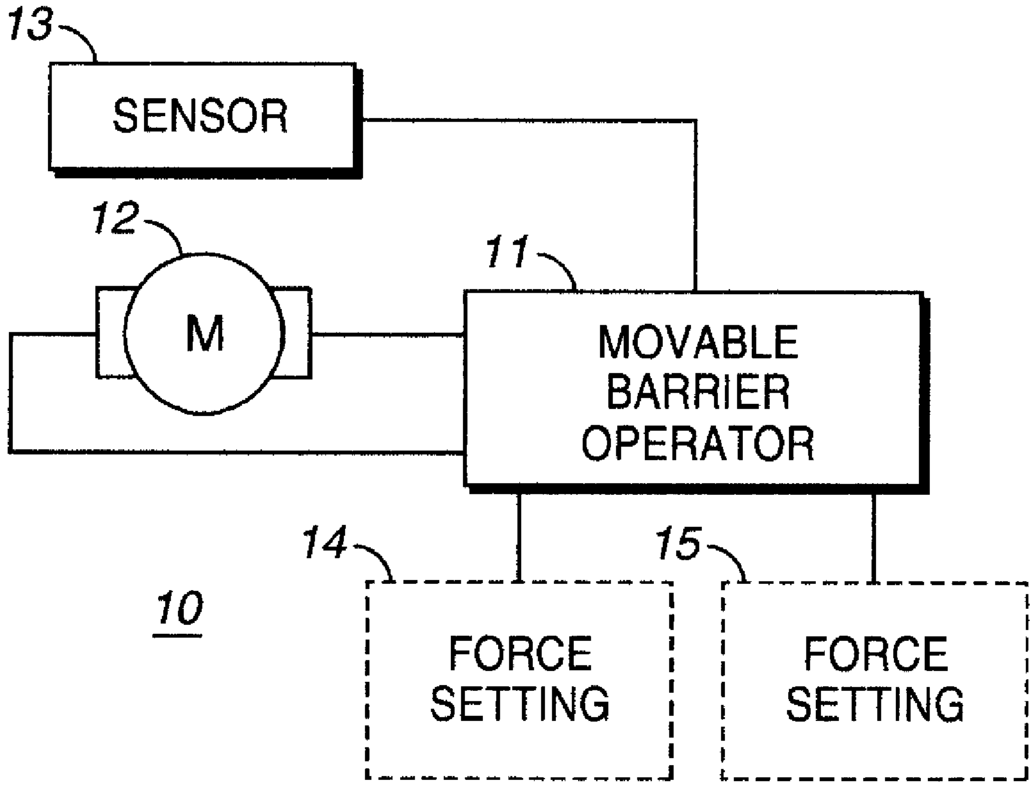
FIG. 1 comprises a block diagram as configured in accordance with an embodiment of the invention.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of various embodiments of the present invention. Also, common but well-understood elements that are useful or necessary in a commercially feasible embodiment are typically not depicted in order to facilitate a less obstructed view of these various embodiments of the present invention.

DETAILED DESCRIPTION

Generally speaking, during movement of a movable barrier from a first position to a second position by a movable barrier operator, the operator repeatedly senses a parameter representing the forces applied to the movable barrier during a first interval of time and determines at least one value that represents the sensed forces on the movable barrier over the interval of time. During a subsequent interval of time, which subsequent interval is later than the first interval of time but still during the same movement of the movable barrier from the first position to the second position, this sensed value is used to determine a threshold value. In one embodiment, the representative value is divided by a predetermined scaling value and is then multiplied by an adjustment value to derive the threshold value. In one embodiment, the adjustment value comprises at least one of a force adjustment setting and a noise level adjustment value. If desired, the force adjustment value can be multiplied by the noise level adjustment value to provide the adjustment value. The forces applied to the barrier may be sensed somewhat directly by use of a force sensing device such as a piezoelectric strain measuring unit or such forces can be represented by the current applied to the motor or the speed at which the motor or the barrier are moved. Other such devices for representing applied forces are known in the art. In the subsequently described embodiments the barrier speed as represented by motor speed is used to represent forces applied to the barrier.

Pursuant to these various embodiments, during movement of a movable barrier from a first position to a second position by a movable barrier operator, the operator repeatedly senses present speed of the movable barrier during a first interval of time and determines at least one representative value as corresponds to the speed of the movable barrier over that interval of time. (In a preferred embodiment, this interval of time is without fixed duration. Instead, the interval is bounded by the amount of time required to accommodate a fixed number of sequential position measurements.) In one embodiment, the at least one representative value comprises a median value of speed over this interval of time. During a subsequent interval of time, which subsequent interval is later than the first interval of time but still during the same movement of the movable barrier from the first position to the second position, this representative value is used to determine a threshold value. In one embodiment, the representative value is divided by a predetermined scaling value and is then multiplied by an adjustment value to derive the threshold value. In one embodiment, the adjustment value comprises at least one of a force adjustment setting and a noise level adjustment value. If desired, the force adjustment value can be multiplied by the noise level adjustment value to provide the adjustment value.

During that subsequent interval of time, a first value that corresponds to the present speed of the movable barrier is compared with the threshold value. In one embodiment, the first value comprises the absolute value of the present speed less the representative value determined above. This first value is then compared against the threshold value. When the first value is within a predetermined range of values with respect to the threshold value, the operator then takes at least one predetermined action with respect to subsequent movement of the movable barrier (for example, movement of the movable barrier can be stopped or reversed). In one embodiment, the predetermined range of values includes values that are larger than the threshold value, such that the predetermined action will be taken when the first value exceeds the threshold value.

In one embodiment, to aid in preventing false triggering of the predetermined response, a plurality of such comparative results can be required before initiating the predetermined action.

Referring now to FIG. 1, a movable barrier system 10 includes, in this embodiment, a movable barrier operator 11 that comprises a programmable platform. The movable barrier operator 11 couples to a motor 12 which in turn is coupled to a movable barrier (not shown) via an appropriate drive mechanism (not shown) as well understood in the art. A sensor 13 provides speed information regarding the motor 12 to the movable barrier operator 11. Such a sensor 13 may be, for example, an optical interrupter that provides a signal to the movable barrier operator 11 each time an output shaft of the motor 12 rotates a predetermined amount. If desired, one or more force setting controls 14 and 15 can also be provided (for example, to allow manual adjustment of a force setting when closing, opening, or both). All of the above components, both individually and as combined, are well understood in the art. Therefore, for the sake of brevity and the preservation of focus, additional description will not be provided here.

Figure 2:
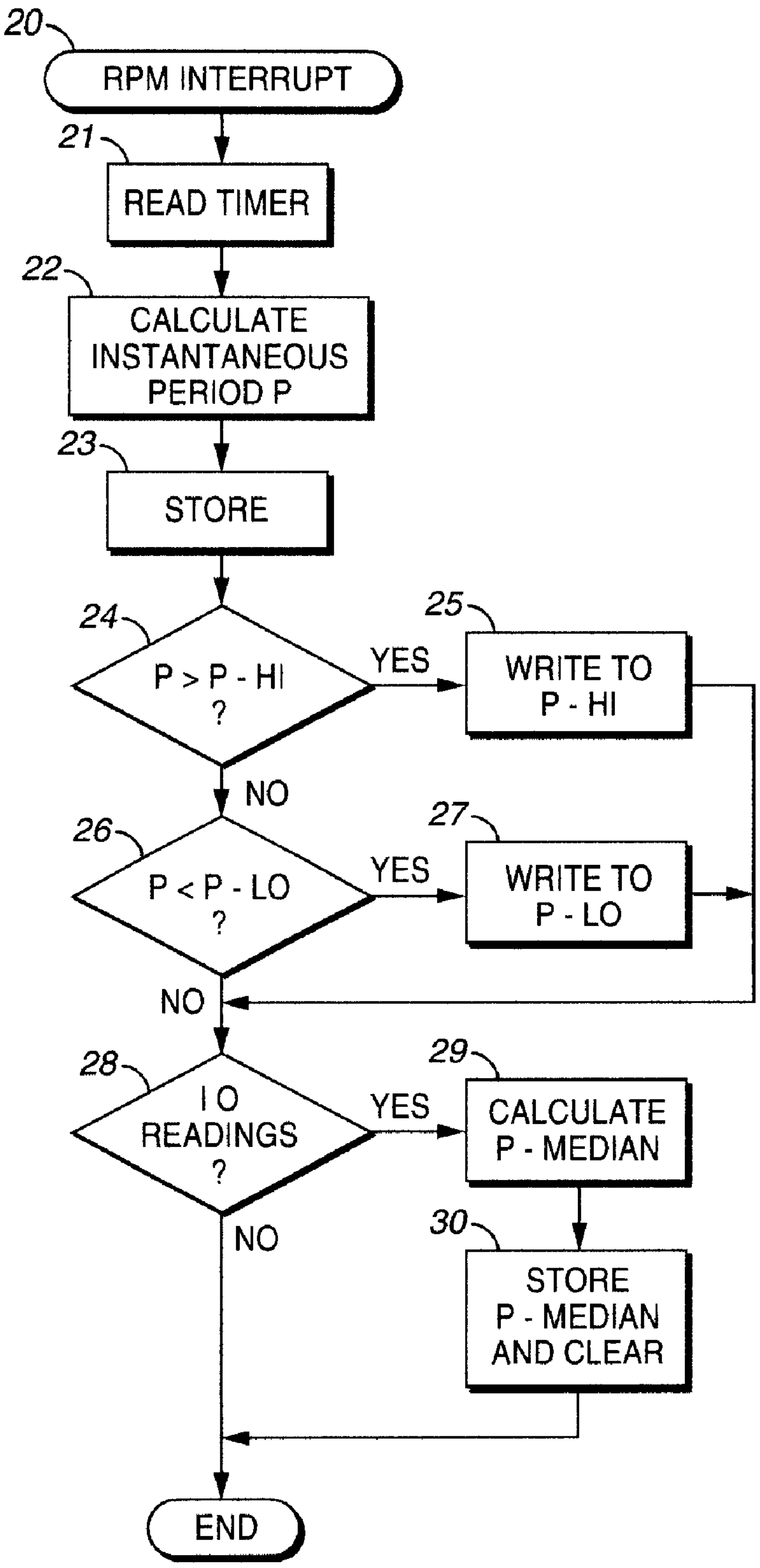
FIG. 2 comprises a flow diagram as configured in accordance with an embodiment of the invention.

So configured, the movable barrier operator 11 can cause selective movement of a movable barrier by control of the motor 12. This includes moving the movable barrier from an open position to a closed position and the reverse thereof. Also, as already indicated, the movable barrier operator 11 can monitor the speed of the motor 12 and hence the corresponding speed of the movable barrier. Also as already indicated, force settings can be manually modified by a user (in this embodiment, such controls, when present, are presumed to offer a range of adjustment from one to sixteen, with sixteen representing maximum sensitivity to force and one representing the least sensitivity to force). The movable barrier operator 11 comprises a programmable platform that is programmed in an ordinary fashion to function as a movable barrier operator. In addition, and referring now to FIG. 2, the movable barrier operator 11 is programmed to respond in an interrupt fashion 20 upon receipt of a signal from the sensor 13. As a result, the operator 11 will receive such an interrupt each time the movable barrier moves a predetermined distance. Upon receiving such an indication the operator 11 then reads 21 an internal timer and calculates 22 an instantaneous period P (or RPM value) for the motor 12, which value of course corresponds to movement of the movable barrier (such a value is easily calculated by determining how much time is required to incrementally move a predetermined distance as corresponds to the sensor 13 mechanism as is well understood in the art). This value P is then stored 23. The operator 11 then determines 24 whether this present speed value P exceeds a previously stored value P-HI (if any) that constitutes a highest previous speed value during the present interval or window of review. If true, the operator 11 writes 25 the present speed value P into memory as the new highest speed value for the present interval. The operator 11 also determines 26 when a present speed value P is less than a lowest previous speed value P-LO as identified and stored for the present interval. Again when true, the operator 11 writes 27 the present speed value P into memory as the new lowest speed value for the present interval. Once the operator 11 determines 28 that a predetermined number of readings have been taken in this fashion, the operator 11 calculates 29 a median value P-MEDIAN for the interval. In a preferred embodiment, the median value is calculated by adding the highest speed value P-HI with the lowest speed value P-LO and then dividing by two. P-MEDIAN as calculated is then stored 30 and P-HI and P-LO are cleared to allow re-identification during a subsequent interval.

So configured, the operator 11 can calculate a value that is representative of speed of the movable barrier over various intervals of time. In particular, a value representing a median value for speed over each interval can be so calculated.

Figure 3:
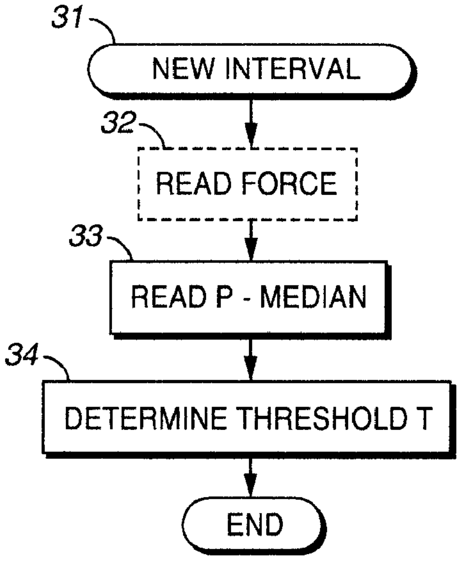
FIG. 3 comprises a flow diagram as configured in accordance with an embodiment of the invention.

Referring now to FIG. 3, when the operator 11 begins 31 a new interval, optional force settings as correspond to force setting controls 14 and 15 can be read 32. The median speed value P-MEDIAN as determined in the previous interval is then read 33 and utilized to determine 34 a threshold value T. In one embodiment, this threshold value T can be calculated as follows:

$$T=(P\text{-}MEDIAN/256)(FS+NA) \quad (1)$$

where FS=a force setting of from 1 to 16 as manually set via a corresponding force setting control 14 or 15 as understood in the art and NA=a noise adjustment value that can be used to desensitize the calculation of the threshold value T somewhat from noise in the system. In a preferred embodiment, this threshold value T is calculated once and used during an entire interval as described below in more detail. Again, it should be noted that the interval during which data is gathered to allow calculation of the threshold value T and the interval during which the threshold value T is used both occur during the same movement of the movable barrier from a first position to a second position (such as when moving from an open to a closed position or from a closed to an open position).

Figure 4:
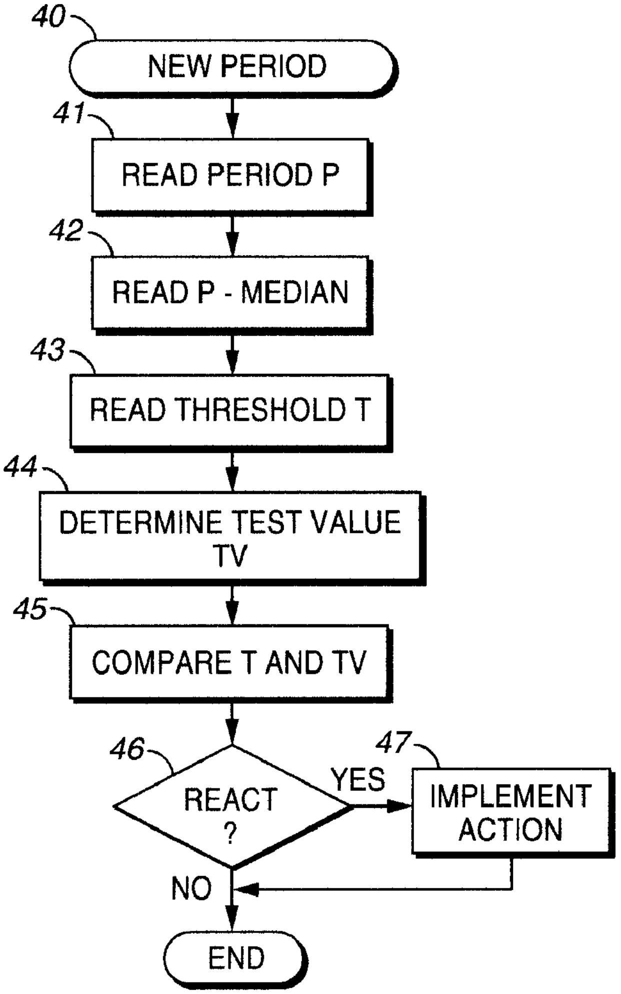
FIG. 4 comprises a flow diagram as configured in accordance with an embodiment of the invention.

During each interval, as described, the operator 11 calculates a median value P-MEDIAN for the preceding interval as well as a threshold value T that also derives from preceding interval data. Referring now to FIG. 4, with each new period value as sensed 40 by the operator 11 during the next subsequent interval, the operator reads 41 the new period P (as calculated pursuant to the process described above with respect to FIG.2). The operator 11 also reads 42 the P-MEDIAN value as calculated for the previous interval and reads 43 the corresponding threshold value T. In this embodiment the operator 11 then determines 44 a test value TV by taking the absolute value of the present speed value P less the P-MEDIAN median speed value for the preceding interval. This test value TV is then compared with the threshold value T. In this embodiment, the operator 11 determines whether the test value TV is greater than the threshold value T.

The operator 11 determines 46 whether to react to the present speed value as a function of the comparison of the test value TV to the threshold value T. In particular, when the test value TV exceeds the threshold value T, the operator implements 47 an appropriate corresponding action.

Figure 5:
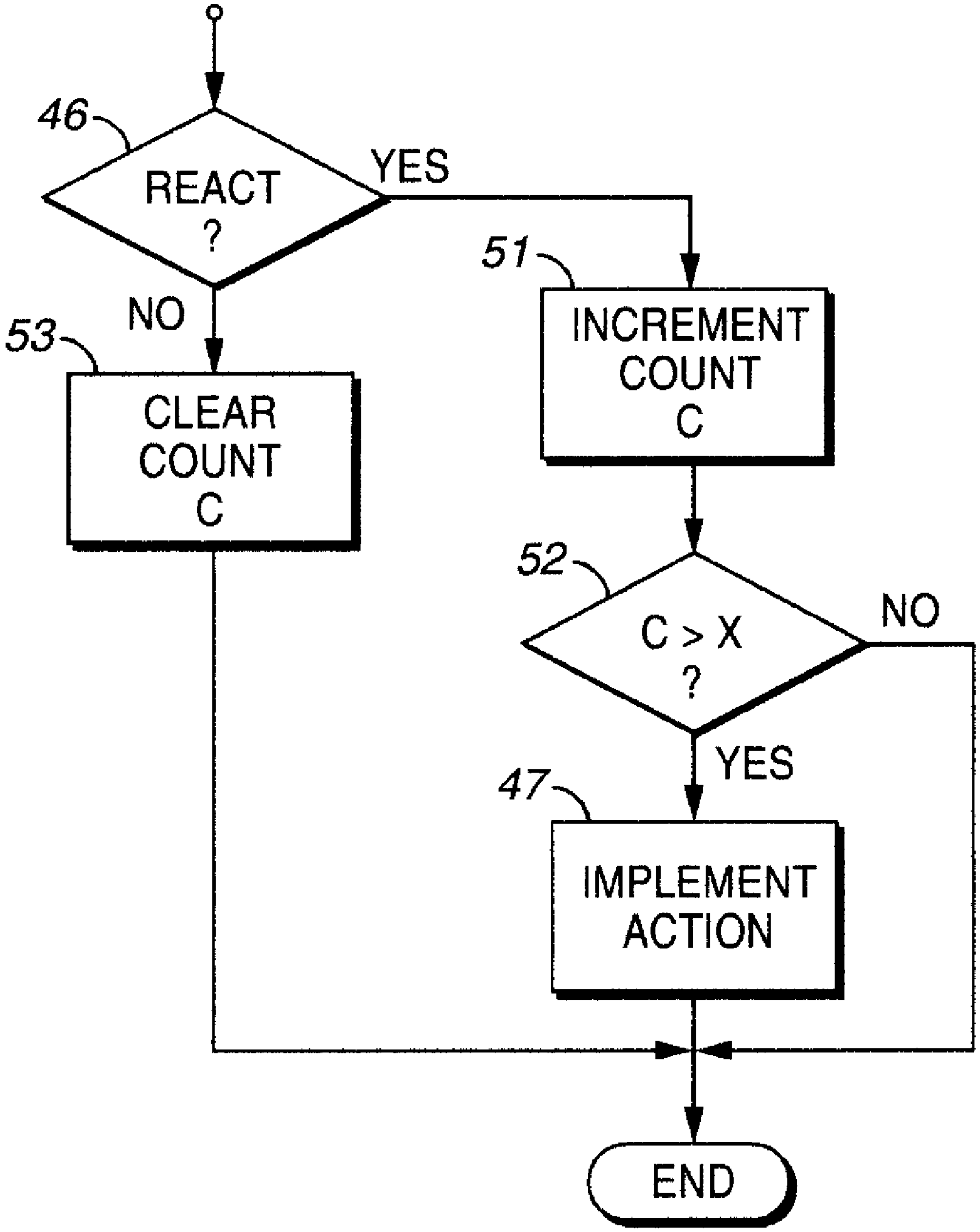
FIG. 5 comprises a flow diagram as configured in accordance with another embodiment of the invention.

If the operator 11 responds immediately when the test value TV first exceeds the threshold value T, however, the operator 11 may stop or reverse movement of the movable barrier in error. With reference to FIG. 5, in this embodiment, upon determining 46 that a given present speed value P is such that the test value TV exceeds the threshold value T, the operator 11 can increment 51 a count C and then determine 52 whether this count C exceeds a predetermined value X (such as, for example, "10"). If not, the operator 11 simply carries on in an ordinary fashion while continuing to monitor present speed of the motor/movable barrier. Once the count C has been met, however, the operator 11 then implements 47 a responsive action as before. It should also be noted that each time the operator 11 determines that a present given speed value does not correspond to a situation where the test value TV exceeds the threshold value T, the count C is cleared 53. So configured, the operator 11 can still safely react to an actual obstacle in sufficient time while significantly avoiding false triggering of an obstacle-detected response.

Those skilled in the art will recognize that a wide variety of modifications, alterations, and combinations can be made with respect to the above described embodiments without departing from the spirit and scope of the invention, and that such modifications, alterations, and combinations are to be viewed as being within the ambit of the inventive concept.

This application includes a computer code listing which is entitled "S:\Shared\CDO\Lgo-Rjo\RJO-Study\Code\Final0301.S" attached hereto on pages A1–A52.

S:\SHARED\CDO\Lgo_Rjo\RJO - Study\Code\Final0301.s
Printed at 09:38 on 10 Apr 2001

```
;-----------------------------------------------------------------------------
; This code has been released - 03/01/01
;
; * ProxTimer is now cable delay timer for the eyes
;
;
;-----------------------------------------------------------------------------
;       Compile Time Variables
;-----------------------------------------------------------------------------
RPMSAMPLEWINDOW .equ    10              ; Window for min-max sample
Noise_adj       .equ    3
Fixed_Rel       .equ    2               ; RELFORCE is fixed
Fixed_Abs       .equ    36              ; ABSFORCE is fixed
cdelay          .equ    4               ; Cable delay on start-up, 8 = 1 sec
AUTO_TIME       .equ    40h             ; (262mS) auto rev timer 122 =.5 se
FDelay1         .equ    85h
FDelay2         .equ    02h

tcv             .equ    9               ; # of hits (9 X 4mS = 36mS)
TC              .equ    0CAh            ; trip counter
;-----------------------------------------------------------------------------
;                 28 pin DIP
;
;        P2.5 -|1        28|- P2.4
;        P2.6 -|2        27|- P2.3
;        P2.7 -|3        26|- P2.2
;        P0.4 -|4        25|- P2.1
;        P0.5 -|5        24|- P2.0
;        P0.6 -|6        23|- P0.3
;        P0.7 -|7        22|- GND
;         Vcc -|8        21|- P0.2
;       XTAL2 -|9        20|- P0.1
;       XTAL1 -|10       19|- P0.0
;        P3.1 -|11       18|- P3.0
;        P3.2 -|12       17|- P3.6
;        P3.3 -|13       16|- P3.7
;        P3.4 -|14       15|- P3.5
;

        GLOBALS ON                      ; Enable symbol file
;-----------------------------------------------------------------------------
;       EQUATE STATEMENTS
;-----------------------------------------------------------------------------
check_sum_value .equ    08Ah
VERSIONNUM      .equ    12h             ; Version:  LGC V1.2
TIMER_0         .equ    10h
TIMER_0_EN      .equ    03h
TIMER_1_EN      .equ    0Ch

MOTOR_HI        .equ    01Ah
MOTOR_LO        .equ    05Eh
LIGHT           .equ    0FFh
LIGHT_ON        .equ    01h             ; Port 0 Light control pin
Strap           .equ    00100000b       ; Port 0 Straping option input
AuxOutput       .equ    00001000b       ; Port 0 Aux Output fo
                                        ; protector bypass
SecondCMD       .equ    10000000b       ; Port 0 Second commad input
MOTOR_UP        .equ    04h
MOTOR_DN        .eq     02h
DN_LIMIT        .eq     02h
UP_LIMIT        .equ    01h
DIS_SW          .equ    10000000b
CDIS_SW         .equ    01111111b
SWITCHES        .equ    00001000b
POT_INPUT       .equ    00010000b       ; Force pot read input
POTREF          .equ    00010000b       ; Pot reference output
P01M_INIT       .equ    01000100b       ; set P0.0-P0.3 out P0.4-P0.7in

P2M_INIT        .equ    01100011b
P2M_OUTPUTS     .equ    01100111b       ; Constant outputs are zeroed
P2M_INPUTS      .equ    00000011b       ; Const inputs are set to 1
P2M_EEDIR       .equ    00000100b       ; Data in/out pin on port 2
P2M_ABSPOT      .equ    01000000b       ; Ctrl pin for mux of abs pot.
P2M_RELPOT      .equ    00100000b       ; Ctrl pin for mux of rel pot.

P3M_INIT        .equ    00000001b       ; set P3.0-P3.3 in DIGITAL mode

P3_RPM_PIN      .equ    00000010b       ; RPM Input Pin

P01S_INIT       .equ    00000001b
P2S_INIT        .equ    10000011b
P3S_INIT        .equ    00000000b
```

A1

```
P2S_POR         .equ    11000101b       ; Initial setting of P2 during power-on for
P2M_POR         .equ    00000000b       ; chip identification and FMEA protection on limits

FLASH           .equ    0FFh
WORKLIGHT       .equ    LIGHT_ON

S1_TEST         .equ    00
S3_TEST         .equ    01
S2_TEST         .equ    02
CHARGE          .equ    03

WALLOFF         .equ    05              ; Turn off wall control LED for blinks

AUTO_REV        .equ    00h
UP_DIRECTION    .equ    01h
UP_POSITION     .equ    02h
DN_DIRECTION    .equ    04h
DN_POSITION     .equ    05h
STOP            .equ    06h
S1              .equ    01h
S3              .equ    02h
S2              .equ    04h

TRUE            .equ    0FFh
FALSE           .equ    00h

FIXED_MODE      .equ    10101010b       ; Fixed mode radio
ROLL_MODE       .equ    01010101b       ; Rolling mode radio
FIXED_TEST      .equ    00000000b       ; Unsure of mode -- test fixed
ROLL_TEST       .equ    00000001b       ; Unsure of mode -- test roll
FIXED_MASK      .equ    FIXED_TEST      ; Bit mask for fixed mode
ROLL_MASK       .equ    ROLL_TEST       ; Bit mask for rolling mode

FIXTHR          .equ    03h             ; Fixed code decision threshold
DTHR            .equ    02h             ; Roll code decision threshold
FIXSYNC         .equ    08h             ; Fixed code sync threshold
DSYNC           .equ    04h             ; Rolling code sync threshold
FIXBITS         .equ    11              ; Fixed code number of bits
DBITS           .equ    21              ; Rolling code number of bits

EQUAL           .equ    00              ; Counter compare
BACKWIN         .equ    7Fh             ; result constants
FWDWIN          .equ    80h             ;
OUTOFWIN        .equ    0FFh            ;

AddressCounter  .equ    27h
AddressAPointer .equ    2Bh

CYCCOUNT        .equ    28h

TOUCHID         .equ    21h             ; Touch code ID
TOUCHROLL       .equ    22h             ; Touch code roll value
TOUCHPERM       .equ    20h             ; Touch code permanent password
TOUCHTEMP       .equ    24h             ; Touch code temporary password
DURAT           .equ    25h             ; Touch code temp. duration

IRLIGHTADDR     .EQU    2Ch             ; work light feature on or off
DISABLED        .EQU    00h             ; 00 = disabled,FF = enabled

MODEADDR        .equ    27h             ; Rolling/Fixed mode in EEPROM
                                        ; High byte = LGO mode
                                        ; Low byte = RadioMode flag
;-----------------------------------------------------------------------------
;       LGO Modes
;-----------------------------------------------------------------------------
RES_B2_MODE     .equ    3               ; of the LED

LightAddr       .equ    30h             ; Address for light on/off code

GDOIDAddr       .equ    34h             ; Address of GDO ID Number

NOEECOMM        .equ    01111111b       ; Flag:  skip radio read/write
NOINT           .equ    10000000b       ; Flag:  skip radio interrupts

RDROPTIME       .equ    125             ; Radio drop-out time:  0.5s

TC_LEARN        .equ    0DDh            ; Learn from touch code
REGLEARN        .equ    0AAh            ; Regular learn mode
LRNDURTN        .equ    088h            ; Learn t.c. temp. duration
LRNTEMP         .equ    077h            ; Learn touchcode temporary
BRECEIVED       .equ    055h            ; B code received flag
SENS_TEST       .equ    044h            ; Test direct comm. sensitivity
```

A2

```
RANGETEST       .equ    033h            ; Test open field range
NORMAL          .equ    00h             ; Normal command trans.

ENTER           .equ    00h             ; Touch code ENTER key
POUND           .equ    01h             ; Touch code # key
STAR            .equ    02h             ; Touch code * key

ACTIVATIONS     .equ    0AAh            ; Number of activations mcd
HOURS           .equ    055h            ; Number of hours mode

;-----------------------------------------------------------------------------
;       PERIODS
;-----------------------------------------------------------------------------

AOBSTEST_TIME   .equ    24              ; light from protector period and LED blink 1mS / cour
OBS_TIME        .equ    12              ; Time for protector reverse 1mS / count
LIMIT_COUNT     .equ    08h             ; limit debounce 1 way 32mS
FLASH_TIME      .equ    07Ah            ; .25 sec flash
SET_TIME_HI    .equ    02h             ; Light on time - 4.5 MIN
SET_TIME_LO    .equ    02h             ; Light on time - 4.5 MIN
SET_TIME_PRE   .equ    0FBh            ; Light on time - 4.5 MIN
;SET_TIME_HI      .equ    00h             ; Light on time (Short)
;SET_TIME_LO      .equ    10h             ; Light on time (Short)
;SET_TIME_PRE     .equ    0FBh            ; Light on time (Short)

ONE_SEC         .equ    0FFh            ; 0F4 WITH A /2 IN FRONT
S1_MAKE         .equ    8               ; cycle count *10mS
S1_BREAK        .equ    (255-8)
S3_MAKE         .equ    8               ; cycle count *11mS
S3_BREAK        .equ    (255-8)
S2_MAKE         .equ    2               ; cycle count *100mS
S2_BREAK        .equ    (255-2)

CONST_PRESS     .equ    0FDh
DB_INIT         .equ    0FCh

FIVE_SECONDS    .equ    (5000 / 125)    ; 5 sec for delays
TWO_SECONDS     .equ    (2000 / 125)    ; 2 sec for prox switch

EDGE_MAKE       .equ    25              ; 100 ms door edge debounce
EDGE_BREAK      .equ    (255-25)

S2_DEL          .equ    8
S1_DEL_EX       .equ    6               ; Normal S1 charge time
S1_DEL_POLL     .equ    5               ; Shorter charge time to request poll (Normal Debounce Time)
S2_DEL_EX       .equ    50

MAX_RPM_PER     .equ    8               ; 32 ms maximum RPM period (4 ms timebase)

;*********************************************************************
;       PREDEFINED REG
;*********************************************************************
;ALL_ON_IMR     .equ    00111111b       ; turn on int for timers rpm auxobs radio
;RETURN_IMR      .equ    00111110b       ; return on the IMR
;RadioImr       .equ    00000001b       ; turn on the radio only

;-----------------------------------------------------------------------------
;       GLOBAL REGISTERS
;-----------------------------------------------------------------------------
STATUS          .equ    04h             ;  1_TEST 00
                                        ;  3_TEST 01
                                        ; S2_TEST 02
                                        ; CHARGE 03
STATE           .equ    05h             ; state register
REASON          .equ    06h
STACKREASON     .equ    07h
AUTO_DELAY      .equ    08h
CB2_RADIO_TIMER .equ    09h
MOTOR_TIMER_HI  .equ    0Ah
MOTOR_TIMER_LO  .equ    0Bh
MOTOR_TIMER     .equ    0Ah
LIGHT_TIMER_HI  .equ    0Ch
LIGHT_TIMER_LO  .equ    0Dh
LIGHT_TIMER     .equ    0Ch
CB2IRFLAG       .equ    0Eh             ; Flag for IR's in comm B2
PRE_LIGHT       .equ    0Fh

CHECK_GRP       .equ    10h
check_sum       .equ    r0              ; check sum pointer
rom_data        .equ    r1
test_adr_hi     .equ    r2
test_adr_lo     .equ    r3
test_adr        .equ    rr2
```

A3

```
CHECK_SUM        .equ    CHECK_GRP+0      ; check sum reg for por
ROM_DATA         .equ    CHECK_GRP+1      ; data read
DisableRadioFlag .equ    CHECK_GRP+2
RRTO             .equ    CHECK_GRP+3
HOUR_TIMER       .equ    CHECK_GRP+4
HOUR_TIMER_HI    .equ    CHECK_GRP+4
HOUR_TIMER_LO    .equ    CHECK_GRP+5
RPM_ACOUNT       .equ    CHECK_GRP+6      ; to test for active rpm
RADIO_CMD        .equ    CHECK_GRP+7      ; radio command
R_DEAD_TIME      .equ    CHECK_GRP+8
FAULT            .equ    CHECK_GRP+9
LGOMODE          .equ    CHECK_GRP+10     ; mode flag
MODEFLASH        .equ    CHECK_GRP+11
MODESETFLAG      .equ    CHECK_GRP+12
TASKSWITCH       .equ    CHECK_GRP+13
FORCE_IGNORE     .equ    CHECK_GRP+14
STACKFLAG        .equ    CHECK_GRP+15

TIMER_GROUP      .equ    20h
rscommand        .equ    r3
switch_delay     .equ    r4
limit            .equ    r5
obs_count        .equ    r6

SWITCH_DELAY     .equ    TIMER_GROUP+4
LIMIT            .equ    TIMER_GROUP+5
OBS_COUNT        .equ    TIMER_GROUP+6
LEDTimer         .equ    TIMER_GROUP+11
PCounterA        .equ    TIMER_GROUP+12
PCounterB        .equ    TIMER_GROUP+13
PCounterC        .equ    TIMER_GROUP+14
PCounterD        .equ    TIMER_GROUP+15

;*******************************************************************
; LEARNEE GROUP FOR LOOPS ECT
;*******************************************************************
LEARNEE_GRP      .equ    30h
TEMPH            .equ    LEARNEE_GRP
TEMPL            .equ    LEARNEE_GRP+1
P2M_SHADOW       .equ    LEARNEE_GRP+2    ; Shadow register for P2M register (P2M is write-only)
LEARNDB          .equ    LEARNEE_GRP+3    ; learn debouncer
LEARNT           .equ    LEARNEE_GRP+4    ; learn timer
ERASET           .equ    LEARNEE_GRP+5    ; erase timer
MTEMPH           .equ    LEARNEE_GRP+6    ; memory temp
MTEMPL           .equ    LEARNEE_GRP+7    ; memory temp
ForceDown        .equ    LEARNEE_GRP+8
SERIAL           .equ    LEARNEE_GRP+9    ; data to & from nonvol memory
ADDRESS          .equ    LEARNEE_GRP+10   ; address for the serial nonvol memor
T0EXT            .equ    LEARNEE_GRP+11   ; t0 extend dec'd every T0 int
T4MS             .equ    LEARNEE_GRP+12   ; 4 mS counter
T125MS           .equ    LEARNEE_GRP+13   ; 125mS counter
ZZWIN            .equ    LEARNEE_GRP+14   ; radio 00 code window
SKIPRADIO        .equ    LEARNEE_GRP+15   ; flag to skip radio read,write if learn talking to it
temph            .equ    r0
templ            .equ    r1
p2m_shadow       .equ    r2
learndb          .equ    r3               ; learn debouncer
learnt           .equ    r4               ; learn timer
eraset           .equ    r5               ; erase timer
mtemph           .equ    r6               ; memory temp
mtempl           .equ    r7               ; memory temp
serial           .equ    r9               ; data to and from E^2
address          .equ    r10              ; addr for serial E^2
t0ext            .equ    r11              ; t0 extend dec'd every T0 int
t4ms             .equ    r12              ; (NU) 4 mS counter
t125ms           .equ    r13              ; 125mS counter
zzwin            .equ    r14              ;
skipradio        .equ    r15              ; flag to skip radio read,write if learn talking to it

FORCE_GROUP      .equ    40h
relforce         .equ    r0
absforce         .equ    r1
abs_force_hi     .equ    r4
abs_force_lo     .equ    r5
abs_force        .equ    rr4
force_add_hi     .equ    r8
force_add_lo     .equ    r9
force_add        .equ    rr8
forceindex       .equ    r13

RELFORCE         .equ    40h
ABSFORCE         .equ    41h
AOBSTEST         .equ    42h
```

A4

```
FAULTTIME       .equ    43h
ABS_FORCE_HI    .equ    44h
ABS_FORCE_LO    .equ    45h
RPM_DIFF_HI     .equ    46h
RPM_DIFF_LO     .equ    47h
FORCE_ADD_HI    .equ    48h
FORCE_ADD_LO    .equ    49h
POT_CONTROL     .equ    4Ah
POT_COUNT       .equ    4Bh
POT_TIMING      .equ    4Ch
FORCEINDEX      .equ    4Dh
AOBSF           .equ    4Eh       ; 00000000
;                                   ||||||└────────     skiped aobs pulse
;                                   |||||└───────── any pulses
;                                   ||||└──────────
;                                   |||└───────────     IR's are broken protector reverse
;                                   ||└────────────
;                                   |└───────────── single break
;                                   └────────────── poll radio mode
;                                   └────────────── break edge

FAULTCODE       .equ    4Fh

RPM_GROUP       .equ    50h

rpm_temp_hi     .equ    r0
rpm_temp_lo     .equ    r1
rpm_past_hi     .equ    r2
rpm_past_lo     .equ    r3
rpm_past        .equ    rr2
rpm_period_hi   .equ    r4
rpm_period_lo   .equ    r5
rpm_period      .equ    rr4
rpm_count       .equ    r6
rel_f_max_hi    .equ    r7
rel_f_max_lo    .equ    r8
rel_f_temp_hi   .equ    r9
rel_f_temp_lo   .equ    r10
rel_f_mult      .equ    r13
rpm_time_out    .equ    r15

RPM_TEMP_HI     .equ    RPM_GROUP+0
RPM_TEMP_LO     .equ    RPM_GROUP+1
RPM_PAST_HI     .equ    RPM_GROUP+2
RPM_PAST_LO     .equ    RPM_GROUP+3
RPM_PERIOD_HI   .equ    RPM_GROUP+4
RPM_PERIOD_LO   .equ    RPM_GROUP+5
RPM_COUNT       .equ    RPM_GROUP+6
REL_F_MAX_HI    .equ    RPM_GROUP+7
REL_F_MAX_LO    .equ    RPM_GROUP+8
REL_F_TEMP_HI   .equ    RPM_GROUP+9
REL_F_TEMP_LO   .equ    RPM_GROUP+10
MODECHANGEFLAG  .equ    RPM_GROUP+11
DoorEdgeDeb     .equ    RPM_GROUP+12
REL_F_MULT      .equ    RPM_GROUP+13
PULSECOUNTER    .equ    RPM_GROUP+14
RPM_TIME_OUT    .equ    RPM_GROUP+15

;*******************************************************************
; RADIO GROUP
;*******************************************************************
RadioGroup      .equ    60h
RTemp           .equ    RadioGroup        ; radio temp storage
RTempH          .equ    RadioGroup+1      ; radio temp storage high
RTempL          .equ    RadioGroup+2      ; radio temp storage low
RTimeAH         .equ    RadioGroup+3      ; radio active time hi byte
RTimeAL         .equ    RadioGroup+4      ; radio active time low byte
RTimeIH         .equ    RadioGroup+5      ; radio inactive time hi byte
RTimeIL         .equ    RadioGroup+6      ; radio inactive time low byte
Radio1H         .equ    RadioGroup+7      ; sync 1 code storage
Radio1L         .equ    RadioGroup+8      ; sync 1 code storage
PointerH        .equ    RadioGroup+9
PointerL        .equ    RadioGroup+10
AddValueH       .equ    RadioGroup+11
AddValueL       .equ    RadioGroup+12
RadioC          .equ    RadioGroup+13     ; radio word count
Radio3H         .equ    RadioGroup+14     ; sync 3 code storage
Radio3L         .equ    RadioGroup+15     ; sync 3 code storage
rtemp           .equ    r0                ; radio temp storage
rtemph          .equ    r1                ; radio temp storage high
rtempl          .equ    r2                ; radio temp storage low
rtimeah         .equ    r3                ; radio active time hi byte
rtimeal         .equ    r4                ; radio active time low byte
```

A5

S:\SHARED\CDO\Lgo_Rjo\RJO - Study\Code\Final0301.s
Printed at 09:38 on 10 Apr 2001

```
rtimeih         .equ    r5              ; radio inactive time hi byte
rtimeil         .equ    r6              ; radio inactive time low byte
radio1h         .equ    r7              ; sync 1 code storage
radio1l         .equ    r8              ; sync 1 code storage
pointerh        .equ    r9              ;
pointerl        .equ    r10
addvalueh       .equ    r11
addvaluel       .equ    r12
radioc          .equ    r13             ; radio word count
radio3h         .equ    r14             ; sync 3 code storage
radio3l         .equ    r15             ; sync 3 code storage

CounterGroup    .equ    070h            ; counter group
BackOffDnLim    .equ    CounterGroup+01
LastMatch       .equ    CounterGroup+02                 ; last matching code address
LoopCount       .equ    CounterGroup+03                 ; loop counter
CounterA        .equ    CounterGroup+04                 ; High-order (3^19-3^10) part
CounterB        .equ    CounterGroup+05                 ; of counter and storage for
CounterC        .equ    CounterGroup+06                 ; final rolling code counter
CounterD        .equ    CounterGroup+07                 ;
CounterLoA      .equ    CounterGroup+08                 ; Low-order (3^9-3^0) portion
CounterLoB      .equ    CounterGroup+09                 ; of counter
MathTemp1       .equ    CounterGroup+010                ; Temp registers for
MathTemp2       .equ    CounterGroup+011                ; radio code math
MathTemp3       .equ    CounterGroup+012
MathTemp4       .equ    CounterGroup+013

SAFEREVFLAG     .equ    CounterGroup+015

loopcount       .equ    r3
countera        .equ    r4
counterb        .equ    r5
counterc        .equ    r6
counterd        .equ    r7
counterloa      .equ    r8
counterlob      .equ    r9
mathtemp1       .equ    r10
mathtemp2       .equ    r11
mathtemp3       .equ    r12
mathtemp4       .equ    r13

Radio2Group     .equ    080h

PREVFIX         .equ    Radio2Group + 0
PREVTMP         .equ    Radio2Group + 1
ROLLBIT         .equ    Radio2Group + 2
RTimeDH         .equ    Radio2Group + 3
RTimeDL         .equ    Radio2Group + 4
RTimePH         .equ    Radio2Group + 5
RTimePL         .equ    Radio2Group + 6
ID_B            .equ    Radio2Group + 7
SW_B            .equ    Radio2Group + 8
RADIOBIT        .equ    Radio2Group + 9
RadioTimeOut    .equ    Radio2Group + 10
RadioMode       .equ    Radio2Group + 11        ; Fixed or rolling mode
BitThresh       .equ    Radio2Group + 12        ; Bit decision threshold
SyncThresh      .equ    Radio2Group + 13        ; Sync pulse decision threshold
MaxBits         .equ    Radio2Group + 14        ; Maximum number of bits
RFlag           .equ    Radio2Group + 15        ; Radio flags

prevfix         .equ    r0
prevtmp         .equ    r1
rollbit         .equ    r2
id_b            .equ    r7
sw_b            .equ    r8
radiobit        .equ    r9
radiotimeout    .equ    r10
radiomode       .equ    r11
rflag           .equ    r15

OrginalGroup    .equ    90h
SW_DATA         .equ    OrginalGroup+0
ONEP2           .equ    OrginalGroup+1          ; 1.2 SEC TIMER TICK .125
LAST_CMD        .equ    OrginalGroup+2          ; LAST COMMAND FROM
                                                ; = 55 WALL CONTROL
                                                ; = 00 RADIO
CodeFlag        .equ    OrginalGroup+3          ; Radio code type flag
                                                ; FF = Learning open/close/stop
                                                ; 77 = p code
                                                ; AA = open/close/stop code
                                                ; 55 = Light control transmitter
                                                ; CC = Command or unknown
```

A6

```
RPMONES         .equ    OrginalGroup+4          ; RPM Pulse One Sec. Disable
RPMCLEAR        .equ    OrginalGroup+5          ; RPM PULSE CLEAR & TEST TIMER
FAREVFLAG       .equ    OrginalGroup+6          ; RPM FORCED AREV FLAG
                                                ; 88h FOR A FORCED REVERSE

FLASH_FLAG      .equ    OrginalGroup+7
ODIFLAG         .equ    OrginalGroup+8          ; Flag state changes and
                                                ; request for poll
FLASH_DELAY     .equ    OrginalGroup+9
FLASH_COUNTER   .equ    OrginalGroup+10
SafetyDelay     .equ    OrginalGroup+11
LIGHT_FLAG      .equ    OrginalGroup+12
S1_DEB          .equ    OrginalGroup+13
S3_DEB          .equ    OrginalGroup+14
S2_DEB          .equ    OrginalGroup+15

NextGroup       .equ    0A0h
SDISABLE        .equ    NextGroup+0             ; system disable timer
PRADIO3H        .equ    NextGroup+1             ; 3 mS code storage high byte
PRADIO3L        .equ    NextGroup+2             ; 3 mS code storage low byte
PRADIO1H        .equ    NextGroup+3             ; 1 mS code storage high byte
PRADIO1L        .equ    NextGroup+4             ; 1 mS code storage low byte
RTO             .equ    NextGroup+5             ; radio time out
CableDelay      .equ    NextGroup+6             ; For 2s timing
RINFILTER       .equ    NextGroup+7             ; radio input filter

LIGHT1S         .equ    NextGroup+8             ; light timer for 1 sec flash
DOG2            .equ    NextGroup+9             ; second watchdog
FAULTFLAG       .equ    NextGroup+10            ; flag for fault blink,
                                                ; no rad. blink
MOTDEL          .equ    NextGroup+11            ; motor time delay
LIGHTS          .equ    NextGroup+12            ; light state
DELAYC          .equ    NextGroup+13            ; for the time delay for cmd
OVERRIDE        .equ    NextGroup+14            ;
CMP             .equ    NextGroup+15            ; Counter compare result

REL_FORCE_GRP   .equ    0B0h
BACKUP_GRP      .equ    0B0h
PAST_RPM_MED_HI .equ    REL_FORCE_GRP+0
PAST_RPM_MED_LO .equ    REL_FORCE_GRP+1
RPM_TEST_HI     .equ    REL_FORCE_GRP+2
RPM_TEST_LO     .equ    REL_FORCE_GRP+3
PAST_RPM_DIF_HI .equ    REL_FORCE_GRP+4
PAST_RPM_DIF_LO .equ    REL_FORCE_GRP+5
PRES_RPM_MAX_HI .equ    REL_FORCE_GRP+6
PRES_RPM_MAX_LO .equ    REL_FORCE_GRP+7
PRES_RPM_MIN_HI .equ    REL_FORCE_GRP+8
PRES_RPM_MIN_LO .equ    REL_FORCE_GRP+9
past_rpm_med_hi .equ    r0
past_rpm_med_lo .equ    r1
rpm_test_hi     .equ    r2
rpm_test_lo     .equ    r3
past_rpm_dif_hi .equ    r4
past_rpm_dif_lo .equ    r5
pres_rpm_max_hi .equ    r6
pres_rpm_max_lo .equ    r7
pres_rpm_min_hi .equ    r8
pres_rpm_min_lo .equ    r9
BRPM_COUNT      .equ    BACKUP_GRP+10
BRPM_TIME_OUT   .equ    BACKUP_GRP+11
BAUTO_DELAY     .equ    BACKUP_GRP+12
BFORCE_IGNORE   .equ    BACKUP_GRP+13
BS1_DEB         .equ    BACKUP_GRP+14
BSTATE          .equ    BACKUP_GRP+15

;       Double-mapped registers for M6800 test
COUNT_HI        .equ    BRPM_COUNT
COUNT_LO        .equ    BRPM_TIME_OUT
COUNT           .equ    BRPM_COUNT
REGTEMP         .equ    BAUTO_DELAY
REGTEMP2        .equ    BS1_DEB

STACKTOP        .equ    238             ; start of the stack
STACKEND        .equ    0C0h            ; end of the stack

PARITYBIT       .equ    00000001b       ; Parity tracking bit
PARITYERROR     .equ    00000010b       ; Parity error flag
BREAKDETECT     .equ    00000100b       ; Break detected flag
FRAMINGERR      .equ    00001000b       ; Framing error flag
COLLISION       .equ    00010000b       ; Collision detected flag

csh             .equ    00010000b       ; chip select high for 93c46
csl             .equ    11101111b       ; chip select low for 93c46
```

A7

```
clockh          .equ    00001000b       ; clock high for 93c46
clockl          .equ    11110111b       ; clock low for 93c46
doh             .equ    00000100b       ; data out high for 93c46
dol             .equ    11111011b       ; data out low for 93c46
ledh            .equ    10000000b       ; turn the led pin high "on"
ledl            .equ    01111111b       ; turn the led pin low "off"
psmask          .equ    01000000b       ; mask for the program switch
csport          .equ    P2              ; chip select port
dioport         .equ    P2              ; data i/o port
clkport         .equ    P2              ; clock port
ledport         .equ    P2              ; led port
psport          .equ    P0              ; program switch port

        ; Constants for active clamp

CLAMPPORT       .equ    P3
CLAMPHIGH       .equ    01000000b
CLAMPLOW        .equ    10111111b

WATCHDOG_GROUP  .equ    0Fh
pcon            .equ    r0
smr             .equ    r11
wdtmr           .equ    r15

;*********************************************************************
;* Interrupt Vector Table
;*********************************************************************
        .org    0000h

        .word   RADIO_INT       ; IRQ0,P3.2             0000
        .word   nul_int         ; IRQ1,P3.3             0002
        .word   RPM_int         ; IRQ2,P3.1             0004
        .word   AUX_OBS         ; IRQ3,P3.0             0006
        .word   TIMERUD         ; IRQ4,T0               0008
        .word   nul_int         ; IRQ5,T1               000A

        .page
        .org    000Ch
        jp      start                           ; jmps to start at
nul_int:
        iret

start:
        di                                      ; turn off interrupt for init
        ld      RP, #0Fh                        ; Bank (F) WATCHDOG_GROUP
        ld      wdtmr, #00001111b               ; rc dog 100mS
;                      |||||||└──────────────── (1) WDT TAP 100mS
;                      ||||||└───────────────── (1)
;                      |||||└────────────────── (1) WDT HALT ON
;                      ||||└─────────────────── (1) WDT STOP ON
;                      |||└──────────────────── (0) On-board RC
;                      ||└───────────────────── (0) reserved
;                      |└────────────────────── (0) reserved
;                      └─────────────────────── (0) reserved

        WDT                                     ; kick the dog
        clr     RP                              ; Bank (0)

;*********************************************************************
; PORT INITILIZATION
;*********************************************************************
        ld      P0, #00000001b          ; RESET all ports
        ld      P2, #11000101b          ; Set up lim high,down lim
        ld      P3, #00000000b          ; low,and chip ID
        ld      P01M, #01000100b        ; set P0.0 - P0.3 out P0.4 - P0.7in
        ld      P3M, #00000001b         ; set P3.0 - P3.3 in analog mode P3.4 - P3.7 outputs
        ld      P2M, #00000000b         ; set port 2 mode setting the limits as outputs for fema of open

;*********************************************************************
;* Internal RAM Test and Reset All RAM = mS *
;*********************************************************************
        srp     #0F0h                   ; Registers F0-FF,point to ctrl group use stack
        ld      r15, #4                 ; R15 = pointer (minimum of RAM)

write_again:
        WDT                             ; KICK THE DOG
        ld      r14, #1

write_again1:
        ld      @r15,r14                ; write 1,2,4,8,10,20,40,80
        cp      r14,@r15                ; then compare
;       jr      ne,system_error
```

A8

```
        rl      r14                     ; x2
        jr      nc,write_again1         ; if no carry keep going
        clr     @r15                    ; write RAM(r5)=0 to memory
        inc     r15
        cp      r15, #240
        jr      ult,write_again

;*******************************************************************
;*      Checksum Test
;*******************************************************************
CHECKSUMTEST:
        srp     #10h                    ; Registers CHECK_GRP

system_ok:
        WDT                             ; kick the dog
        ld      STACKEND, #STACKTOP     ; start at top of the stack 0Ch

SETSTACKLOOP:
        ld      @STACKEND, #01h         ; set value for stack vector
        dec     STACKEND                ; next address
        cp      STACKEND, #STACKEND     ; test for the last address
        jr      nz,SETSTACKLOOP         ; loop till done

CLEARDONE:
        ld      P2, #10000011b          ; early init of port2
        ld      P2M, #(P2M_INIT+0)       ; set port 2 mode inputs-b6,b5,b1,b0 outputs-b7,b4-b2
        ld      P2M_SHADOW, #01100011b  ; Set the shadow reg.
        tm      P2, #00000001b          ; test if GDO at up limit (P2.0 - pin 24)
        jr      nz,TEST_DOWN            ; if not at up then check down
        ld      STATE, #02h             ; load state as UP_POSITION
        ld      BSTATE, #02h            ; load backup state as UP_POSITION
        jr      STATE_SET               ; state is set as up limit

TEST_DOWN:
        tm      P2, #00000010b          ; test if GDO is at down limit (P2.1 - pin 25)
        jr      nz,MID_TRAVEL           ; if not at Down,check for up
        ld      STATE, #05h             ; load state as DN_POSITION
        ld      BSTATE, #05h            ; load backup state as DN_POSITION
        jr      STATE_SET               ; state is set as down state

MID_TRAVEL:
        ld      STATE, #06              ; set the state to stop
        ld      BSTATE, #06

STATE_SET:
        ld      STATUS, #03h            ; set start to CHARGE
        ld      SWITCH_DELAY, #S1_DEL_EX ; set the delay time to cmd
        ld      RPMONES, #244           ; set the hold off
        srp     #LEARNEE_GRP
        ld      learndb, #0FFh          ; set the learn debouncer
        ld      zzwin,learndb           ; turn off the learning
        ld      S1_DEB, #0FCh           ; DB_INIT in case of shorted switches
        ld      BS1_DEB, #0FCh          ; DB_INIT in case of shorted switches
        ld      S2_DEB, #0FCh           ; DB_INIT
        ld      S3_DEB, #0FCh                   ; DB_INIT
        ld      ERASET,learndb                  ; set the erase timer
        ld      learnt,learndb                  ; set the learn timer
        ld      RTO,learndb                     ; set the radio time out
        ld      RRTO,learndb                    ; set the radio timer
        ld      SafetyDelay, #0FFh              ; disable the delay timer
        ld      CableDelay, #0FFh               ; disable the prox sw timer
        ld      CB2_RADIO_TIMER,learndb         ; Init comm. b2 radio timer
        ld      RPM_TIME_OUT, #8                ; MAX_RPM_PER - 32 ms maximum RPM period (4 ms timebase)
        ld      BRPM_TIME_OUT, #8               ; MAX_RPM_PER - 32 ms maximum RPM period (4 ms timebase)
        ld      LIGHT_TIMER_HI, #SET_TIME_HI    ; Reset the worklight timeout
        ld      LIGHT_TIMER_LO, #SET_TIME_LO
        ld      PRE_LIGHT, #SET_TIME_PRE

;*******************************************************************
; STACK INITILIZATION
;*******************************************************************
        clr     254
        ld      255, #238                       ; set the start of the stack

;*******************************************************************
; TIMER INITILIZATION
;*******************************************************************
        ld      PRE0, #00001101b                ; set prescaler / 3 for 6MHz
        ld      PRE1, #00011011b                ; Set prescaler / 6 for 6MHz
        ld      T0, #127                        ; set the counter to count 127 through 0
        ld      TMR, #00000011b                 ; turn on the timer
;                     ||||||└──────── (1)
;                     |||||└───────── (1)
```

A9

```
;                    ||||└────────── (1)
;                    |||└─────────── (1)
;                    ||└──────────── (0)
;                    |└───────────── (0)
;                    |└───────────── (0)
;                    └────────────── (0)

;*****************************************************************
; PORT INITILIZATION
;*****************************************************************
        ld      P0, #00000001b              ; P01S_INIT,RESET all ports
        ld      P2, #10000011b              ; P2S_INIT
        ld      P3, #00000000b              ; P3S_INIT
        ld      P01M, #01000100b            ; P01M_INIT,set P0.0-P0.3 out P0.4-P0.7in
        ld      P3M, #00000001b             ; P3M_INIT,set port3 P3.0-P3.3 analog in P3.4-P3.7 outputs
        ld      P2M, #(P2M_INIT+0)          ; set port 2 mode
        ld      P2M_SHADOW, #01100011b      ; P2M_INIT,Set the shadow reg.

;*****************************************************************
; READ THE MEMORY 2X AND GET THE MODE
;*****************************************************************
        ld      SKIPRADIO, #01111111b       ; Flag:  skip radio read/write
        ld      ADDRESS, #27h               ; MODEADDR: set non vol address to the MODE flag
        call    READMEMORY                  ; read the value 1X INIT
        call    READMEMORY                  ; read the value 2X READ

;*****************************************************************
; SET ROLLING/FIXED MODE AND LGO MODE FROM NON-VOLATILE MEMORY
;*****************************************************************
        call    SetRadioMode                ; Set the radio mode
        jr      SetInts                     ; Continue on

SetRadioMode:
        ld      SKIPRADIO, #01111111b       ; NOEECOMM: Set skip radio flag
        ld      ADDRESS, #27h               ; MODEADDR: Point to the radio mode flag
        call    READMEMORY                  ; Read the radio mode
        ld      RadioMode,MTEMPL            ; Set the proper radio mode
        di                                  ; Stop switch changes
        ld      CB2IRFLAG, #0FFh            ; Enable IR's in comm B2 mode
        ei                                  ; Re-enable ints
        clr     SKIPRADIO                   ; Re-enable the radio
        tm      RadioMode, #ROLL_MASK       ; Do we want rolling numbers
        jr      nz,StartRoll
        call    FixedNums
        ret

StartRoll:
        call    RollNums
        ret

SetInts:
;*****************************************************************
; INITERRUPT INITILIZATION
;*****************************************************************
SETINTERRUPTS:
        ld      IPR, #00011010b ; priority group B>A>C - structure:
;                    ||||||└──────── ( ) Group select
;                    |||||└───────── (X) Group-C IRQ1 & IRQ4 priority  IRQ2 - RPM        highest
;                    ||||└────────── ( ) Group-B IRQ0 & IRQ2 priority  IRQ0 - RADIO_INT
;                    |||└─────────── (X) Group select                  IRQ5 - RS232
;                    ||└──────────── (X) Group select                  IRQ3 - AUX_OBS
;                    |└───────────── ( ) Group-A IRQ3 & IRQ5 priority  IRQ4 - TIMERUD
;                    |└───────────── (0) reserved                      IRQ1 - RSEdge     lowest
;                    └────────────── (0) reserved

        ld      IMR, #00011101b             ; turn on the interrupt
;                    ||||||└──────── (1) RADIO_INT
;                    |||||└───────── (1) not used
;                    ||||└────────── (1) RPM
;                    |||└─────────── (1) AUX_OBS
;                    ||└──────────── (1) TIMERUD
;                    |└───────────── (0) not used
;                    |└───────────── (0) RAM Protect
;                   └─────────────── (0) En/Dis able interrupts

        ld      IRQ, #01000000b   ; Interrupt request
;                    ||||||└──────── ( ) IRQ0 - RADIO_INT
;                    |||||└───────── ( ) IRQ1 - not used
;                    ||||└────────── ( ) IRQ2 - RPM
;                    |||└─────────── ( ) IRQ3 - AUX_OBS
;                    ||└──────────── ( ) IRQ4 - TIMERUD
;                    |└───────────── ( ) IRQ5 - not used
;                    └────────────── (1) P31 - Falling edge
```

A10

S:\SHARED\CDO\Lgo_Rjo\RJO - Study\Code\Final0301.s
Printed at 09:38 on 10 Apr 2001

```
;                                   (0) P32 - Rising edge
;****************************************************************
; RESET SYSTEM REG
;****************************************************************
        ld      RP, #0Fh                ; WATCHDOG_GROUP
        ld      smr, #00100010b         ; reset the xtal / number
        ld      pcon, #11111110b        ; reset the pcon nc comparator output no low emi mode
        ld      PRE0, #00001101b        ; set prescaler / 3 for 6Mhz
        clr     RP                      ; Reset the register pointer
        ei                              ; enable interrupt

;****************************************************************
; MAIN LOOP: Update the force values from the ROM look-up table
;****************************************************************
MAINLOOP:
        srp     #FORCE_GROUP
        di                              ; Prevent corruption of absforce
        cp      absforce, #064          ; test the last address
        jr      ult,ABS_ADDRESS_OK      ; if in the range ok
        ld      absforce, #064          ; if out of range set to top

ABS_ADDRESS_OK:
        ld      forceindex, #64         ; Reverse the pot. rotation
        sub     forceindex,absforce
        ei
        ld      force_add_hi, #HIGH(force_table_A)
        ld      force_add_lo, #LOW(force_table_A)
        tm      P0, #00100000b          ; Strap: test the strap

ABS60:
        add     force_add_lo,forceindex ; calculate the address
        adc     force_add_hi, #00h      ; add 2X temp
        add     force_add_lo,forceindex ; calculate the address
        adc     force_add_hi, #00h      ; add 2X temp
        di
        ldc     abs_force_hi,@force_add ; get hi byte
        incw    force_add               ; get low byte
        ldc     abs_force_lo,@force_add
        ei

;------------------------------------------------
;       GOT_FORCE
;------------------------------------------------
        cp      HOUR_TIMER_HI, #01Ch    ; if an hour has passed,
        jr      ult,NoDecrement         ; then decrement the
        cp      HOUR_TIMER_LO, #020h    ; temporary password timer
        jr      ult,NoDecrement
        clr     HOUR_TIMER_HI           ; Reset hour timer
        clr     HOUR_TIMER_LO
        ld      SKIPRADIO, #01111111b   ; NOEECOMM: Disable radio EE read
        ld      ADDRESS, #25h           ; DURAT: Load the temporary password duration from non-volatile
        call    READMEMORY              ;
        cp      MTEMPH, #55h            ; HOURS: if not in timer mode,
        jr      nz,NoDecrement2         ; then don't update
        cp      MTEMPL, #00             ; if timer is not done,
        jr      z,NoDecrement2          ; decrement it
        dec     MTEMPL                  ; Update the number of hours
        call    WRITEMEMORY

NoDecrement:
        tm      AOBSF, #01000000b       ; if 'poll radio mode' flag is
;                                ------ poll radio mode
        jr      z,NoDecrement2          ; set,poll the radio mode

        call    SetRadioMode            ; Set the radio mode
        and     AOBSF, #10111111b       ; Clear the flag
;                                ------ poll radio mode

NoDecrement2:
        clr     SKIPRADIO               ; Re-enable radio reads
        clr     DOG2                    ; clear the second watchdog
        ld      P01M, #01000100b        ;    P01M_INIT: set P0.0-P0.3 out P0.4-P0.7in
        ld      P3M, #00000001b         ; P3M_INIT: set P3.0-P3.3 analog in P3.4-P3.7 outputs
        and     P2M_SHADOW, #01100111b  ; P2M_OUTPUTS: Refresh constant output pins
        or      P2M_SHADOW, #00000011b  ; P2M_INPUTS: Refresh constant input pins
        ld      P2M,P2M_SHADOW          ; Refresh port 2 mode
        cp      STACKFLAG, #0FFh        ; test for the change flag
        jr      nz,NOCHANGEST           ; if no change skip updating
        ld      LIGHT_TIMER_HI, #SET_TIME_HI ; Reset the worklight timeout
        ld      LIGHT_TIMER_LO, #SET_TIME_LO
        ld      PRE_LIGHT, #SET_TIME_PRE
        srp     #LEARNEE_GRP            ; set the register pointer
```

A-11

```
        clr     STACKFLAG                       ; clear the flag
        ld      SKIPRADIO, #01111111b           ; NOEECOMM: set skip flag
        ld      address, #28h                   ; CYCCOUNT: set non vol addr to cycle count
        call    READMEMORY                      ; read the value
        inc     mtempl                          ; increase counter lower byte
        jr      nz,COUNTER1DONE                 ;
        inc     mtemph                          ; increase counter high byte
        jr      nz,COUNTER2DONE                 ;
        call    WRITEMEMORY                     ; store the value
        inc     address                         ; get the next bytes
        call    READMEMORY                      ; read the data
        inc     mtempl                          ; increase counter low byte
        jr      nz,COUNTER2DONE                 ;
        inc     mtemph                          ; increase counter high byte

COUNTER2DONE:
        call    WRITEMEMORY                     ; save the value
        ld      address, #CYCCOUNT
        call    READMEMORY                      ; read the data
        and     mtemph, #00000111b              ; find the force address
        or      mtemph, #38h                    ;
        ld      ADDRESS,MTEMPH                  ; set the address
        ld      mtempl,RELFORCE                 ; read the forces
        ld      mtemph,ABSFORCE                 ;
        call    WRITEMEMORY                     ; write the value
        jr      CDONE                           ; done set the back trace

COUNTER1DONE:
        call    WRITEMEMORY                     ; got the new address

CDONE:
        clr     SKIPRADIO                       ; clear skip flag

NOCHANGEST:
        call    LEARN                           ; do the learn switch

        di
        cp      BRPM_COUNT,RPM_COUNT
        jr      z,TESTRPM

RESET:
        jp      start

TESTRPM:
        cp      BRPM_TIME_OUT,RPM_TIME_OUT
        jr      nz,RESET
        ei
        di
        cp      BAUTO_DELAY,AUTO_DELAY
        jr      nz,RESET
        cp      BS1_DEB,S1_DEB
        jr      nz,RESET
        cp      BSTATE,STATE
        jr      nz,RESET
        ei
        SRP     #TIMER_GROUP

TestForNewMode:
        cp      MODECHANGEFLAG, #0FFh           ; if flag for new mode set,
        jr      nz,DontWriteMode                ; then store the new mode

WriteNewLGOMode:
        ld      SKIPRADIO, #01111111b           ; NOEECOMM: Stop radio EEPROM reads
        ld      ADDRESS, #27h                   ; MODEADDR: (Preserve the radio mode)
        call    READMEMORY
        ld      MTEMPH,LGOMODE                  ; Store the new LGO mode
        call    WRITEMEMORY
        clr     SKIPRADIO                       ; Re-enable radio
        clr     MODECHANGEFLAG                  ; One-shot the flag

DontWriteMode:
        cp      R_DEAD_TIME, #25                ; test for too long dead
        jp      nz,MAINLOOP                     ; if not loop
        clr     RadioC                          ; clear the radio counter
        clr     RFlag                           ; clear the radio flag
        or      CLAMPPORT, #CLAMPHIGH           ; Turn off avg. detector hold
        jp      MAINLOOP                        ; loop forever

;*********************************************************************
; Radio interrupt from a edge of the radio signal
;*********************************************************************
RADIO_INT:
```

A12

```
        push    RP                              ; save the radio pair
        srp     #RadioGroup                     ; set the register pointer
        and     IMR, #11011100b                 ; turn off the radio interrupt
;                     ||||||└──────── (0) RADIO_INT
;                     |||||└───────── (0) not used
;                     ||||└────────── (1) RPM
;                     |||└─────────── (1) AUX_OBS
;                     ||└──────────── (1) TIMERUD
;                     |└───────────── (0) not used
;                     └────────────── (1) RAM Protect
;                     └────────────── (1) En/Dis able interrupts

        ld      rtemph,T0EXT                    ; read the upper byte
        ld      rtempl,T0                       ; read the lower byte
        rcf                                     ; Multiply lower byte by two
        rlc     rtempl                          ; to correct for the prescaler
        tm      IRQ, #00010000b                 ; test for pending int
        jr      z,RTIMEOK                       ; if not then ok time
        tm      rtempl, #10000000b              ; test for timer reload
        jr      z,RTIMEOK                       ; if not reloaded then ok
        dec     rtemph                          ; if reloaded then dec high for sync

RTIMEOK:
        clr     R_DEAD_TIME                     ; clear the dead time
        ei                                      ; Re-enable interrupts

        ld      RTimeDH,RTimePH                 ; find the difference
        ld      RTimeDL,RTimePL                 ;
        sub     RTimeDL,rtempl                  ; in past time and
        sbc     RTimeDH,rtemph                  ; the past time in temp

RTIMEDONE:
        tm      P3, #00000100b                  ; test the port for the edge
        jr      nz,ACTIVETIME                   ; if it was active time branch

INACTIVETIME:
        cp      RINFILTER, #0FFh                ; test for active last time
        jr      z,GOINACTIVE                    ; if so continue
        jp      RADIO_EXIT                      ; if not the return

GOINACTIVE:
        or      IRQ, #01000000b                 ; set the bit setting direction to pos edge
        clr     RINFILTER                       ; set flag to inactive
        ld      rtimeih,RTimeDH                 ; transfer difference to
        ld      rtimeil,RTimeDL                 ; inactive
        ld      RTimePH,rtemph                  ; transfer temp into the past
        ld      RTimePL,rtempl                  ;
        cp      radioc, #01H                    ; inactive time after sink bit
        jp      NZ,RADIO_EXIT                   ; exit if it was not sink
        tm      RadioMode, #ROLL_MASK           ; if in fixed mode,
        jr      z,FixedBlank                    ; no number counter exists
        cp      rtimeih, #0Ah                   ; 2.56ms for rolling code mode
        jp      ULT,RADIO_EXIT                  ; pulse ok exit as normal
        clr     radioc                          ; if pulse is longer,bogus sink,restart sink search
        jp      RADIO_EXIT                      ; return

FixedBlank:
        cp      rtimeih, #014h                  ; test for max width 5.16ms
        jp      ULT,RADIO_EXIT                  ; pulse ok exit as normal
        clr     radioc                          ; if pulse is longer,bogus sink,restart sink search
        jp      RADIO_EXIT                      ; return

ACTIVETIME:
        cp      RINFILTER, #00h                 ; test for active last time
        jr      z,GOACTIVE                      ; if so continue
        jp      RADIO_EXIT                      ; if not the return

GOACTIVE:
        and     IRQ, #00111111b                 ; clear bit setting direction to neg edge
        ld      RINFILTER, #0FFh                ;
        ld      rtimeah,RTimeDH                 ; transfer difference to
        ld      rtimeal,RTimeDL                 ; active
        ld      RTimePH,rtemph                  ; transfer temp into the past
        ld      RTimePL,rtempl                  ;

GotBothEdges:
        ei                                      ; enable the interrupts
        cp      radioc, #0                      ; test for the blank timing
        jp      nz,INSIG                        ; if not then in the middle of signal

CheckSync:
        ld      radioc, #1                      ; Set the counter to first bit
```

A13

```
CheckBlank:
        tm      RFlag, #00100000b           ; Has a valid blank time
        jr      NZ,BlankSkip                ; already occurred?
        cp      RadioTimeOut, #10           ; test for min 10 ms blank
        jr      ult,ClearJump               ; if not then clear the radio
        tm      CLAMPPORT, #CLAMPHIGH       ; if radio clamp is not set,
        jr      nz,BlankSkip                ; then ignore the blank time
        or      RFlag, #00100000b           ; blank time valid! no need to check

BlankSkip:
        cp      rtimeah, #00h               ; test first the min sync
        jr      z,JustNoise                 ; if high byte 0 then clear the radio

SyncOk:
        or      CLAMPPORT, #CLAMPHIGH       ; Clear the active clamp
        tm      RadioMode, #ROLL_MASK       ; checking sink pulse width,
        jr      z,FixedSink                 ; fix or roll
        cp      rtimeah, #09h               ; time for roll 1/2 fixed,
        jr      uge,JustNoise               ; 2.3ms
        jr      SET1

FixedSink:
        cp      rtimeah, #012h              ; test for the max time 4.6mS
        jr      uge,JustNoise               ; if not clear

SET1:
        clr     PREVFIX                     ; Clear previous "fixed" bit
        cp      rtimeah,SyncThresh          ; test for 1 or 3 time units
        jr      uge,SYNC3FLAG               ; set the sync 3 flag

SYNC1FLAG:
        tm      RFlag, #01000000b           ; Was a sync 1 word last rcvd?
        jr      z,SETADCODE                 ; if not,this is A(or D) code

SETBCCODE:
        ld      radio3h,radio1h             ; Store the last sync 1 word
        ld      radio3l,radio1l
        jr      BCCODE

JustNoise:
        clr     radioc                      ; Edge was noise keep waiting
        jp      RADIO_EXIT                  ; for sync bit

SETADCODE:
BCCODE:
        or      RFlag, #01000000b           ; set the sync 1 memory flag
        clr     radio1h                     ; clear the memory
        clr     radio1l                     ;
        clr     CounterA                    ; clear the memory
        clr     CounterB                    ;
        clr     CounterC                    ;
        clr     CounterD                    ;
        jr      DONESET1                    ; do the 2X

SYNC3FLAG:
        and     RFlag, #10111111b           ; set the sync 3 memory flag
        clr     radio3h                     ; clear the memory
        clr     radio3l                     ;
        clr     CounterLoA                  ; clear the memory
        clr     CounterLoB                  ;
        clr     ID_B                        ; Clear the ID bits

DONESET1:
RADIO_EXIT:
        and     SKIPRADIO, #~10000000b      ; Re-enable radio ints
        pop     rp
        iret                                ; done return

ClearJump:
        or      CLAMPPORT, #CLAMPHIGH       ; Clear the clamp,reset the average detector
        jp      ClearRadio                  ; clear the radio signal

INSIG:
        and     RFlag, #11011111b           ; clear blank time good flag
        cp      rtimeih, #014h              ; test for the max width 5.16
        jp      uge,CheckSync               ; if too wide clear
        cp      rtimeih, #00h               ; test for the min width
        jr      z,ClearJump                 ; if high byte is zero,pulse too narrow

ISigOk:
        cp      rtimeah, #014h              ; test for the max width
        jr      uge,ClearJump               ; if too wide clear
        cp      rtimeah, #00h               ; if greater than 0 then signal ok
```

A14

```
        jr      z,ClearJump                     ; if too narrow clear

ASigOk:
        sub     rtimeal,rtimeil                 ; find the difference
        sbc     rtimeah,rtimeih
        tm      rtimeah, #10000000b             ; find out if neg
        jr      nz,NEGDIFF2                     ; use 1 for ABC or D
        jr      POSDIFF2

POSDIFF2:
        cp      rtimeah,BitThresh               ; test for 3/2
        jr      ult,BITIS2                      ; mark as a 2
        jr      BITIS3

NEGDIFF2:
        com     rtimeah                         ; invert
        cp      rtimeah,BitThresh               ; test for 2/1
        jr      ult,BIT2COMP                    ; mark as a 2
        jr      BITIS1

BITIS3:
        ld      RADIOBIT, #2h                   ; set the value
        jr      GOTRADBIT

BIT2COMP:
        com     rtimeah                         ; invert

BITIS2:
        ld      RADIOBIT, #1h                   ; set the value
        jr      GOTRADBIT

BITIS1:
        com     rtimeah                         ; invert
        ld      RADIOBIT, #0h                   ; set the value

GOTRADBIT:
        clr     rtimeah                         ; clear the time
        clr     rtimeal
        clr     rtimeih
        clr     rtimeil

ADDRADBIT:
        srp     #Radio2Group                    ;
        tm      rflag, #01000000b               ; test for radio 1 / 3
        jr      nz,RC1INC                       ;
RC3INC:
        tm      RadioMode, #ROLL_MASK           ; if in fixed mode,
        jr      z,Radio3F                       ; no number counter exists
        tm      RadioC, #00000001b              ; test for even odd number
        jr      nz,COUNT3INC                    ; if EVEN number counter

Radio3INC:                                      ; else radio

        call    GETTRUEFIX                      ; Get the true fixed bit
        cp      RadioC, #14                     ; test the radio counter for the specials
        jr      uge,SPECIAL_BITS                ; save special bits seperate

Radio3R:
Radio3F:
        srp     #RadioGroup
        ld      pointerh, #Radio3H              ; get the pointer
        ld      pointerl, #Radio3L              ;
        jr      AddAll

SPECIAL_BITS:
        cp      RadioC, #20                     ; test for the switch id
        jr      z,SWITCHID                      ; if so then branch

        ld      RTempH,id_b                     ; save the special bit
        add     id_b,RTempH                     ; *3
        add     id_b,RTempH                     ; *3
        add     id_b,radiobit                   ; add in the new value
        jr      Radio3R

SWITCHID:
        ld      sw_b,radiobit                   ; save the switch ID
        jr      Radio3R

RC1INC:
        tm      RadioMode, #ROLL_MASK           ; if in fixed mode,no number counter
        jr      z,Radio1F
```

A15

```
        tm      RadioC, #00000001b          ; test for even odd number
        jr      nz,COUNT1INC                ; if odd number counter

Radio1INC:                                  ; else radio
        call    GETTRUEFIX                  ; Get the real fixed code

Radio1F:
        srp     #RadioGroup
        ld      pointerh, #Radio1H          ; get the pointer
        ld      pointerl, #Radio1L          ;
        jr      AddAll

GETTRUEFIX:
        ld      prevtmp,radiobit            ; Store "fixed" bit in temp
        sub     radiobit,rollbit            ; Subtract roll from fixed
        jr      nc,NOADJ1                   ; Check for base 3 correction
        add     radiobit, #03               ; Correct back up to base 3
NOADJ1:
        sub     radiobit,prevfix            ; Subtract previous fixed bit
        jr      nc,NOADJ2                   ; Check for base 3 correction
        add     radiobit, #03               ; Correct back up to base 3
NOADJ2:
        ld      prevfix,prevtmp             ; Create new previous fix bit
        ret

COUNT3INC:
        ld      rollbit,radiobit            ; Store the rolling bit
        srp     #RadioGroup
        ld      pointerh, #CounterLoA       ; get the pointer
        ld      pointerl, #CounterLoB       ;
        jr      AddAll

COUNT1INC:
        ld      rollbit,radiobit            ; Store the rolling bit
        srp     #CounterGroup               ;
        ld      mathtemp1,countera          ; Multiply rolling counter by 3
        ld      mathtemp2,counterb          ;
        ld      mathtemp3,counterc          ;
        ld      mathtemp4,counterd          ;
        add     counterd,mathtemp4          ; *2
        adc     counterc,mathtemp3          ;
        adc     counterb,mathtemp2          ;
        adc     countera,mathtemp1          ;
        add     counterd,mathtemp4          ; *3
        adc     counterc,mathtemp3          ;
        adc     counterb,mathtemp2          ;
        adc     countera,mathtemp1          ;

AddLoop:
        cp      RADIOBIT, #00               ; if bit is zero,don't add
        jr      z,ALLADDED                  ; anything to rolling counter
        add     counterd, #0A9h             ; Add 3^10 times the value of
        adc     counterc, #0E6h             ; current bit into high word
        adc     counterb, #00               ;
        adc     countera, #00               ;
        dec     RADIOBIT                    ; Loop until bit has reached 0
        jr      AddLoop                     ;

AddAll:
        ld      addvalueh,@pointerh         ; get the value
        ld      addvaluel,@pointerl         ;
        add     addvaluel,@pointerl         ; add x2
        adc     addvalueh,@pointerh         ;
        add     addvaluel,@pointerl         ; add x3
        adc     addvalueh,@pointerh         ;
        add     addvaluel,RADIOBIT          ; add in new number
        adc     addvalueh, #00h             ;
        ld      @pointerh,addvalueh         ; save the value
        ld      @pointerl,addvaluel         ;
ALLADDED:

        inc     RadioC                      ; increase the counter
FULLWORD?:
        cp      RadioC,MaxBits              ; test for full(10/20 bit)word
        jp      nz,RRETURN                  ; if not then return

        and     CLAMPPORT, #CLAMPLOW        ; Set the clamp to hold the avg. detector

        ;;;;;Disable interrupts until word is handled
        or      SKIPRADIO, #10000000b       ; Set the flag to disable radio interrupts
        di                                  ; DISABLE INTERRUPTS WHEN MODIFYING IMR!!!
        and     IMR, #11011100b             ; turn off the radio interrupt
;                     ||||||└──────── (0) RADIO_INT
```

A16

```
;                       ||||||└──────── (0) not used
;                       |||||└───────── (1) RPM
;                       ||||└────────── (1) AUX_OBS
;                       |||└─────────── (1) TIMERUD
;                       ||└──────────── (0) not used
;                       |└───────────── (1) RAM Protect
;                       └────────────── (1) En/Dis able interrupts

        ei                                      ;
        clr     RadioTimeOut                    ; Reset the blank time
        tm      RFlag, #00010000b               ; test flag for prev word rcvd
        jr      nz,KNOWCODE                     ; if the second word received

FIRST20:
        or      RFlag, #00010000b               ; set the flag
        clr     RadioC                          ; clear the radio counter
        jp      RRETURN                         ; return

KNOWCODE:
        cp      LEARNDB, #0FFh                  ; if setting the mode,
        jp      z,CLEARRADIO                    ; disallow the radio
        tm      RadioMode, #ROLL_MASK           ; if in rolling mode,
        jr      nz,AOrDCode                     ; don't set the B/C code flag
        cp      Radio1H,Radio3H                 ; if two code words received
        jr      nz,AOrDCode                     ; are identical,then code is
        cp      Radio1L,Radio3L                 ; a B code or a C code
        jr      nz,AOrDCode                     ;

BOrCCode:
        or      RFlag, #00000110b               ; Set the B and C code flags
        cp      RADIOBIT, #00h                  ; if the last bit is zero,
        jp      z,ISCCODE                       ; then code is obsolete C code
        and     RFlag, #11111101b               ; Last digit isn't zero,clear C code flag
ISCCODE:
        jr      Know2                           ;

AOrDCode:
        or      RFlag, #00001000b               ; Set A/D code flag

Know2:
        cp      CodeFlag, #SENS_TEST            ; if we're testing sensitivity
        jr      nz,TestForCounter               ; then just toggle the worklight and exit

RollSensTest:
        clr     RTO                             ; Reset the radio drop timer
        xor     P0, #WORKLIGHT                  ; Toggle the worklight
        jp      CLEARRADIO                      ; exit

TestForCounter:
        tm      RadioMode, #ROLL_MASK           ; if not in rolling mode,
        jr      z,CounterCorrected              ; forget the number counter

;*************************************************************************
; Translate the counter back to normal
;*************************************************************************
CombineCounter:
        srp     #CounterGroup                   ; set the group
        add     counterd,counterlob             ; Add low-order counter into
        adc     counterc,counterloa             ; the full 32-bit counter
        adc     counterb, #00                   ;
        adc     countera, #00                   ;

        ; Mirror the rolling code counter

        ld      loopcount, #8                   ; Loop for eight bits
        rcf

MirrorIt1:
        rlc     countera                        ;
        rrc     counterd                        ;
        djnz    loopcount,MirrorIt1             ;
        rlc     countera                        ; Pick up the last bit
        ld      loopcount, #8                   ; Loop for eight bits
        rcf

MirrorIt2:
        rlc     counterb                        ;
        rrc     counterc                        ;
        djnz    loopcount,MirrorIt2             ;
        rlc     counterb                        ; Pick up the last bit

CounterCorrected:
        srp     #RadioGroup                     ;
```

A17

```
        clr     RRTO                        ; clear the got a radio flag
        tm      SKIPRADIO, #01111111b       ; NOEECOMM: test for the skip flag
        jp      nz,CLEARRADIO               ; if skip flag is active then do not look at EE mem
        tm      RFlag, #00000010b           ; if the flag for the obsolete C code is set,
        jp      nz,CLEARRADIO               ; then reject the C Code
        cp      ID_B, #18                   ; if the ID bits total
        jr      ult,NoTCode                 ; more than 18,
        or      RFlag, #00000100b           ; then indicate a touch code

NoTCode:
        cp      CodeFlag, #REGLEARN         ; test for in learn mode
        jp      ult,TESTCODE                ; if out of learn mode then test for matching
        cp      LEARNDB, #080h              ; Test for learn button still held
        jp      uge,STORENOTMATCH           ; if still held,refuse to learn the code
        cp      CodeFlag, #TC_LEARN         ; if we're not learning from touch code,
        jp      nz,STORECODE                ; then learn any transmitter
        tm      RFlag, #00000100b           ; Learning from touch code,so if the code received
        jp      z,CLEARRADIO                ; is not a touch code,then throw it out

STORECODE:
        tm      RadioMode, #ROLL_MASK       ;if we are in fixed mode,
        jr      z,FixedOnly                 ;then don't compare counters

CompareCounters:
        cp      PCounterA,CounterA          ; Test for cntr match to prev
        jp      nz,STORENOTMATCH            ; if no match,try again

        cp      PCounterB,CounterB          ; Test for cntr match to prev
        jp      nz,STORENOTMATCH            ; if no match,try again

        cp      PCounterC,CounterC          ; Test for cntr match to prev
        jp      nz,STORENOTMATCH            ; if no match,try again

        cp      PCounterD,CounterD          ; Test for cntr match to prev
        jp      nz,STORENOTMATCH            ; if no match,try again

FixedOnly:
        cp      PRADIO1H,radio1h            ; test for the match
        jp      nz,STORENOTMATCH            ; if not a match loop again

        cp      PRADIO1L,radio1l            ; test for the match
        jp      nz,STORENOTMATCH            ; if not a match loop again

        cp      PRADIO3H,radio3h            ; test for the match
        jp      nz,STORENOTMATCH            ; if not a match loop again

        cp      PRADIO3L,radio3l            ; test for the match
        jp      nz,STORENOTMATCH            ; if not a match loop again

CMDONLY:
        cp      ID_B, #01                   ; Ignore any light on/off
        jp      z,CLEARRADIO                ; radio codes

        call    TESTCODES                   ; test code to see if in mem
        cp      ADDRESS, #0FFh              ; if the code isn't in memory
        jr      z,STOREMATCH                ;

        dec     ADDRESS                     ;
        jp      READYTOWRITE                ;

STOREMATCH:
        cp      RadioMode, #ROLL_TEST       ; if we are not testing a
        jr      ugt,SameRadioMode           ; new mode,then don't switch
        ld      ADDRESS, #27h               ; MODEADDR: Fetch the old radio mode,
        call    READMEMORY                  ; change only the low order
        tm      RadioMode, #ROLL_MASK       ; byte,and write in its new
        jr      nz,SetAsRoll                ; value.

SetAsFixed:
        ld      RadioMode, #FIXED_MODE      ;
        call    FixedNums                   ; Set the fixed thresholds
        jr      WriteMode                   ; permanently

SetAsRoll:
        ld      RadioMode, #ROLL_MODE       ;
        call    RollNums                    ; Set the rolling thresholds permanently

WriteMode:
        ld      MTEMPL,RadioMode            ;
        call    WRITEMEMORY                 ;

SameRadioMode:
        tm      RFlag, #00000100b           ; test for the b code
```

A18

```
        jr      nz,BCODE                        ; if a B code jump

ACODE:
        ld      ADDRESS, #2Bh                   ; set the address to read the last written
        call    READMEMORY                      ; read the memory
        inc     MTEMPH                          ; add 2 to the last written
        inc     MTEMPH                          ;
        tm      RadioMode, #ROLL_MASK           ; if radio is in fixed mode,
        jr      z,FixedMem                      ; then handle the fixed mode memory

RollMem:
        inc     MTEMPH                          ; Add another 2 to the
        inc     MTEMPH                          ; last written
        and     MTEMPH, #11111100b              ; Set to a multiple of four
        cp      MTEMPH, #1Fh                    ; test for the last address
        jr      ult,GOTAADDRESS                 ; if not the last address jump
        jr      AddressZero                     ; Address is now zero

FixedMem:
        and     MTEMPH, #11111110b              ; set address on a even number
        cp      MTEMPH, #17h                    ; test for the last address
        jr      ult,GOTAADDRESS                 ; if not the last address jump

AddressZero:
        ld      MTEMPH, #00                     ; set the address to 0

GOTAADDRESS:
        ld      ADDRESS, #2Bh                   ; set the address to write the last written
        ld      RTemp,MTEMPH                    ; save the address
        LD      MTEMPL,MTEMPH                   ; both bytes same
        call    WRITEMEMORY                     ; write it
        ld      ADDRESS,rtemp                   ; set the address
        jr      READYTOWRITE                    ;

BCODE:
        tm      RadioMode, #ROLL_MASK           ; if in fixed mode,
        jr      z,BFixed                        ; handle normal touch code

BRoll:
        cp      Radio1H, #04Ch                  ; If we are greater than 3^9,
        jp      ugt,CLEARRADIO                  ; then the touch code has a non-zero
        jr      ult,GotRollTC                   ; switch bit -- don't learn it
        cp      Radio1L, #0E3h                  ;
        jp      uge,CLEARRADIO                  ;

GotRollTC:
        cp      CodeFlag, #TC_LEARN             ; if we're not learning from touch code,
        jr      nz,StoreRollB                   ; learn any touch code

CheckSame:
        ld      ADDRESS, #TOUCHID               ; Otherwise,only re-learn
        call    READMEMORY                      ; from the same touch code

CheckSameID:
        cp      MTEMPH,Radio3H                  ; if the ID code is not the
        jp      nz,CLEARRADIO                   ; same,wrong touch code
        cp      MTEMPL,Radio3L                  ;
        jp      nz,CLEARRADIO                   ;

CheckSameCount:
        call    TestCounter                     ; Test rolling code counter
        cp      CMP, #FWDWIN                    ; if not in the proper range,
        jp      nz,CLEARRADIO                   ; this is the wrong touch code

StoreRollB:
        ld      ADDRESS, #20h                   ; Set the address for the
        jr      READYTOWRITE                    ; rolling touch code

BFixed:
        cp      radio3h, #90h                   ; test for the 00 code
        jr      nz,BCODEOK                      ;
        cp      radio3l, #29h                   ; test for the 00 code
        jr      nz,BCODEOK                      ;
        jp      CLEARRADIO                      ; SKIP MAGIC NUMBER

BCODEOK:
        ld      ADDRESS, #18h                   ; set the address for the B code

READYTOWRITE:
        call    WRITECODE                       ; write code in radio1 and radio3

NOFIXSTORE:
        tm      RadioMode, #ROLL_MASK           ; if we are in fixed mode,
```

A19

```
        jr      z,NOWRITESTORE              ; then we are done
        inc     ADDRESS                     ; Point to the counter address
        ld      Radio1H,CounterA            ; Store counter into the radio
        ld      Radio1L,CounterB            ; for the writecode routine
        ld      Radio3H,CounterC            ;
        ld      Radio3L,CounterD            ;
        call    WRITECODE

NOWRITESTORE:
        xor     P0, #WORKLIGHT              ; toggle light
        or      ledport, #ledh              ; turn off LED for program
        ld      LIGHT1S, #244               ; turn on the 1 second blink
        ld      LEARNT, #0FFh               ; set learnmode timer
        clr     RTO                         ; disallow cmd from learn
        clr     CodeFlag                    ; Clear any learning flags
        jp      CLEARRADIO                  ; return

STORENOTMATCH:
        ld      PRADIO1H,radio1h            ; transfer radio into past
        ld      PRADIO1L,radio1l            ;
        ld      PRADIO3H,radio3h            ;
        ld      PRADIO3L,radio3l            ;
        tm      RadioMode, #ROLL_MASK       ; if we are in fixed mode,
        jp      z,CLEARRADIO                ; get the next code
        ld      PCounterA,CounterA          ; transfer counter into past
        ld      PCounterB,CounterB          ;
        ld      PCounterC,CounterC          ;
        ld      PCounterD,CounterD          ;
        jp      CLEARRADIO

TESTCODE:
        cp      ID_B, #18                   ; if this was a touch code,
        jp      uge,TCReceived              ; handle appropriately
        cp      ID_B, #01                   ; if this is light on/off tx,
        jp      z,CLEARRADIO                ; then ignore its function
        cp      ID_B, #02                   ; if this is an ODI signal,
        jp      z,ODITrans                  ; then handle separately
        tm      RFlag, #00000100b           ; if we have rxd a B code,
        jr      z,AorDCode                  ; then check for learn mode
        cp      ZZWIN, #64                  ; Test 0000 learn window
        jr      ugt,AorDCode                ; if out of window no learn
        cp      Radio1H, #90h               ;
        jr      nz,AorDCode                 ;
        cp      Radio1L, #29h               ;
        jr      nz,AorDCode                 ;

ZZLearn:
        clr     LEARNT                      ; Start the learn timer
        ld      CodeFlag, #TC_LEARN         ; Set mode as touch code learn
        and     ledport, #ledl              ; Turn on the learn LED
        jp      CLEARRADIO

AorDCode:
        cp      FAULTFLAG, #0FFh            ; test for a active fault
        jr      z,FS1                       ; if so skip led set and reset
        and     ledport, #ledl              ; turn on the LED for flashing from signal

FS1:
        call    TESTCODES                   ; test the codes
        cp      FAULTFLAG, #0FFh            ; test for a activ  fault
        jr      z,FS2                       ; if so skip led s   and reset
        or      ledport, #ledh              ; turn off the LED for flashing from signal
FS2:
        cp      ADDRESS, #0FFh              ; test for not matching state
        jr      nz,GOTMATCH                 ; if matching then send a command if needed
        jp      CLEARRADIO                  ; clear the radio

GOTMATCH:
        cp      CodeFlag, #RANGETEST        ; if we're testing radio range
        jr      nz,TestTheCounter           ; then just toggle the worklight and exit

RollRangeTest:
        clr     RTO                         ; Reset the drop-out timer
        xor     P0, #WORKLIGHT              ; Toggle the worklight
        jp      NOTNEWMATCH                 ; exit

TestTheCounter:
        tm      RadioMode, #ROLL_MASK       ; if we are in fixed mode,
        jr      z,MatchGood2                ; then match is already valid
        call    TestCounter                 ; Rolling mode -- compare the counter values
        cp      CMP, #EQUAL                 ; if the code is equal,
        jp      z,NOTNEWMATCH               ; then just keep it
        cp      CMP, #FWDWIN                ; if not in forward window,
```

A20

```
        jp      nz,CheckPast                    ; then forget the code

MatchGood:
        ld      Radio1H,CounterA                ; Store the counter into mem
        ld      Radio1L,CounterB                ; to keep the roll current
        ld      Radio3H,CounterC                ;
        ld      Radio3L,CounterD                ;
        dec     ADDRESS                         ; Line up address for writing
        call    WRITECODE                       ;

MatchGood2:
        or      RFlag, #00000001b               ; set flag for rx without err
        cp      RTO, #RDROPTIME                 ; test for the timer time out
        jp      ult,NOTNEWMATCH                 ; if timer is active then do not reissue cmd

TSTSDISABLE:
        cp      SDISABLE, #32                   ; test for 4 second
        jp      ult,NOTNEWMATCH                 ; if 6 s not up not a new code
        cp      DisableRadioFlag, #0FFh                 ; if radio is disabled,
        jp      z,CLEARRADIO                    ; then ignore the code
        clr     RTO                             ; clear the radio timeout
        cp      ONEP2, #00                      ; test for 1.2 second time out
        jp      nz,NOTNEWMATCH                  ; if the timer is active then skip the command

RADIOCOMMAND:
        clr     RTO                             ; clear the radio timeout
        tm      RFlag, #00000100b               ; test for a B code
        jr      z,NoKeylessSafetyDelay          ; if not b code donot set flag

zzwinclr:
        clr     ZZWIN                           ; flag got matching B code
        ld      CodeFlag, #BRECEIVED            ; flag for aobs bypass
        jr      TestIRForKeylessDelay           ; then test IR's
        cp      CB2IRFLAG, #0FFh                        ; if CB2 is using IR's
        jr      z,TestIRForKeylessDelay         ; then use IR's for delay

UseEdgeForKeylessDelay:
        cp      DoorEdgeDeb, #080h              ; if edge is set,
        jr      ult,NoKeylessSafetyDelay        ; then use the delay
        jr      UseKeylessSafetyDelay

TestIRForKeylessDelay:
        tm      AOBSF, #00001000b               ; IR's are broken,
;                         └──────────── protector reverse
        jr      z,NoKeylessSafetyDelay          ; start the delay timer

UseKeylessSafetyDelay:
        clr     SafetyDelay                     ; start the timer

NoKeylessSafetyDelay:
        clr     LAST_CMD                        ; mark last command as radio
        ld      RADIO_CMD, #0AAh                ; set the radio command
        jp      CLEARRADIO                      ; return

TESTCODES:
        clr     ADDRESS                         ; start address is 0

NEXTCODE:
        call    READMEMORY                      ; read word at this address
        cp      MTEMPH,radio1h                  ; test for the match
        jr      nz,NOMATCH                      ; if no match do next address
        cp      MTEMPL,radio1l                  ; test for the match
        jr      nz,NOMATCH                      ; if no match do next address
        inc     ADDRESS                         ; set second half of the code
        call    READMEMORY                      ; read word at this address
        cp      MTEMPH,radio3h                  ; test for the match
        jr      nz,NOMATCH2                     ; if no match do next address
        cp      MTEMPL,radio3l                  ; test for the match
        jr      nz,NOMATCH2                     ; if no match do next address
        ret                                     ; return with the address of the match

NOMATCH:
        inc     ADDRESS                         ; set address to next code

NOMATCH2:
        inc     ADDRESS                         ; set address to next code
        tm      RadioMode, #ROLL_MASK           ; if we are in fixed mode,
        jr      z,AtNextAdd                     ; then we are at next address
        inc     ADDRESS                         ; Roll mode -- advance past
        inc     ADDRESS                         ; the counter
        cp      ADDRESS, #10h                   ; if we are on the second page
        jr      nz,AtNextAdd                    ; then get the other tx. types
```

A21

```
AtNextAdd:
        cp      ADDRESS, #22h           ; test for the last address
        jr      ult,NEXTCODE            ; if not last addr try again

GOTNOMATCH:
        ld      ADDRESS, #0FFh          ; set the no match flag
        ret                             ; and return

NOTNEWMATCH:
        clr     RTO                     ; reset the radio time out
        and     RFlag, #00000001b       ; clear radio flags leaving recieving w/o error
        clr     radioc                  ; clear the radio bit counter
        jp      RADIO_EXIT              ; return

CheckPast:
        cp      CMP, #BACKWIN           ; if we were in backwards win,
        jr      z,CLEARRADIO            ; then don't attempt to resync
        cp      LastMatch,ADDRESS       ; if current & previous fixed don't match,
        jr      nz,UpdatePast           ; then don't resync
        sub     PCounterD,CounterD      ; Compare the two counters
        sbc     PCounterC,CounterC
        sbc     PCounterB,CounterB
        sbc     PCounterA,CounterA
        cp      PCounterA, #0FFh        ; if the counters differ by
        jr      nz,UpdatePast           ; more than four
        cp      PCounterB, #0FFh        ; (i.e. if the past counter
        jr      nz,UpdatePast           ; minus the current counter
        cp      PCounterC, #0FFh        ; is < -4),then don't resync
        jr      nz,UpdatePast
        cp      PCounterD, #0FCh
        jr      ult,UpdatePast

ReSync:
        jp      MatchGood               ; Set radio as cmd received

UpdatePast:
        ld      LastMatch,ADDRESS       ; Store last fixed code rcvd
        ld      PCounterA,CounterA      ; Store last counter received
        ld      PCounterB,CounterB
        ld      PCounterC,CounterC
        ld      PCounterD,CounterD

CLEARRADIO2:
        ld      LEARNT, #0FFh           ; Turn off learn mode timer
        clr     CodeFlag

CLEARRADIO:
        and     IRQ, #00111111b         ; clear the bit setting direction to neg edge
        ld      RINFILTER, #0FFh        ; set flag to active

CLEARRADIOA:
        tm      RFlag, #00000001b       ; test for rcv without error
        jr      z,SKIPRTO               ; if flag not set then donot clear timer
        clr     RTO                     ; clear radio timer

SKIPRTO:
        clr     radioc                  ; clear the radio counter
        clr     RFlag                   ; clear the radio flag
        jp      RADIO_EXIT              ; return

TCReceived:
        clr     SW_B                    ; Initially set switch bit at0
        cp      FAULTFLAG, #0FFh        ; if no fault
        jr      z,TestTruncate          ; turn on the led
        and     ledport, #ledl
        jr      TestTruncate            ; Truncate off most significant digit

TruncTC:
        inc     SW_B                    ; Switch bit is one higher
        sub     Radio1L, #0E3h          ; Subtract out 3^9 to truncate
        sbc     Radio1H, #04Ch

TestTruncate:
        cp      Radio1H, #04Ch          ; if we are greater than 3^9,
        jr      ugt,TruncTC             ; truncate down
        jr      ult,GotTC
        cp      Radio1L, #0E3h
        jr      uge,TruncTC

GotTC:
        ld      ADDRESS, #TOUCHID       ; Check to make sure the ID
        call    READMEMORY              ; code is good
        cp      FAULTFLAG, #0FFh        ; if no fault,
```

A22

```
        jr      z,CheckID                   ; turn off the LED
        or      ledport, #ledh

CheckID:
        cp      MTEMPH,Radio3H
        jr      nz,CLEARRADIO
        cp      MTEMPL,Radio3L
        jr      nz,CLEARRADIO
        call    TestCounter                 ; Test rolling code counter
        cp      CMP, #EQUAL                 ; if the counter is equal,
        jp      z,NOTNEWMATCH               ; then call it the same code
        cp      CMP, #FWDWIN
        jr      nz,CLEARRADIO

        ; Counter good -- update it

        ld      MathTemp1,Radio1H           ; Back up radio code
        ld      MathTemp2,Radio1L

        ld      Radio1H,CounterA            ; Write the counter
        ld      Radio1L,CounterB
        ld      Radio3H,CounterC
        ld      Radio3L,CounterD
        dec     ADDRESS
        call    WRITECODE
        ld      Radio1H,MathTemp1           ; Restore the radio code
        ld      Radio1L,MathTemp2
        cp      CodeFlag, #NORMAL           ; Find & jump to current mode
        jr      z,NormTC
        cp      CodeFlag, #LRNTEMP
        jp      z,LearnTMP
        cp      CodeFlag, #LRNDURTN
        jp      z,LearnDur
        jp      CLEARRADIO

NormTC:
        ld      ADDRESS, #TOUCHPERM         ; Compare the four-digit touch
        call    READMEMORY                  ; code to permanent password
        cp      Radio1H,MTEMPH
        jr      nz,CheckTCTemp
        cp      Radio1L,MTEMPL
        jr      nz,CheckTCTemp
        cp      SW_B, #ENTER                ; if the ENTER key pressed,
        jp      z,RADIOCOMMAND              ; issue B code radio command
        cp      SW_B, #POUND                ; if user pressed pound key,
        jr      z,TCLearn                   ; enter the learn mode
        ; Star key pressed -- start 30 s timer

        clr     LEARNT
        ld      FLASH_COUNTER, #06h         ; Blink the worklight three
        ld      FLASH_DELAY, #FLASH_TIME    ; times quickly
        ld      FLASH_FLAG, #0FFh
        ld      CodeFlag, #LRNTEMP          ; Enter learn temporary mode
        jp      CLEARRADIO

TCLearn:
        ld      FLASH_COUNTER, #04h         ; Blink the worklight two
        ld      FLASH_DELAY, #FLASH_TIME    ; times quickly
        ld      FLASH_FLAG, #0FFh
        clr     LEARNT                      ; Start the learn timer
        ld      CodeFlag, #TC_LEARN         ; Set mode as touch code learn
        and     ledport, #ledl              ; Turn on the learn LED
        jp      CLEARRADIO

CheckTCTemp:
        ld      ADDRESS, #TOUCHTEMP         ; Compare the four-digit touch
        call    READMEMORY                  ; code to temporary password
        cp      Radio1H,MTEMPH
        jp      nz,CLEARRADIO
        cp      Radio1L,MTEMPL
        jp      nz,CLEARRADIO
        cp      STATE, #DN_POSITION         ; if we are not at down limit,
        jp      nz,RADIOCOMMAND             ; issue a command regardless
        ld      ADDRESS, #DURAT             ; if the duration is at zero,
        call    READMEMORY                  ; then don't issue a command
        cp      MTEMPL, #00
        jp      z,CLEARRADIO

        cp      MTEMPH, #ACTIVATIONS        ; if in number of activations
        jp      nz,RADIOCOMMAND             ; mode,then decrement the
        dec     MTEMPL                      ; number of activations left
        call    WRITEMEMORY
        jp      RADIOCOMMAND
```

A23

S:\SHARED\CDO\Lgo_Rjo\RJO - Study\Code\Final0301.s
Printed at 09:38 on 10 Apr 2001 Page 24 of 52

```
LearnTMP:
        cp      SW_B, #ENTER               ; if user pressed a key other
        jp      nz,CLEARRADIO              ; then enter,reject the code

        ld      ADDRESS, #TOUCHPERM        ; if code entered matches the
        call    READMEMORY                 ; permanent touch code,
        cp      Radio1H,MTEMPH             ; then reject the code as a
        jp      nz,TempGood                ; temporary code
        cp      Radio1L,MTEMPL
        jp      z,CLEARRADIO

TempGood:
        ld      ADDRESS, #TOUCHTEMP        ; Write the code into temp.
        ld      MTEMPH,Radio1H             ; code memory
        ld      MTEMPL,Radio1L
        call    WRITEMEMORY
        ld      FLASH_COUNTER, #08h        ; Blink the worklight four
        ld      FLASH_DELAY, #FLASH_TIME   ; times quickly
        ld      FLASH_FLAG, #0FFh

        ; Start 30 s timer

        clr     LEARNT
        ld      CodeFlag, #LRNDURTN        ; Enter learn duration mode
        jp      CLEARRADIO

LearnDur:

        cp      Radio1H, #00               ; if the duration was > 255,
        jp      nz,CLEARRADIO              ; reject the duration entered
        cp      SW_B, #POUND               ; if user pressed the pound
        jr      z,NumDuration              ; key, # of activations mode
        cp      SW_B, #STAR                ; if the star key was pressed,
        jr      z,HoursDur                 ; enter the timer mode
        jp      CLEARRADIO                 ; Enter pressed -- reject code

NumDuration:
        ld      MTEMPH, #ACTIVATIONS       ; Flag # of activations mode
        jr      DurationIn

HoursDur:
        ld      MTEMPH, #HOURS             ; Flag number of hours mode

DurationIn:
        ld      MTEMPL,Radio1L             ; Load in duration
        ld      ADDRESS, #DURAT            ; Write duration and mode
        call    WRITEMEMORY                ; into nonvolatile memory

        ; Give worklight one long blink
        xor     P0, #WORKLIGHT             ; Give the light one blink
        ld      LIGHT1S, #244              ; lasting one second
        clr     CodeFlag                   ; Clear the learn flag
        jp      CLEARRADIO
;---------------------------------------------------------------------
;       Handle an Open Door Indicator
;---------------------------------------------------------------------
ODITrans:
        sub     Radio3L,SW_B               ; Remove the switch bit when
        sbc     Radio3H, #00               ; testing for a match
        ld      ADDRESS, #GDOIDAddr        ; Compare the radio code to
        call    READMEMORY                 ; the code stored in EEPROM
        cp      MTEMPH,Radio1H
        jr      nz,NoODIMatch
        cp      MTEMPL,Radio1L
        jr      nz,NoODIMatch
        inc     ADDRESS
        call    READMEMORY                 ; Fetch the lower word
        cp      MTEMPH,Radio3H
        jr      nz,NoODIMatch
        cp      MTEMPL,Radio3L
        jr      nz,NoODIMatch

ODIMatch:
        or      ODIFLAG, #00000100b        ; Set the flag for ODI tx rcvd
        or      ODIFLAG,SW_B               ; Put switch bit into flags
NoODIMatch:
        jp      CLEARRADIO
;---------------------------------------------------------------------
;       Test Rolling Code Counter Subroutine
;       Note: CounterA-D will be used as temp registers
;---------------------------------------------------------------------
TestCounter:
```

A24

```
        inc     ADDRESS                         ; Point to rolling counter
        call    READMEMORY                      ; Fetch lower word of counter
        ld      CounterLoA,MTEMPH
        ld      CounterLoB,MTEMPL
        inc     ADDRESS                         ; Point to rest of the counter
        call    READMEMORY                      ; Fetch upper word of counter

;--------------------------------------------------------
;       Subtract old counter (countera-d) from current
;       counter (mirrora-d) and store in countera-d
;--------------------------------------------------------

        com     CounterLoA              ; Obtain 2's comp of counter
        com     CounterLoB
        com     MTEMPH
        com     MTEMPL
        add     MTEMPL, #01h
        adc     MTEMPH. #00h
        adc     CounterLoB, #00h
        adc     CounterLoA, #00h

        add     MTEMPL,CounterD                 ; Subtract
        adc     MTEMPH,CounterC
        adc     CounterLoB,CounterB
        adc     CounterLoA,CounterA

;--------------------------------------------------------
;       If the msb of counterd is negative,check to see
;       if we are inside the negative window
;--------------------------------------------------------

        tm      CounterLoA, #10000000b
        jr      z,CheckFwdWin

CheckBackWin:
        cp      CounterLoA, #0FFh               ; Check to see if we are
        jr      nz,OutOfWindow                  ; less than -0400h
        cp      CounterLoB, #0FFh               ; (i.e. are we greater than
        jr      nz,OutOfWindow                  ; 0xFFFFFC00h)
        cp      MTEMPH, #0FCh                   ;
        jr      ult,OutOfWindow                 ;

InBackWin:
        ld      CMP, #BACKWIN                   ; Return in back window
        jr      CompDone

CheckFwdWin:
        cp      CounterLoA, #00h                ; Check to see if we are less
        jr      nz,OutOfWindow                  ; than 0C00 (3072 = 1024
        cp      CounterLoB, #00h                ; activations)
        jr      nz,OutOfWindow
        cp      MTEMPH, #0Ch
        jr      uge,OutOfWindow
        cp      MTEMPH, #00h
        jr      nz,InFwdWin
        cp      MTEMPL, #00h
        jr      nz,InFwdWin

CountersEqual:
        ld      CMP, #EQUAL                     ; Return equal counters
        jr      CompDone

InFwdWin:
        ld      CMP, #FWDWIN                    ; Return in forward window
        jr      CompDone

OutOfWindow:
        ld      CMP, #OUTOFWIN                  ; Return out of any window

CompDone:
        ret
;**********************************************************************
; Clear interrupt
;**********************************************************************
ClearRadio:
        cp      RadioMode, #ROLL_TEST           ; if in fixed or rolling mode,
        jr      ugt,MODEDONE                    ; then we cannot switch
        tm      T125MS, #00000001b              ; if 'coin toss' was a zero,
        jr      z,SETROLL                       ; set as the rolling mode

SETFIXED:
        ld      RadioMode, #FIXED_TEST
        call    FixedNums
```

A25

```
        jp      MODEDONE

SETROLL:
        ld      RadioMode, #ROLL_TEST
        call    RollNums

MODEDONE:
        clr     RadioTimeOut                ; clear radio timer
        clr     RadioC                      ; clear the radio counter
        clr     RFlag                       ; clear the radio flags

RRETURN:
        pop     RP                          ; reset the RP
        iret                                ; return

FixedNums:
        ld      BitThresh, #FIXTHR
        ld      SyncThresh, #FIXSYNC
        ld      MaxBits, #FIXBITS
        ret

RollNums:
        ld      BitThresh, #DTHR
        ld      SyncThresh, #DSYNC
        ld      MaxBits, #DBITS
        ret

;*********************************************************************
; LEARN DEBOUNCES THE LEARN SWITCH 80mS TIMES OUT THE LEARN MODE 30 SECONDS
; DEBOUNCES THE LEARN SWITCH FOR ERASE 6 SECONDS
;*********************************************************************
LEARN:
        srp     #LEARNEE_GRP                ; set the register pointer
        cp      STATE, #DN_POSITION         ; test for motor stoped
        jr      z,TESTLEARN
        cp      STATE, #UP_POSITION         ; test for motor stoped
        jr      z,TESTLEARN
        cp      STATE, #STOP                ; test for motor stoped
        jr      z,TESTLEARN
        cp      learnt, #240                ; test for the learn 30 second timeout
        jr      nz,ERASETEST                ; if not then test erase
        jr      learnoff                    ; if 30 seconds then turn off the learn mode

TESTLEARN:
        cp      learndb, #128               ; if below 128,
        jr      ult,LEARNNOTRELEASED        ; then lock for switch close
        cp      learndb, #236               ; test for the debounced release
        jr      ugt,ERASETEST               ; if debouncer not released then jump
        clr     learndb                     ; clear the debouncer
        ret                                 ; return

LEARNNOTRELEASED:
        cp      CodeFlag, #LRNTEMP          ; test for learn mode
        jr      uge,INLEARN                 ; if in learn jump
        cp      learndb, #20                ; test for debounce period
        jr      nz,ERASETEST                ; if not then test erase time

SETLEARN:
        cp      LEARNDB, #0FFh              ; if we were setting the mode,
        jr      z,ExitModeSetting           ; learn exits
        clr     learnt                      ; clear the learn timer
        ld      CodeFlag, #REGLEARN         ; Set the learn flag
        ld      learndb, #0FFh              ; set the debouncer
        and     ledport, #ledl              ; turn on the led

ERASETEST:
        cp      learndb, #0FFh              ; test for learn button active
        jr      nz,ERASERELEASE             ; if released set erase timer
        cp      eraset, #0FFh               ; test for timer active
        jr      nz,ERASETIMING              ; if the timer active jump
        clr     eraset                      ; clear the erase timer

ERASETIMING:
        cp      eraset, #48                 ; test for the erase period
        jr      z,ERASETIME                 ; if timed out the erase
        ret                         ; else we return

ERASETIME:
        or      ledport, #ledh              ; turn off the led
        ld      skipradio, #01111111b       ; NOEECOMM: set flag to skip radio read
        call    CLEARCODES                  ; clear all codes in memory
        clr     skipradio                   ; reset the flag to skip radio
```

A26

```
        ld      learnt, #0FFh                   ; set the learn timer
        clr     CodeFlag
        ret                                     ; return

ExitModeSetting:
        clr     LEARNDB                 ; Exit mode setting
        ld      learndb, #0FFh          ; set the debouncer
        or      ledport, #ledh          ; Ensure LED is off
        ret

ERASERELEASE:
        ld      eraset, #0FFh           ; turn off the erase timer
        ret                             ; return

INLEARN:
        cp      learndb, #20                    ; test for the debounce period
        jr      nz,TESTLEARNTIMER               ; if not then test the learn timer for time out
        ld      learndb, #0FFh          ; set the learn db
TESTLEARNTIMER:
        cp      learnt, #240            ; test for the learn 30 second timeout
        jr      nz,ERASETEST                    ; if not then test erase

learnoff:
        or      ledport, #ledh                  ; turn off the led
        ld      learnt, #0FFh                   ; set the learn timer
        ld      learndb, #0FFh                  ; set the learn debounce
        clr     CodeFlag                        ; Clear ANY code types
        jr      ERASETEST                       ; test the erase timer

;*********************************************************************
; WRITE WORD TO MEMORY ADDRESS IS SET IN REG ADDRESS
; DATA IS IN REG MTEMPH AND MTEMPL RETURN ADDRESS IS UNCHANGED
;*********************************************************************
WRITEMEMORY:
        push    RP                              ; SAVE THE RP
        srp     #LEARNEE_GRP                    ; set the register pointer
        call    STARTB                          ; output the start bit
        ld      serial, #00110000b              ; set byte to enable write
        call    SERIALOUT               ; output the byte
        and     csport, #csl            ; reset the chip select
        call    STARTB                  ; output the start bit
        ld      serial, #01000000b       ; set the byte for write
        or      serial,address          ; or in the address
        call    SERIALOUT               ; output the byte
        ld      serial,mtemph           ; set the first byte to write
        call    SERIALOUT               ; output the byte
        ld      serial,mtempl           ; set the second byte to write
        call    SERIALOUT               ; output the byte
        call    ENDWRITE                ; wait for the ready status
        call    STARTB                  ; output the start bit
        ld      serial, #00000000b       ; set byte to disable write
        call    SERIALOUT               ; output the byte
        and     csport, #csl            ; reset the chip select
        pop     RP                      ; reset the RP
        ret

;*********************************************************************
; Read a word from memory:
; Receives: ADDRESS (3Ah)
;
; Returns: DATA in MTEMPH (36h)
;          MTEMPL (37h)
;*********************************************************************
READMEMORY:
        push    RP
        srp     #LEARNEE_GRP            ; set the register pointer
        call    STARTB                  ; output the start bit
        ld      serial, #10000000b       ; preamble for read
        or      serial,address          ; or in the address
        call    SERIALOUT               ; output the byte
        call    SERIALIN                ; read the first byte
        ld      mtemph,serial           ; save the value in mtemph
        call    SERIALIN                ; read teh second byte
        ld      mtempl,serial           ; save the value in mtempl
        and     csport, #csl            ; reset the chip select
        pop     RP                      ;
        ret

;*********************************************************************
; WRITE CODE TO 2 MEMORY ADDRESS
; CODE IS IN RADIO1H RADIO1L RADIO3H RADIO3L
;*********************************************************************
WRITECODE:
```

A27

```
        push    RP                              ;
        srp     #LEARNEE_GRP                    ; set the register pointer
        ld      mtemph,Radio1H                  ; transfer the data from
        ld      mtempl,Radio1L                  ; radio 1to the temps
        call    WRITEMEMORY                     ; write the temp bits
        inc     address                         ; next address
        ld      mtemph,Radio3H                  ; transfer the data from
        ld      mtempl,Radio3L                  ; radio 3 to the temps
        call    WRITEMEMORY                     ; write the temps
        pop     RP                              ;
        ret                                     ; return

;**********************************************************************
; CLEAR ALL RADIO CODES IN THE MEMORY
;**********************************************************************
CLEARCODES:
        push    RP
        srp     #LEARNEE_GRP                    ; set the register pointer
        ld      MTEMPH, #0FFh                   ; set codes to illegal codes
        ld      MTEMPL, #0FFh
        ld      address, #00h                   ; clear address 0

CLEARC:
        call    WRITEMEMORY                     ; "AO"
        inc     address                         ; set the next address
        cp      address, #(AddressCounter - 1)  ; test for last addr of radio
        jr      ult,CLEARC
        clr     mtemph                          ; clear data
        clr     mtempl
        call    WRITEMEMORY                     ; Clear radio types
        ld      address, #AddressAPointer       ; clear address F
        call    WRITEMEMORY

        ld      address, #27h                   ; MODEADDR: Set EEPROM mem as fixed test
        call    READMEMORY                      ; Fetch present value
        clr     MTEMPL                          ; Clear lower byte,clear radio while
        call    WRITEMEMORY                     ; leaving IRs uneffected

        ld      RadioMode, #FIXED_TEST          ; Revert to fixed mode testing
        ld      BitThresh, #FIXTHR
        ld      SyncThresh, #FIXSYNC
        ld      MaxBits, #FIXBITS

CodesCleared:
        pop     RP
        ret

;**********************************************************************
; START BIT FOR SERIAL NONVOL
; ALSO SETS DATA DIRECTION AND AND CS
;**********************************************************************
STARTB:
        and     csport, #csl
        and     clkport, #clockl                ; start by clearing the bits
        and     dioport, #dol
        and     P2M_SHADOW, #~P2M_EEDIR         ; Set port 2 mode to output
        ld      P2M,p2m_shadow                  ; set port 2 mode to output
        or      csport, #csh                    ; set the chip select
        or      dioport, #doh                   ; set the data out high
        or      clkport, #clockh                ; set the clock
        and     clkport, #clockl                ; reset the clock low
        and     dioport, #dol                   ; set the data low
        ret
;**********************************************************************
; END OF CODE WRITE
;**********************************************************************
ENDWRITE:
        and     csport, #csl                    ; reset the chip select
        nop                                     ; delay
        or      csport, #csh                    ; set the chip select
        or      P2M_SHADOW, #P2M_EEDIR          ; Set port 2 mode to input
        ld      P2M,p2m_shadow                  ; set port 2 mode to input

ENDWRITELOOP:
        ld      temph,dioport                   ; read the port
        and     temph, #doh                     ; mask
        jr      z,ENDWRITELOOP                  ; if bit is low loop till done
        and     csport, #csl                    ; reset the chip select
        and     P2M_SHADOW, #~P2M_EEDIR         ; Set data direction to output
        ld      P2M,p2m_shadow                  ; set port 2 mode to output
        ret
;**********************************************************************
; SERIAL OUT
```

A28

```
; OUTPUT THE BYTE IN SERIAL
;***********************************************************************
SERIALOUT:
        and     P2M_SHADOW, #~P2M_EEDIR         ; Set data direction to output
        ld      P2M,p2m_shadow                  ; set port 2 mode to output
        ld      templ, #8h                      ; set the count for eight bits

SERIALOUTLOOP:
        rlc     serial                          ; get bit to output into carry
        jr      nc,ZEROOUT                      ; output a zero if no carry

ONEOUT:
        or      dioport, #doh                   ; set the data out high
        or      clkport, #clockh                ; set the clock high
        and     clkport, #clockl                ; reset the clock low
        and     dioport, #dol                   ; reset the data out low
        djnz    templ,SERIALOUTLOOP             ; loop till done
        ret                                     ; return

ZEROOUT:
        and     dioport, #dol                   ; reset the data out low
        or      clkport, #clockh                ; set the clock high
        and     clkport, #clockl                ; reset the clock low
        and     dioport, #dol                   ; reset the data out low
        djnz    templ,SERIALOUTLOOP             ; loop till done
        ret
;***********************************************************************
; SERIAL IN
; INPUTS A BYTE TO SERIAL
;***********************************************************************
SERIALIN:
        or      P2M_SHADOW, #P2M_EEDIR          ; Set data direction to input
        ld      P2M,p2m_shadow                  ; set port 2 mode to input
        ld      templ, #8h                      ; set the count for eight bits

SERIALINLOOP:
        or      clkport, #clockh                ; set the clock high
        rcf                                     ; reset the carry flag
        ld      temph,dioport                   ; read the port
        and     temph, #doh                     ; mask out the bits
        jr      z,DONTSET
        scf                                     ; set the carry flag

DONTSET:
        rlc     serial                          ; get the bit into the byte
        and     clkport, #clockl                ; reset the clock low
        djnz    templ,SERIALINLOOP              ; loop till done
        ret
;***********************************************************************
; TIMER 0 - UPDATE FROM INTERUPT EVERY 0.256mS
;***********************************************************************
TIMERUD:
        tm      SKIPRADIO, #10000000b           ; test flag to skip radio read
        jr      nz,NoEnable                     ; if set,just leave
        or      IMR, #00000001b                 ; turn on the radio
;                      ||||||└────── (1) RADIO_INT
;                      |||||└─────── (0) not used
;                      ||||└──────── (0) RPM
;                      |||└───────── (0) AUX_OBS
;                      ||└────────── (0) TIMERUD
;                      |└─────────── (0) not used
;                      └──────────── (0) En/Dis RAM Protect
;                      └──────────── (0) En/Dis able interrupts

NoEnable:
        dec     T0EXT                           ; decrement (3Bh) the T0 extension
        tm      T0EXT, #00000001b               ; skip everyother pulse
        jr      nz,MeasurePots                  ;
        inc     TASKSWITCH                      ; (1Dh) set to the next switch
        and     TASKSWITCH, #00000111b          ; 0-7
        ei                                      ; Flush any pending
        di                                      ; interrupts
        tm      TASKSWITCH, #00000001b          ; test for odd tasks
        jp      nz,TASK1357                     ; if so then jump to odd tasks

;-----------------------------------------------------------------------
; Even Tasks 0,2,4,6
;-----------------------------------------------------------------------
        cp      TASKSWITCH, #2                  ; test for 2
        jr      z,TASK2
        cp      TASKSWITCH, #4                  ; test for 4
        jr      z,TASK4
        cp      TASKSWITCH, #6                  ; test for 6
```

A29

```
        jr      z,TASK6

TASK0:
        or      IMR, #00011100b         ; turn on the interrupt
;                     ||||||└──────── (0) RADIO_INT
;                     |||||└───────── (1) not used
;                     ||||└────────── (1) RPM
;                     |||└─────────── (1) AUX_OBS
;                     ||└──────────── (1) TIMERUD
;                     |└───────────── (1) not used
;                     |└───────────── (0) En/Dis RAM Protect
;                     └────────────── (0) En/Dis able interrupts
        ei
        push    rp                              ; save the rp
        srp     #TIMER_GROUP                    ; set the rp for the switches
        call    switches                        ; test the switches
        pop     rp
        iret

TASK2:
        or      IMR, #00011100b                 ; turn on the interrupt
;                     ||||||└──────── (0) RADIO_INT
;                     |||||└───────── (1) not used
;                     ||||└────────── (1) RPM
;                     |||└─────────── (1) AUX_OBS
;                     ||└──────────── (1) TIMERUD
;                     |└───────────── (0) not used
;                     |└───────────── (0) En/Dis RAM Protect
;                     └────────────── (0) En/Dis able interrupts
        ei
        push    rp                              ; save the rp
        srp     #TIMER_GROUP                    ;
        call    STATEMACHINE                    ; do the motor function
        pop     rp                              ; return the rp
        iret

TASK4:
        or      IMR, #00011100b         ; turn on the interrupt
;                     ||||||└──────── (0) RADIO_INT
;                     |||||└───────── (0) not used
;                     ||||└────────── (1) RPM
;                     |||└─────────── (1) AUX_OBS
;                     ||└──────────── (1) TIMERUD
;                     |└───────────── (0) not used
;                     |└───────────── (0) En/Dis RAM Protect
;                     └────────────── (0) En/Dis able interrupts
        ei
        push    rp                              ; save the rp
        srp     #TIMER_GROUP                    ; set the rp for the switches
        call    switches                        ; test the switches
        pop     rp
        iret

TASK6:
        or      IMR, #00011100b                 ; turn on the interrupt
;                     ||||||└──────── (0) RADIO_INT
;                     |||||└───────── (1) not used
;                     ||||└────────── (1) RPM
;                     |||└─────────── (1) AUX_OBS
;                     ||└──────────── (1) TIMERUD
;                     |└───────────── (0) not used
;                     |└───────────── (0) En/Dis RAM Protect
;                     └────────────── (0) En/Dis able interrupts

        ; (Empty task)
        iret

;---------------------------------------------------------------------------
MeasurePots:
;!!!!!!!!!!!!!!!!!!!!!!!!!!!!!!!!!!!!!!!!!!!!!!!!!!!!!
; Sampling data - when using spy board
;
;       and     P2M_SHADOW,#~01100000b          ; Make P2.5 and P2.6 outputs
;       ld      P2M,P2M_SHADOW                  ; Update Port P2. Set the data directions
;       di                                      ; Inhibit state machine until RELFORCE is updated
;       ld      RELFORCE, #Fixed_Rel
;       ei                                      ; RELFORCE now updated
;       ld      ABSFORCE, #Fixed_Abs            ; Set to MAX
;       ld      POT_TIMING,#70                  ; Set to precharge time
;       clr     POT_COUNT                       ; Reset the count of the pots
;       inc     POT_CONTROL                     ; Update the state of the pots
```

A30

```
;       and     POT_CONTROL,#00000011B          ; Mask to four states
;       iret                                    ;
;!!!!!!!!!!!!!!!!!!!!!!!!!!!!!!!!!!!!!!!!!!!!!!!!
                tm      POT_CONTROL, #00000010b ; Test for abs or rel pot.
                jr      nz, MeasureAbsPot       ; and switch to that routine
MeasureRelPot:
                and     P2M_SHADOW, #~P2M_ABSPOT; Pull abs pot. signal to gnd
                or      P2M_SHADOW, #P2M_RELPOT ; tri-state rel pot. control
                ld      P2M, P2M_SHADOW         ; set the data directions
                and     P2, #~P2M_ABSPOT        ; Pull abs pot. signal to gnd
                tm      P0, #POT_INPUT          ; Test the pot input
                jr      z, OutputPulse          ; If pot is higher, raise ref.
                jr      NoPulseOut              ;
MeasureAbsPot:
                and     P2M_SHADOW, #~P2M_RELPOT; Pull rel pot. signal to gnd
                or      P2M_SHADOW, #P2M_ABSPOT ; tri-state abs pot. control
                ld      P2M, P2M_SHADOW         ; Set the data directions
                and     P2, #~P2M_RELPOT        ; Pull rel pot. signal to gnd
                tm      P0, #POT_INPUT          ; Test the pot input
                jr      z, OutputPulse          ; If pot is higher, raise ref.
NoPulseOut:
                and     P3, #~POTREF            ; Output a low pulse on the
                jr      PulseDone               ; pot. reference

OutputPulse:
                or      P3, #POTREF             ; Output a high pulse on
                                                ; the pot. reference
                cp      POT_COUNT, #0FFH        ; If we've hit the max,
                jr      z, PulseDone            ; then don't roll over
                inc     POT_COUNT               ; Increment duty cycle count
PulseDone:
                dec     POT_TIMING              ; Update timing of the pulse
                jr      nz, ExitPots            ; If not at a changeover point,
                                                ; then exit
SwitchPotState:
                tm      POT_CONTROL, #00000001B ; Test for precharge or measure
                                                ; state
                jr      z, NextControl          ; If we've precharged, nothing
                                                ; to take care of
Measured:
                tm      POT_CONTROL, #00000010B ; See which pot we've measured
                jr      nz, MeasuredAbs         ; and store its value
MeasuredRel:
                di                              ; Inhibit state machine until
                                                ; RELFORCE is updated
                ld      RELFORCE, POT_COUNT     ; Store the count

                ; Divide RELFORCE by 16 to scale to 0-15

                com     RELFORCE                ; Reverse the rotation
                inc     RELFORCE                ; 1's comp + 1 = 2's comp.
                swap    RELFORCE                ; Swap and AND to divide
                and     RELFORCE, #0FH          ; by 16
;!!!!!!!!!!!!!!!!!!!!!!!!!!!!!!!!!!!!!!!!!!!!!!!!
; fixed value for relative force when testing
;               ld      RELFORCE, #Fixed_Rel
;!!!!!!!!!!!!!!!!!!!!!!!!!!!!!!!!!!!!!!!!!!!!!!!!
                ei                              ; RELFORCE now updated

                ld      POT_TIMING, #70         ; Set to precharge time
                jr      NextControl             ;

MeasuredAbs:
                ld      ABSFORCE, POT_COUNT     ; Store the count
                rcf                             ; and divide by four to scale
                rrc     ABSFORCE                ; it to 1-64
                rcf                             ;
                rrc     ABSFORCE                ;
;!!!!!!!!!!!!!!!!!!!!!!!!!!!!!!!!!!!!!!!!!!!!!!!!
; fixed value for absolute force when testing
;               ld      ABSFORCE, #Fixed_Abs            ; Set to MAX
;!!!!!!!!!!!!!!!!!!!!!!!!!!!!!!!!!!!!!!!!!!!!!!!!
                ld      POT_TIMING, #70         ; Set to precharge time
NextControl:
                clr     POT_COUNT               ; Reset the count of the pots
                inc     POT_CONTROL             ; Update the state of the pots
                and     POT_CONTROL, #00000011B ; Mask to four states
ExitPots:
                iret                            ;

;-----------------------------------------------------------------------------
; Odd Tasks 1,3,5,7
;-----------------------------------------------------------------------------
```

A31

```
TASK1357:
        push    rp
        or      IMR, #00111100b             ; turn on the interrupt^^^
        ei
        tm      TASKSWITCH, #00000001b      ; test for state a 1 in b0
        jr      z,ONEMS
        tm      TASKSWITCH, #00000010b      ; test for state a 1 in b1
        jr      z,ONEMS
        srp     #TIMER_GROUP                ; if a 3 or 7 then do auxlight
        call    AUXLIGHT

ONEMS:
        srp     #LEARNEE_GRP                ; set the register pointer
        dec     OBS_COUNT                   ; decrease timeout down cntr
        jr      nz,OBS_OK                   ; if not timed out then skip
        or      AOBSF, #00001000b           ; if timed out mark the flag
;                                   protector reverse

        ld      OBS_COUNT, #12              ; OBS_TIME: Time for protector reverse

OBS_OK:
        dec     AOBSTEST                    ; decrease the aobs test timer
        jr      nz,NOFAIL                   ; if the timer not at 0 then it did not fail
        di                                  ; Disable ints when processing
        ld      AOBSTEST, #24               ; AOBSTEST_TIME: if it failed reset the timer
        tm      AOBSF, #00100000b           ; if aobs was blocked before,
;                                   single break
        jr      nz,BlockedBeam              ; don't turn on the light

        or      AOBSF, #10000000b           ; Set the break edge flag
;                                   break edge

BlockedBeam:
        or      AOBSF, #00100001b           ; Set the single break flag
;                                   skiped aobs pulse

NOFAIL:
        ei                                  ; Re-enable interrupts
        inc     RadioTimeOut
        inc     t4ms                        ; increment the 4mS timer
        inc     t125ms                      ; increment the 125 mS timer
        cp      t4ms, #4                    ; test for the time out
        jp      nz,TEST125                  ; if not true then jump

FOURMS:
        clr     t4ms                        ; reset the timer
        cp      RPMONES, #00h               ; test for end of 1 sec timer
        jr      z,TESTPERIOD                ; if one sec over then test pulses over the period
        dec     RPMONES                     ; else decrease the timer
        di
        clr     RPM_COUNT                   ; start with a count of 0
        clr     BRPM_COUNT                  ; start with a count of 0
        ei
        jr      RPMTDONE

TESTPERIOD:
        cp      RPMCLEAR, #00h              ; test clear test timer for 0
        jr      nz,RPMTDONE                 ; if not timed out then skip
        ld      RPMCLEAR, #122              ; set the clear test time for next cycle .5
        cp      RPM_COUNT, #50              ; test the count for too many pulses
        jr      ugt,FAREV                   ; if too many pulses then reverse
        di
        clr     RPM_COUNT                   ; clear the counter
        clr     BRPM_COUNT                  ; clear the counter
        ei
        jr      RPMTDONE                    ; continue

FAREV:
        ld      FAULTCODE, #06h             ; set the fault flag
        ld      FAREVFLAG, #088h            ; set the forced up flag
        and     P0, #~00000001b             ; WORKLIGHT: turn off light
        ld      REASON, #80h                ; rpm forcing up motion
        call    SET_AREV_STATE              ; set the autorev state

RPMTDONE:
        dec     RPMCLEAR                    ; decrement the timer
        tm      P3, #00000001b              ; Test the AOBS input
        jr      z,IncreaseEdgeDB            ; if low,door edge closed
        cp      DoorEdgeDeb, #00            ; if at minimum,
        jr      z,EdgeDBDone                ; don't decrement
        dec     DoorEdgeDeb
        cp      DoorEdgeDeb, #230           ; EDGE_BREAK
        jr      nz,EdgeDBDone
```

A32

```
        clr     DoorEdgeDeb
        jr      EdgeDBDone

IncreaseEdgeDB:
        cp      DoorEdgeDeb, #0FFh              ; if at max,
        jr      z,EdgeDBDone                    ; don't increment
        inc     DoorEdgeDeb
        cp      DoorEdgeDeb, #25                ; EDGE_MAKE
        jr      nz,EdgeDBDone

EdgeDBMake:
        ld      DoorEdgeDeb, #0FFh              ; Vector to max

EdgeDBDone:
        cp      LIGHT1S, #00                    ; test for the end
        jr      z,SKIPLIGHTE
        dec     LIGHT1S                         ; down count the light time

SKIPLIGHTE:
        inc     R_DEAD_TIME
        cp      RTO, #125                       ; RDROPTIME: test for the radio time out
        jr      ult,DONOTCB                     ; if not timed out don't clear b
        cp      CodeFlag, #77h                  ; LRNTEMP: if in a special learn mode,
        jr      uge,DONOTCB                     ; then don't clear code flag
        clr     CodeFlag                        ; else clear the b code flag

DONOTCB:
        inc     RTO                             ; increment the radio time out
        jr      nz,RTOOK                        ; if radio timeout ok,skip
        dec     RTO                             ; back turn

RTOOK:
        cp      RRTO, #0FFh                     ; test for roll
        jr      z,SKIPRRTO                      ; if so then skip
        inc     RRTO

SKIPRRTO:
        tm      P0, #01000000b                  ; psmask: Test for the learn switch
        jr      z,PRSWCLOSED                    ; if switch is closed count up
        cp      learndb, #00                    ; test for non decrement point
        jr      z,LEARNDBOK                     ; if at end skip dec
        dec     learndb                         ;
        jr      LEARNDBOK                       ;

PRSWCLOSED:
        inc     learndb                         ; increase learn debounce tmr
        cp      learndb, #0h                    ; test for overflow
        jr      nz,LEARNDBOK                    ; if not 0 skip back turning
        dec     learndb                         ;

LEARNDBOK:
TEST125:
        cp      t125ms, #125                    ; test for the time out
        jr      z,ONE25MS                       ; if true the jump
        cp      t125ms, #63                     ; test for the other timeout
        jr      nz,N125
        call    FAULTB

N125:
        pop     RP
        iret

ONE25MS:
        cp      SafetyDelay, #0FFh              ; if not at limit,
        jr      z,SafeDelayDone                 ; increment the 5s delay
        inc     SafetyDelay                     ; long timer

SafeDelayDone:
        cp      CableDelay, #0FFh               ; test if detected (disabled) 0xFF
        jr      z,CableDone                     ; jump if YES
        cp      STATE, #04                      ; test if in "door going down" state
        jr      nz,CableDone                    ; jump if NOtraveling down
        inc     CableDelay                      ; increment the cable-delay timer

CableDone:
        cp      ZZWIN, #0FFh                    ; test for the roll position
        jr      z,TESTFA                        ; if so skip
        inc     ZZWIN                           ; if not increase the counter

TESTFA:
        call    FAULTB                          ; call the fault blinker
        clr     t125ms                          ; reset the timer
        inc     DOG2                            ; incrweadt second watch dog
```

A33

```
        di
        inc     SDISABLE                ; count off sys disable timer
        jr      nz,DO12                 ; if not rolled over then do the 1.2 sec
        dec     SDISABLE                ; else reset to FF

DO12:
        cp      ONEP2, #00              ; test for 0
        jr      z,INCLEARN              ; if counted down inc learn
        dec     ONEP2                   ; else down count

INCLEARN:
        inc     learnt                  ; increase the learn timer
        cp      learnt, #0h             ; test for overflow
        jr      nz,LEARNTOK             ; if not 0 skip back turning
        dec     learnt                  ;

LEARNTOK:
        ei
        inc     eraset                  ; increase the erase timer
        cp      eraset, #0h             ; test for overflow
        jr      nz,ERASETOK             ; if not 0 skip back turning
        dec     eraset

ERASETOK:
        pop     RP
        iret

;       fault blinker
FAULTB:
        inc     FAULTTIME               ; increase the fault timer
        cp      FAULTTIME, #80h         ; test for the end
        jr      nz,FIRSTFAULT           ; if not timed out
        clr     FAULTTIME               ; reset the clock
        clr     FAULT                   ; clear the last
        clr     MODESETFLAG             ; Blink out mode only once
        cp      FAULTCODE, #05h         ; test for call dealer cod
        jr      UGE,GOTFAULT            ; set the fault
        cp      S1_DEB, #0FFh           ; test the debouncer
        jr      nz,TESTAOBSM            ; if not set test aobs
        cp      FAULTCODE, #03h         ; test for command shorted
        jr      z,GOTFAULT              ; set the error
        ld      FAULTCODE, #03h         ; set the code
        jr      FIRSTFAULT              ;

TESTAOBSM:
        tm      AOBSF, #00000001b       ; test for skiped aobs pulse
;                              └────── skiped aobs pulse
        jr      z,NOAOBSFAULT           ; if no skips then no faults

        tm      AOBSF, #00000010b       ; test for any pulses
;                             └────── any pulses
        jr      z,NOPULSE               ; if no pulses find hi or low else we are intermittent

        ld      FAULTCODE, #04h         ; set the fault
        jr      GOTFAULT                ; if same got fault

NOPULSE:
        tm      P3, #00000001b          ; test the input pin
        jr      z,AOBSSH                ; jump if aobs is stuck hi
        cp      FAULTCODE, #01h         ; test fo  stuck low in past
        jr      z,GOTFAULT              ; set the fault
        ld      FAULTCODE, #01h         ; set the fault code
        jr      FIRSTFC                 ;

AOBSSH:
        cp      FAULTCODE, #02h         ; test for stuck high in past
        jr      z,GOTFAULT              ; set the fault
        ld      FAULTCODE, #02h         ; set the code
        jr      FIRSTFC

GOTFAULT:
        ld      FAULT,FAULTCODE         ; set the code
        swap    FAULT
        jr      FIRSTFC

NOAOBSFAULT:
        clr     FAULTCODE               ; clear the fault code

FIRSTFC:
        and     AOBSF, #11111100b       ; clear flags
;                            |└────── skiped aobs pulse
;                            └─────── any pulses
```

A34

```
FIRSTFAULT:
        tm      FAULTTIME, #00000111b           ; if one second has passed,
        jr      nz,RegularFault                 ; increment the 60min
        cp      CB2_RADIO_TIMER, #0FFh          ; Increment the 60 sec timer
        jr      z,CB2RadioDone                  ; if not already at max
        inc     CB2_RADIO_TIMER
        cp      CB2_RADIO_TIMER, #120           ; if at 60 seconds,
        jr      ult,CB2RadioDone                ; then vector to max
        ld      CB2_RADIO_TIMER, #0FFh

CB2RadioDone:
        incw    HOUR_TIMER                      ; Increment the 1 hour timer
        tcm     HOUR_TIMER_LO, #00011111b       ; if 32 seconds have passed
        jr      nz,RegularFault                 ; poll the radio mode
        or      AOBSF, #01000000b               ; Set the 'poll radio' flag
;                 └──────────── poll radio mode

RegularFault:
;       cp      MODESETFLAG, #0FFh              ; if we're setting the mode,
;       jr      nz,NormalFaultBlink             ; then blink out the mode
;       ld      FAULT, LGOMODE
;       swap    FAULT
;       jr      BlinkTheLED

;NormalFaultBlink:
        cp      FAULT, #00                      ; test for no fault
        jr      z,NOFAULT
        ld      FAULTFLAG, #0FFh                ; set the fault flag
        cp      CodeFlag, #REGLEARN             ; test for not in learn mode
        jr      z,TESTSDI                       ; if in learn,skip setting

BlinkTheLED:
        cp      FAULT,FAULTTIME
        jr      ULE,TESTSDI

        tm      FAULTTIME, #00001000b           ; test the 1 sec bit
        jr      nz,BITONE
        and     ledport, #ledl                  ; turn on the led
        ret

BITONE:
        or      ledport, #ledh                  ; turn off the led

TESTSDI:
        ret

NOFAULT:
        clr     FAULTFLAG                       ; clear the flag
        ret
;--------------------------------------------------------------------------
; MOTOR STATE MACHINE
;--------------------------------------------------------------------------
STATEMACHINE:
        xor     P0, #AuxOutput                  ; toggle aux output
        cp      DOG2, #8                        ; test watchdog2 for problem
        jp      ugt,start                       ; if problem reset

        cp      STATE, #06                      ; test for legal number
        jp      ugt,start                       ; if not the reset
        jp      z,stop                          ; stop motor 6

        cp      STATE, #03                      ; test for legal number
        jp      z,start                         ; if not the reset

        cp      STATE, #00                      ; test for autorev
        jp      z,auto_rev                      ; auto reversing 0

        cp      STATE, #01                      ; test for up
        jp      z,up_direction                  ; door is going up 1

        cp      STATE, #02                      ; test for autorev
        jp      z,up_position                   ; door is up 2

        cp      STATE, #04                      ; test for autorev
        jp      z,dn_direction                  ; door is going down 4
        jp      dn_position                     ; door is down   5
;--------------------------------------------------------------------------
; AUX OBSTRUCTION OUTPUT AND LIGHT FUNCTION
;--------------------------------------------------------------------------
AUXLIGHT:
        cp      LIGHT_FLAG, #LIGHT
        jr      z,dec_pre_light
```

A35

```
        cp      LIGHT1S, #00                    ; test for no flash
        jr      z,NO1S                          ; if not skip

        cp      LIGHT1S, #01                    ; test for timeout
        jr      nz,NO1S                         ; if not skip
        xor     P0, #WORKLIGHT                  ; toggle light
        clr     LIGHT1S                         ; oneshoted

NO1S:
        cp      FLASH_FLAG, #FLASH
        jr      nz,dec_pre_light
        dec     FLASH_DELAY                     ; 250 ms period
        jr      nz,dec_pre_light
        xor     P0, #WORKLIGHT                  ; toggle light
        ld      FLASH_DELAY, #FLASH_TIME
        dec     FLASH_COUNTER
        jr      nz,dec_pre_light
        clr     FLASH_FLAG

dec_pre_light:
        cp      LIGHT_TIMER_HI, #0FFh           ; test for the timer ignore
        jr      z,exit_light                    ; if set then ignore
        dec     PRE_LIGHT                       ; dec 3 byte light timer
        jr      nz,exit_light
        decw    LIGHT_TIMER
        jr      nz,exit_light                   ; if timer 0 turn off light
        and     P0, #~LIGHT_ON                  ; turn off the light

exit_light:
        ret                                     ; return

;-----------------------------------------------------------------------
;       AUTO_REV ROUTINE STATE
;-----------------------------------------------------------------------
auto_rev:
        cp      FAREVFLAG, #088h                ; test for the forced up flag
        jr      nz,LEAVEREV
        and     P0, #~WORKLIGHT                 ; turn off light

LEAVEREV:
        WDT                                     ; kick the dog
        call    HOLDFREV                        ; hold off the force reverse
        ld      LIGHT_FLAG, #LIGHT              ; force the light on no blink
        and     P0, #(~MOTOR_UP) & (~MOTOR_DN)  ; disable motor
        di
        dec     AUTO_DELAY                      ; wait for .5 seconds
        dec     BAUTO_DELAY                     ; wait for .5 seconds
        ei
        jr      nz,arswitch                     ; test switches
        or      P0, #AuxOutput                  ; set aux output for FEMA
        tm      P2, #01h                        ; UP_LIMIT -  test the limit
        jr      nz,NOUPLIM                      ; if limit set stop
        LD      REASON, #60h                    ; set reason as early limit
        jp      SET_STOP_STATE                  ; set stop

NOUPLIM:
        ld      REASON, #40h                    ; set the reason for change
        jp      SET_UP_DIR_STATE                ; set the state

arswitch:
        cp      BackOffDnLim, #0FFh             ; if backing off limit,
        jr      z,exit_auto_rev                 ; ignore switches and radio
        ld '    REASON, #00h                    ; set the reason to cmd/open
        di
        cp      SW_DATA, #S1                    ; test for S1
        clr     SW_DATA
        ei
        jp      z,SET_STOP_STATE                ; if so then stop

NoStopSw:
        ld      REASON, #10h                    ; set reason as radio command
        cp      RADIO_CMD, #0AAh                ; test for a radio command
        jp      z,SET_STOP_STATE                ; if so the stop

exit_auto_rev:
        ret                                     ; return

HOLDFREV:
        ld      RPMONES, #244                   ; set the hold off
        ld      RPMCLEAR, #122                  ; clear rpm reverse .5 sec
        di
        clr     RPM_COUNT                       ; start with a count of 0
```

A36

```
        clr     BRPM_COUNT                      ; start with a count of 0
        ei
        ret

;---------------------------------------------------------------------------
;       DOOR GOING UP STATE Home1
;---------------------------------------------------------------------------
up_direction:
        WDT                                     ; kick the dog
        call    HOLDFREV                        ; hold off the force reverse
        ld      LIGHT_FLAG, #LIGHT              ; force the light on no blink
        and     P0, #~MOTOR_DN                  ; disable down relay

        cp      MOTDEL, #0FFh                   ; test for done
        jr      z,UPON                          ; if done skip delay

        inc     MOTDEL                          ; increase the delay timer
        or      P0, #LIGHT_ON                   ; turn on the light
        cp      MOTDEL, #10                     ; delay for 40 seconds
        jr      ule,UPOFF                       ; if not timed

UPON:
        or      P0, #(MOTOR_UP | LIGHT_ON)      ; turn on the motor and light

UPOFF:
        cp      FORCE_IGNORE, #01               ; test for end of force ignore
        jr      nz,SKIPUPRPM                    ; if not donot test rpmcount
        cp      RPM_ACOUNT, #02h                ; test for less the 2 pulses
        jr      ugt,SKIPUPRPM
        ld      FAULTCODE, #05h

SKIPUPRPM:
        cp      BFORCE_IGNORE, #00              ; test timer for done
        jp      nz,test_up_sw_pre               ; if timer not up do not test force

TEST_UP_FORCE:
        di
        dec     RPM_TIME_OUT                    ; decrease the timeout
        dec     BRPM_TIME_OUT                   ; decrease the timeout
        ei
        jp      z,failed_up_rpm
        push    RP                              ; Store register pointer
        srp     #RPM_GROUP                      ;

;<><><><><><><><><><><><><><><><><><><><><><><><><>
; New Relative Force Algorithm (Home)
;<><><><><><><><><><><><><><><><><><><><><><><><><>
        di                                      ; (Disable for RPM capture)
        ld      RPM_TEST_HI,RPM_PERIOD_HI       ; Set RPM_TEST to
        ld      RPM_TEST_LO,RPM_PERIOD_LO       ; RPM - PAST_RPM_MED
        sub     RPM_TEST_LO,PAST_RPM_MED_LO     ;
        sbc     RPM_TEST_HI,PAST_RPM_MED_HI     ;
        ld      rel_f_temp_hi,PAST_RPM_MED_HI   ;
        ld      rel_f_temp_lo,PAST_RPM_MED_LO   ;

; Take the absolute value of RPM - PAST_RPM_MED
        tm      RPM_TEST_HI, #10000000b         ; if negative,
        jr      z,IsPositiveup                  ; Take complement
        com     RPM_TEST_HI                     ; (1's complement is off by
        com     RPM_TEST_LO                     ; 1 us, but who cares?)

IsPositiveup:
        rcf                                     ; Reset Carry Flag
        rrc     rel_f_temp_hi                   ; /2
        rrc     rel_f_temp_lo
        rcf                                     ; Reset Carry Flag
        rrc     rel_f_temp_hi                   ; /4
        rrc     rel_f_temp_lo
        rcf                                     ; Reset Carry Flag
        rrc     rel_f_temp_hi                   ; /8
        rrc     rel_f_temp_lo
        rcf                                     ; Reset Carry Flag
        rrc     rel_f_temp_hi                   ; /16
        rrc     rel_f_temp_lo
        rcf                                     ; Reset Carry Flag
        rrc     rel_f_temp_hi                   ; /32
        rrc     rel_f_temp_lo
        rcf                                     ; Reset Carry Flag
        rrc     rel_f_temp_hi                   ; /64
        rrc     rel_f_temp_lo
        rcf                                     ; Reset Carry Flag
        rrc     rel_f_temp_hi                   ; /128
```

A37

```
        rrc     rel_f_temp_lo
        rcf                                     ; Reset Carry Flag
        rrc     rel_f_temp_hi                   ; /256
        rrc     rel_f_temp_lo

        cp      rel_f_temp_lo, #00h             ; test if MED is zero
        jr      nz,nadjup                               ; if high byte is zero,pulse too narrow
        ld      rel_f_temp_lo, #01h

nadjup:
; Multiply by the relative force pot setting
        clr     rel_f_max_hi                    ; Init for multiply
        clr     rel_f_max_lo
        ld      rel_f_mult,RELFORCE             ; Fetch rel force setting (0 - 15)
        inc     rel_f_mult                      ; Set for proper multiplier (1 - 16)
        add     rel_f_mult, #Noise_adj + 5      ; Noise adj.

ScaleLoopup:
        add     rel_f_max_lo,rel_f_temp_lo      ; Multiply by relforce
        adc     rel_f_max_hi,rel_f_temp_hi      ; setting
        djnz    rel_f_mult,ScaleLoopup

;!!!!!!!!!!!!!!!!!!!!!!!!!!!!!!!!!!!!!!!!!!!!!!!!
ScaleDoneup:
;XXXXXXXXXXXXXXXXXXXXXXXXXXXXXXXXXXXXXXXXXXXXXXXXXXXXXXXXXXXXXXXXXXXXXXXXXXXXXXXXXXXXXXXXXXXXXXXXXX
; Output data - used with spy board
;XXXXXXXXXXXXXXXXXXXXXXXXXXXXXXXXXXXXXXXXXXXXXXXXXXXXXXXXXXXXXXXXXXXXXXXXXXXXXXXXXXXXXXXXXXXXXXXXXX
;       ld      P1,#58h
;       and     P2,#~01000000b                  ; Bring P2.6 low
;       nop
;       nop
;       nop
;       nop
;       or      P2,#01000000b                   ; Bring P2.6 high

;       ld      P1,rel_f_max_hi
;       and     P2,#~01000000b                  ; Bring P2.6 low
;       nop
;       nop
;       nop
;       nop
;       or      P2,#01000000b                   ; Bring P2.6 high

;       ld      P1,rel_f_max_lo
;       and     P2,#~01000000b                  ; Bring P2.6 low
;       nop
;       nop
;       nop
;       nop
;       or      P2,#01000000b                   ; Bring P2.6 high

;       ld      P1,RPM_TEST_HI
;       and     P2,#~01000000b                  ; Bring P2.6 low
;       nop
;       nop
;       nop
;       nop
;       or      P2,#01000000b                   ; Bring P2.6 high

;       ld      P1,RPM_TEST_LO
;       and     P2,#~01000000b                  ; Bring P2.6 low
;       nop
;       nop
;       nop
;       nop
;       or      P2,#01000000b                   ; Bring P2.6 high
;XXXXXXXXXXXXXXXXXXXXXXXXXXXXXXXXXXXXXXXXXXXXXXXXXXXXXXXXXXXXXXXXXXXXXXXXXXXXXXXXXXXXXXXXXXXXXXXXXX
        pop     RP                              ; Restore the RP
        cp      RPM_TEST_HI,REL_F_MAX_HI        ; Test for relative force
        jr      ugt,failed_up_rpm               ; if too high,rpm fault
        jr      ult,rel_up_force_ok             ; if low,relative force okay
        cp      RPM_TEST_LO,REL_F_MAX_LO        ; if equal,test lower byte
        jr      ugt,failed_up_rpm
;!!!!!!!!!!!!!!!!!!!!!!!!!!!!!!!!!!!!!!!!!!!!!!!!
rel_up_force_ok:
        di                                      ; turn off the interrupt

;!!!!!!!!!!!!!!!!!!!!!!!!!!!!!!!!!!!!!!!!!!!!!!!!
        ld      TC, #0                          ; Reset counter
;!!!!!!!!!!!!!!!!!!!!!!!!!!!!!!!!!!!!!!!!!!!!!!!!
        cp      RPM_PERIOD_HI,ABS_FORCE_HI      ; Test to see if RPM period is
        jr      ugt,failed_up_rpm               ; > the absolute force setting
```

A38

```
        jr      ult,test_up_sw                    ; if not,RPM is okay
        cp      RPM_PERIOD_LO,ABS_FORCE_LO
        jr      ult,test_up_sw

failed_up_rpm:
;!!!!!!!!!!!!!!!!!!!!!!!!!!!!!!!!!!!!!!!!!!!!!!!!!!!!!!
        inc     TC                                ; increment trip counter
        cp      TC, #tcv + 3                      ; test for trip
        jr      ult, test_up_sw
;!!!!!!!!!!!!!!!!!!!!!!!!!!!!!!!!!!!!!!!!!!!!!!!!!!!!!!
        push    IMR                               ; save interupt status
        di                                        ; disable interupt
        ld      RPM_TIME_OUT, #MAX_RPM_PER        ; set rpm max period
        ld      BRPM_TIME_OUT, #MAX_RPM_PER       ; set rpm max period
        pop     IMR                               ; restore interupt status
        ld      REASON, #20h                      ; set the reason as force
        jp      SET_STOP_STATE

test_up_sw_pre:
        di
        dec     FORCE_IGNORE
        cp      FORCE_IGNORE, #00
        jr      nz,test_up_sw                     ; if timer not up do not test force
        dec     BFORCE_IGNORE

test_up_sw:
        ei                                        ; enable interupt
        cp      BackOffDnLim, #0FFh               ; if not backing off limit,
        jr      nz,NormalUpDir                    ; normal state machine

BackingOffDnLim:
        cp      FORCE_IGNORE, #(ONE_SEC*7/8)      ; Test for 0.125 sec passed
        jp      ugt,exit_up_dir                   ; if not,ignore switches

DnLimBackedOff:
        clr     BackOffDnLim                      ; Clear the one-shot
        and     P0, #~04h                         ; MOTOR_UP - disable up relay
        jp      SET_DN_POS_STATE                  ; At down limit

NormalUpDir:
        tm      P2, #01h                          ; UP_LIMIT - have we reached the limit?
        jr      z,up_limit_dec
        ld      limit, #08h                       ; LIMIT_COUNT - limit debounce 1 way 32mS
        jr      get_sw

up_limit_dec:
        djnz    limit,get_sw                      ; dec debounce count
        ld      REASON, #50h                      ; set the reason as limit
        jp      SET_UP_POS_STATE

get_sw:
        ld      REASON, #10h                      ; set the radio command reason
        cp      RADIO_CMD, #0AAh                  ; test for a radio command
        jp      z,SET_STOP_STATE                  ; if so stop
        ;--In all three modes,S1 will stop the door

GenericUpDir:
        ld      REASON, #00h                      ; set the reason as cmd/open
        di
        cp      SW_DATA, #01h                     ; S1 - test for S1 (CMD in Res. B2,
        clr     SW_DATA                           ; STOP in comm. B2 and D1)
        ei
        jp      z,SET_STOP_STATE

test_up_time:
        ld      REASON, #70h                      ; set the reason as a time out
        decw    MOTOR_TIMER                       ; decrement motor timer
        jr      z,Up_motor_timeout                ; if expired, motor timed out
        jp      exit_up_dir                       ; done

Up_motor_timeout:
        ld      DisableRadioFlag, #0FFh           ; Disable radio until limit
        jp      SET_STOP_STATE                    ; Stop the door

exit_up_dir:
        ret                                       ; return to caller

;---------------------------------------------------------------------------
;       DOOR UP STATE
;---------------------------------------------------------------------------
up_position:
        WDT                                       ; kick the dog
        cp      FAREVFLAG, #088h                  ; test for the forced up flag
```

A39

```
        jr      nz,LEAVELIGHT
        and     P0, #~WORKLIGHT                 ; turn off light
        jr      UPNOFLASH                       ; skip clearing the flash flag

LEAVELIGHT:
        ld      LIGHT_FLAG, #00h                ; allow blink

UPNOFLASH:
        ld      limit, #LIMIT_COUNT
        and     P0, #(~MOTOR_UP) & (~MOTOR_DN)  ; disable motor
        ld      REASON, #10h                    ; set reason as a radio cmd
        cp      RADIO_CMD, #0AAh                ; test for a radio cmd
        jr      nz,NoRadioReceivedUpPos         ;
        cp      CodeFlag, #BRECEIVED            ; if it's not a B code,
        jr      nz,SETDNDIRSTATE                ; then just start down
        cp      SafetyDelay, #FIVE_SECONDS      ; if no safety delay,
        jr      uge,SETDNDIRSTATE               ; then just start down
        jr      ult,NoRadioReceivedUpPos        ; if not expired,ignore cmd
        ld      OVERRIDE, #0FFh                 ; Override the edge / IR's
        jr      SETDNDIRSTATE

NoRadioReceivedUpPos:
;       cp      SW_DATA,#S2                     ; If the light switch closed,
;       jr      z,work_up                       ; then toggle
        ld      REASON, #00h                    ; set the reason as cmd/open
        cp      SafetyDelay, #FIVE_SECONDS      ; if the one-shot is done
        jr      ugt,NormalSwitchTest            ; Then look for an edge

LongDebounce:
        clr     SW_DATA                         ; Ignore switch edges
        cp      SafetyDelay, #FIVE_SECONDS      ; if the 5 second one-shot
        jr      nz,Up_Pos_Exit                  ; has expired and the
        cp      S1_DEB, #CONST_PRESS            ; CMD debouncer is held,
        jr      ult,Up_Pos_Exit                 ; then start down with
        ld      OVERRIDE, #0FFh                 ; the OVERRIDE flag set
        jr      SETDNDIRSTATE

NormalSwitchTest:
        di
        cp      SW_DATA, #S1                    ; S1 debounced?
        clr     SW_DATA
        ei
        jr      z,SETDNDIRSTATE                 ; if command
        ret

NotResB2ModeUpPos:
        cp      SafetyDelay, #FIVE_SECONDS      ; if the 5 sec timer hasn't
        jr      ult,Up_Pos_Exit                 ; expired,skip switches
        jr      nz,UpPos_NormalSwitches         ; if no timer,use edges

UpConstPressureSwitch:
        clr     SW_DATA                         ; Switch edges not needed
        cp      S3_DEB, #CONST_PRESS            ; if the switch closed or
        jr      ult,Up_Pos_Exit                 ; is held,go down
        ld      OVERRIDE, #0FFh
        ld      LAST_CMD, #055h                 ; set last cmd as switches
        jr      SETDNDIRSTATE

UpPos_NormalSwitches:
        di
        cp      SW_DATA, #S3                    ; close sw debounced?
        clr     SW_DATA
        ei
        jr      z,SETDNDIRSTATE                 ; if command

Up_Pos_Exit:
        ret

SETDNDIRSTATE:
        clr     CableDelay                      ; Zero the 1-Sec cable-delay timeout
        ld      ONEP2, #10                      ; set the 1.2 sec timer
        jp      SET_DN_DIR_STATE

work_up:
        xor     p0,#WORKLIGHT                   ; toggle work light
        ld      LIGHT_TIMER_HI,#0FFH            ; set the timer ignore
        and     SW_DATA, #~S2                   ; Clear the worklight bit

up_pos_ret:
        ret                                     ; return

;-----------------------------------------------------------------------------
;       DOOR GOING DOWN STATE, Home2
```

A40

```
;---------------------------------------------------------------------------
dn_direction:
        WDT                                     ; kick the dog
        call    HOLDFREV                        ; hold off the force reverse
        clr     FLASH_FLAG                      ; turn off the flash
        ld      LIGHT_FLAG, #LIGHT              ; force the light on no blink
        and     P0, #~MOTOR_UP                  ; turn off motor up
        cp      MOTDEL, #0FFh                   ; test for done
        jr      z,DNON                          ; if done skip delay
        inc     MOTDEL                          ; increase the delay timer
        or      P0, #LIGHT_ON                   ; turn on the light
        cp      MOTDEL, #10                     ; delay for .512 seconds
        jr      ule,DNOFF                       ; if not timed

DNON:
        or      P0, #(MOTOR_DN) | (LIGHT_ON)    ; turn on the motor and light

DNOFF:
        cp      FORCE_IGNORE, #01               ; test for end of force ignore
        jr      nz,SKIPDNRPM                    ; if not donot test rpmcount
        cp      RPM_ACOUNT, #02h                ; test for less the 2 pulses
        jr      ugt,SKIPDNRPM
        ld      FAULTCODE, #05h

SKIPDNRPM:
        cp      BFORCE_IGNORE, #00              ; test timer for done
        jp      nz,test_dn_sw_pre               ; if timer not up do not test force

;!!!!!!!!!!!!!!!!!!!!!!!!!!!!!!!!!!!!!!!!!!!!!!!!
;        cp      ForcedDown, #1n                 ; dis-allow forcing down function
;        jp      z,test_dn_sw_pre
;!!!!!!!!!!!!!!!!!!!!!!!!!!!!!!!!!!!!!!!!!!!!!!!!

TEST_DOWN_FORCE:
        di
        dec     RPM_TIME_OUT                    ; decrease the timeout
        dec     BRPM_TIME_OUT                   ; decrease the timeout
        ei
        jp      z,failed_dn_rpm                 ; !!
        push    RP                              ; Store register pointer
        srp     #RPM_GROUP

;<><><><><><><><><><><><><><><><><><><><><><><><>
; New Relative Force Algorithm (Home)
;<><><><><><><><><><><><><><><><><><><><><><><><>
        di                                      ; (Disable for RPM capture)
        ld      RPM_TEST_HI,RPM_PERIOD_HI       ; Set RPM_TEST = RPM - PAST_RPM_MED
        ld      RPM_TEST_LO,RPM_PERIOD_LO       ;
        sub     RPM_TEST_LO,PAST_RPM_MED_LO     ;
        sbc     RPM_TEST_HI,PAST_RPM_MED_HI     ;
        ld      rel_f_temp_hi,PAST_RPM_MED_HI   ;
        ld      rel_f_temp_lo,PAST_RPM_MED_LO   ;
;       ei
; Take the absolute value of RPM - PAST_RPM_MED
        tm      RPM_TEST_HI, #10000000b         ; if negative,
        jr      z,IsPositivedn                  ; Take complement
        com     RPM_TEST_HI                     ; (1's complement is off by
        com     RPM_TEST_LO                     ; 1 us,but who cares?)

IsPositivedn:
        rcf                                     ; Reset Carry Flag
        rrc     rel_f_temp_hi                   ; /2
        rrc     rel_f_temp_lo
        rcf                                     ; Reset Carry Flag
        rrc     rel_f_temp_hi                   ; /4
        rrc     rel_f_temp_lo
        rcf                                     ; Reset Carry Flag
        rrc     rel_f_temp_hi                   ; /8
        rrc     rel_f_temp_lo
        rcf                                     ; Reset Carry Flag
        rrc     rel_f_temp_hi                   ; /16
        rrc     rel_f_temp_lo
        rcf                                     ; Reset Carry Flag
        rrc     rel_f_temp_hi                   ; /32
        rrc     rel_f_temp_lo
        rcf                                     ; Reset Carry Flag
        rrc     rel_f_temp_hi                   ; /64
        rrc     rel_f_temp_lo
        rcf                                     ; Reset Carry Flag
        rrc     rel_f_temp_hi                   ; /128
        rrc     rel_f_temp_lo
        rcf                                     ; Reset Carry Flag
        rrc     rel_f_temp_hi                   ; /256
```

A41

```
        rrc     rel_f_temp_lo

        cp      rel_f_temp_lo, #00h             ; test if MSD is zero
        jr      nz,nadj                         ; if high byte is zero,pulse too narrow
        ld      rel_f_temp_lo, #01h

nadj:
; Multiply by the relative force pot setting
        clr     rel_f_max_hi                    ; Init for multiply
        clr     rel_f_max_lo
        ld      rel_f_mult,RELFORCE             ; Fetch rel force setting (0 - 15)
        inc     rel_f_mult                      ; Set for proper multiplier (1 - 16)
        add     rel_f_mult, #Noise_adj          ; Noise adj.


ScaleLoopdn:
        add     rel_f_max_lo,rel_f_temp_lo      ; Multiply by relforce
        adc     rel_f_max_hi,rel_f_temp_hi      ; setting
        djnz    rel_f_mult,ScaleLoopdn

ScaleDonedn:

        pop     RP                              ; Restore the RP
        cp      RPM_TEST_HI, REL_F_MAX_HI       ; Test for relative force
        jr      ugt, failed_dn_rpm              ; if too high, rpm fault
        jr      ult, rel_dn_force_ok            ; if low, relative force okay
        cp      RPM_TEST_LO, REL_F_MAX_LO       ; If equal, test lower byte
        jr      ugt, failed_dn_rpm              ;

rel_dn_force_ok:
        di                                      ; turn off the interrupt
;!!!!!!!!!!!!!!!!!!!!!!!!!!!!!!!!!!!!!!!!!!!!!!!!!!
        ld      TC, #0                          ; Reset counter
;!!!!!!!!!!!!!!!!!!!!!!!!!!!!!!!!!!!!!!!!!!!!!!!!!!
        cp      RPM_PERIOD_HI, ABS_FORCE_HI     ; Test to see if RPM period is
        jr      ugt, failed_dn_rpm              ; > the absolute force setting
        jr      ult, test_dn_sw                 ; If not, RPM is okay
        cp      RPM_PERIOD_LO, ABS_FORCE_LO     ;
        jr      ult, test_dn_sw                 ;
;       jr      test_dn_sw                      ; used when testing
failed_dn_rpm:
;!!!!!!!!!!!!!!!!!!!!!!!!!!!!!!!!!!!!!!!!!!!!!!!!!!
        inc     TC                              ; increment trip counter
        cp      TC, #tcv                        ; test for trip
;!!!!!!!!!!!!!!!!!!!!!!!!!!!!!!!!!!!!!!!!!!!!!!!!!!
        jr      ult, test_dn_sw

        push    IMR                             ; save interupt status
        di                                      ; disable interupts
        ld      RPM_TIME_OUT, #MAX_RPM_PER      ; set rpm max period
        ld      BRPM_TIME_OUT, #MAX_RPM_PER     ; set rpm max period
        pop     IMR                             ; restore interupt status
        ld      REASON, #20h                    ; set the reason as force
        ld      SAFEREVFLAG, #0FFh              ; Set the safe reverse
        jp      SET_AREV_STATE                  ; need to reverse

test_dn_sw_pre:
        di
        dec     FORCE_IGNORE
        cp      FORCE_IGNORE, #00
        jr      nz,test_dn_sw                   ; if timer not up do not test force
        dec     BFORCE_IGNORE

test_dn_sw:'
        ei                                      ; turn on the interrupt
        cp      S1_DEB, #CONST_PRESS            ; test for constant pressure
        jr      uge,SkipProxSwitch              ; if there is constant pressure,can't see Prox

SkipProxSwitch:
        tm      P2, #DN_LIMIT                   ; are we at down limit?
        jr      z,dn_limit_dec                  ;
        ld      limit, #LIMIT_COUNT             ; reset the limit
        jr      call_sw_dn                      ;

dn_limit_dec:
        djnz    limit,call_sw_dn                ; dec debounce counter
        ld      REASON, #50h                    ; set the reason as a limit
        cp      S1_DEB, #0FFh                   ; test for switch still held
        jr      nz,TESTRADIO                    ;
        ld      REASON, #90h                    ; closed with the control held
        jr      TESTFORCEIG

TESTRADIO:
```

A42

```
        cp      LAST_CMD, #00               ; test for last cmd being radio
        jr      nz,TESTFORCEIG              ; if not test force
        cp      CodeFlag, #BRECEIVED        ; test for the b code flag
        jr      nz,TESTFORCEIG
        ld      REASON, #0A0h               ; set reason as b code to lim

TESTFORCEIG:
        cp      ForcedDown, #00             ; test for force down action
        jr      nz,NOAREVDN                 ; if set skip early limits
        cp      FORCE_IGNORE, #00h          ; test force ignore for done
        jr      z,NOAREVDN                  ; a rev if limit before force enabled
        ld      REASON, #60h                ; early limit
        ld      SAFEREVFLAG, #0FFh          ; Set the safe reverse
        jp      SET_AREV_STATE              ; Reverse for one second

NOAREVDN:
        and     P0, #~MOTOR_DN              ; Turn off motor
        jp      SET_DN_POS_STATE            ; then do normal down limit

call_sw_dn:
        ; Radio is inhibited in D1 mode,so we can test for a
        ; radio reception independent of the operating mode

        ld      REASON, #10h                ; set the reason as radio cmd
        cp      RADIO_CMD, #0AAh                    ; test for a radio command
        jp      z,SET_AREV_STATE            ; if so arev
        ld      REASON, #00h                ; set reason as cmd/open
        di
        cp      SW_DATA, #S1                ; test for command
        clr     SW_DATA
        ei
        jp      z,SET_AREV_STATE
        jr      test_dn_time
        di
        cp      SW_DATA, #S2                ; if the "open" switch
        jp      z,SET_AREV_STATE            ; is pressed,reverse
        cp      SW_DATA, #S1                ; if the "stop" switch
        jp      z,SET_STOP_STATE            ; is pressed,stop
        clr     SW_DATA
        ei

test_dn_time:
        ld      REASON, #70h                ; set the reason as timeout
        decw    MOTOR_TIMER                 ; decrement motor timer
        jr      nz,ResB2IRs
        ld      DisableRadioFlag, #0FFh     ; Disable radio until limit
        ld      SAFEREVFLAG, #0FFh          ; Set the safe reverse
        jp      SET_AREV_STATE              ; will reverse,

; Note: when looking for normal IR protector pulses

ResB2IRs:
;       cp      CableDelay, #cdelay         ; (cable-delay) 1-second timer
;       jr      ult,exit_dn_dir             ; do not scan for eyes
        tm      AOBSF, #00001000b           ; test protector reverse flag
;                       └────────── protector reverse
        jr      z,exit_dn_dir               ; if not set skip prot rev


TestOverride:
        cp      LAST_CMD, #00               ; test for last cmd from radio
        jr      z,OBSTESTB                  ; if last cmd was radio test b
        cp      OVERRIDE, #0FFh             ; if the 'enable override'
        jr      nz,OBSAREV                  ; flag not set,no const press
        and     AOBSF, #11110111b           ; clear protector reverse flag
;                       └────────── protector reverse
        jr      exit_dn_dir                 ; otherwise skip

OBSAREV:
        ld      SAFEREVFLAG, #0FFh          ; Set the safe reverse
        ld      FLASH_FLAG, #0FFh           ; set flag
        ld      FLASH_COUNTER, #20          ; set for 10 flashes
        ld      FLASH_DELAY, #FLASH_TIME    ; set for .5 Hz period
        ld      REASON, #30h                ; set reason as autoreverse
        jp      SET_AREV_STATE              ; D1 will reverse for one sec

OBSTESTB:
        cp      CodeFlag, #BRECEIVED        ; test for the b code flag
        jr      nz,OBSAREV                  ; if not b code then arev
        and     AOBSF, #11110111b           ; clear protector reverse flag
;                       └────────── broken protector reverse

exit_dn_dir:
```

A43

```
        ret                                     ; return
;------------------------------------------------------------------------------
;       DOOR DOWN
;------------------------------------------------------------------------------
dn_position:
        WDT                                     ; kick the dog
        cp      ForcedDown, #01                 ; test for force in past
        jr      z,TestMotorRev                  ; if so the test motor motion
        cp      MOTOR_TIMER, #00                ; test for timed out
        jr      z,TestMotorRev                  ; if timed out then test rev.
        decw    MOTOR_TIMER                     ; decrement motor timer
        clr     RPM_ACOUNT                      ; clear the rpm counter
        jr      SkipLock                        ; skip lock til 27 sec timeout

TestMotorRev:
        tm      P2, #DN_LIMIT                   ; is the down limit still set
        jr      z,SkipLock                      ; then skip the lock down
        cp      RPM_ACOUNT, #10                 ; test for 1 rev
        jr      ule,SkipLock                    ; if less skip the lock down
        ld      ForcedDown, #1h                 ; set flag to skip early lim
        jp      SET_DN_DIR_STATE                ; force the door down to lim

SkipLock:
        ld      LIGHT_FLAG, #00h                ; allow blink

DNNOFLASH:
        ld      limit, #LIMIT_COUNT
        and     P0, #(~MOTOR_UP) & (~MOTOR_DN) ; disable motor
        ld      REASON, #10h                    ; set reason as radio command
        cp      RADIO_CMD, #0AAh                ; test for a radio command
        jr      z,SETUPDIRSTATE                 ; if so go up

;       cp      SW_DATA,#S2                     ; Test for light switch
;       jr      z,work_dn

        ld      REASON, #00h                    ; set the reason as cmd/open
        di
        cp      SW_DATA, #S1                    ; S1 pressed?
        clr     SW_DATA
        ei
        jr      z,SETUPDIRSTATE                 ; if so go up
        ret

DN_NotRssB2Mode:
        ld      REASON, #00h                    ; set the reason as cmd/open
        di
        cp      SW_DATA, #S2                    ; S2 pressed?
        clr     SW_DATA
        ei
        jr      z,SETUPDIRSTATE                 ; if so go up
        ret

SETUPDIRSTATE:
        ld      ONEP2, #10                      ; set the 1.2 sec timer
        jp      SET_UP_DIR_STATE

work_dn:
        xor     P0,#WORKLIGHT                   ; toggle work light
        ld      LIGHT_TIMER_HI,#0FFH            ; set the timer ignore
        and     SW_DATA, #~S2                   ; Clear the worklight bit

dn_pos_ret:
        ret                                     ; return

;------------------------------------------------------------------------------
;       STOP
;------------------------------------------------------------------------------
stop:
        WDT                                     ; kick the dog
        cp      FAREVFLAG, #088h                ; test for the forced up flag
        jr      nz,LEAVESTOP
        and     P0, #~WORKLIGHT                 ; turn off light

LEAVESTOP:
        ld      LIGHT_FLAG, #00h                ; allow blink
        and     P0, #(~MOTOR_UP) & (~MOTOR_DN)  ; disable motor
        ld      REASON, #10h                    ; set the reason as radio cmd
        cp      RADIO_CMD, #0AAh                ; if radio command,
        jr      nz,NoRadioTimer                 ; then test for a B code
        cp      CodeFlag, #BRECEIVED            ; if it's not a B code,
        jp      nz,SET_DN_DIR_STATE             ; then just go down
        cp      SafetyDelay, #FIVE_SECONDS      ; if no safety delay,
        jp      uge,SET_DN_DIR_STATE            ; then just start down
```

A44

```
        jr      ult,NoRadioTimer              ; if not expired,ignore cmd
        ld      OVERRIDE, #0FFh               ; Override the edge / IR's
        jp      SET_DN_DIR_STATE              ; go down
        cp      RADIO_CMD, #0AAh              ; if radio command,
        jp      z,SET_UP_DIR_STATE            ; go up
        jr      NotResB2Stop                  ; Continue with switches

NoRadioTimer:
;       cp      SW_DATA, #S2                  ; Test for light switch
;       jr      z,work_stop
        ld      REASON, #00h                  ; set the reason as cmd/open
        cp      SafetyDelay, #FIVE_SECONDS    ; if the one-shot is done
        jr      ugt,NormalSwitchStop          ; Then look for an edge
        clr     SW_DATA
        cp      SafetyDelay, #FIVE_SECONDS    ; If the 5 second one-shot
        jr      nz,Stop_Exit                  ; has expired and the
        cp      S1_DEB, #CONST_PRESS          ; S1 debouncer is held,
        jr      ult,Stop_Exit                 ; then start down with
        ld      OVERRIDE, #0FFh               ; the OVERRIDE flag set
        jp      SET_DN_DIR_STATE              ;

NormalSwitchStop:
        di
        cp      SW_DATA, #S1                  ; S1 pressed?
        clr     SW_DATA
        ei
        jp      z,SET_DN_DIR_STATE            ; if so go down

Stop_Exit:
        ret
;----------------------------------------------------------------------
NotResB2Stop:
        cp      SafetyDelay, #FIVE_SECONDS    ; if the 5 sec timer hasn't
        jr      ult,Stop_Exit                 ; expired,skip switches
        jr      nz,StopPos_NormalSwitches     ; Look for edges if no timer
        clr     SW_DATA                       ; Switch edges not needed
        cp      S3_DEB, #CONST_PRESS          ; if the switch closed or
        jr      ult,DontGoDown                ; is held,go down
        ld      OVERRIDE, #0FFh
        ld      LAST_CMD, #055h               ; set last cmd as switches
        jr      SET_DN_DIR_STATE

DontGoDown:
        cp      S2_DEB, #CONST_PRESS
        jr      ugt,SET_UP_DIR_STATE
        ret
;----------------------------------------------------------------------
StopPos_NormalSwitches:
        di
        cp      SW_DATA, #S2                  ; if opening
        jr      z,SETUPFROMSTOP               ; then set the state
        cp      SW_DATA, #S3                  ; prox/close sw pressed?
        clr     SW_DATA
        ei
        jp      z,SET_DN_DIR_STATE
        ret

SETUPFROMSTOP:
        clr     SW_DATA
        ei
        jp      SET_UP_DIR_STATE

work_stop:
        xor     p0,#WORKLIGHT                 ; toggle work light
        ld      LIGHT_TIMER_HI,#0FFH          ; set the timer ignore
        and     SW_DATA, #~S2                 ; Clear the worklight bit

stop_ret:
        ret                                   ; return
;----------------------------------------------------------------------
;       SET THE AUTOREV STATE
;----------------------------------------------------------------------
SET_AREV_STATE:
        di
        ld      STATE, #AUTO_REV              ; if we got here,
        jr      SET_ANY                       ; then reverse motor

;----------------------------------------------------------------------
;       SET THE STOPPED STATE
;----------------------------------------------------------------------
SET_STOP_STATE:
        di
        clr     SAFEREVFLAG
```

A45

```
        ld      STATE, #STOP            ;
        jr      SET_ANY

;-----------------------------------------------------------------------------
;       SET THE DOWN DIRECTION STATE
;-----------------------------------------------------------------------------
SET_DN_DIR_STATE:
        di
        ld      STATE, #DN_DIRECTION            ; energize door
        clr     FAREVFLAG                       ; one shot the forced reverse
        tm      P2, #DN_LIMIT                   ; are we at down limit?
        jr      nz,SET_ANY                      ; if not at limit set dn else set the dn position
;-----------------------------------------------------------------------------
;       SET THE DOWN POSITION STATE
;-----------------------------------------------------------------------------
SET_DN_POS_STATE:
        di
        ld      STATE, #DN_POSITION             ; load new state
        clr     DisableRadioFlag                ; Re-enable radio
        jr      SET_ANY

;-----------------------------------------------------------------------------
;       SET THE UP DIRECTION STATE
;-----------------------------------------------------------------------------
SET_UP_DIR_STATE:
        di
        clr     ForcedDown                      ; clear the flag for
        ld      STATE, #UP_DIRECTION            ; skipping early limit
        tm      P2, #01h                        ; UP_LIMIT - have we reached the limit?
        jr      nz,SET_ANY                      ; if not set the state else fall throught and set  up pos state

;-----------------------------------------------------------------------------
;       SET THE UP POSITION STATE
;-----------------------------------------------------------------------------
SET_UP_POS_STATE:
        di
        cp      S1_DEB, #CONST_PRESS            ; and the reversal was
        jr      ult,NoSafetyDelayArev           ; due to AOBS,start
        cp      FLASH_FLAG, #0FFh               ; the safety delay timer
        jr      nz,NoSafetyDelayArev

UseSafetyDelayArev:
        clr     SafetyDelay

NoSafetyDelayArev:
        clr     SAFEREVFLAG
        clr     DisableRadioFlag                ; Re-enable radio
        ld      STATE, #UP_POSITION

;-----------------------------------------------------------------------------
;       SET ANY STATE
;-----------------------------------------------------------------------------
SET_ANY:
        ld      BSTATE,STATE                    ; set the backup state
        di
        clr     RPM_COUNT                       ; clear the rpm counter
        clr     BRPM_COUNT
        ld      AUTO_DELAY, #AUTO_TIME          ; set .5 second auto rev timer
        ld      BAUTO_DELAY, #AUTO_TIME         ; set .5 second auto rev timer
        ld      FORCE_IGNORE, #FDelay1          ; set force ignore tmr to 1sec
        ld      BFORCE_IGNORE, #FDelay2         ; set force ignore tmr to 1sec
        and     AOBSF, #11110111b               ; clear protector reverse flag
;                       └────────── protector reverse

        cp      RADIO_CMD, #0AAh                ; if cmd was from radio,
        jr      nz,LeaveCB2Timer                ; then
        clr     CB2_RADIO_TIMER                 ; reset comm. B2 radio timer

LeaveCB2Timer:
        ei
        clr     RADIO_CMD                       ; one shot
        clr     RPM_ACOUNT                      ; clear the rpm active counter
        ld      LIMIT, #LIMIT_COUNT
        ld      MOTOR_TIMER_HI, #MOTOR_HI
        ld      MOTOR_TIMER_LO, #MOTOR_LO
        ld      STACKREASON,REASON              ; save the temp reason
        ld      STACKFLAG, #0FFh                        ; set the flag
        or      ODIFLAG, #00001000b             ; Set the state changed flag

TURN_ON_LIGHT:
        ld      LIGHTS,P0                       ; read the light state
        and     LIGHTS, #WORKLIGHT
        jr      nz,lighton                      ; if light is on skip clearing
```

A46

S:\SHARED\CDO\Lgo_Rjo\RJO - Study\Code\Final0301.s
Printed at 09:38 on 10 Apr 2001

```
lightoff:
        clr     MOTDEL                          ; clear the motor delay
lighton:
        ld      TC, #0                          ; clear trip counter
        ret

;-------------------------------------------------------------------------------
;       THIS THE AUXILARY OBSTRUCTION INTERRUPT ROUTINE
;-------------------------------------------------------------------------------
AUX_OBS:
        ld      OBS_COUNT, #OBS_TIME            ; reset pulse counter (no obstruction)
        and     imr, #11110111b                 ; turn off the interrupt for up to 500uS
        ld      AOBSTEST, # AOBSTEST_TIME       ; reset the test timer
        or      AOBSF, #00000010b               ; set the flag for got a aobs
;                             └──────── any pulses

        and     AOBSF, #11011111b               ; Clear the bad aobs flag
;                             └──────── single break

        and     AOBSF, #11110111b               ; Clear protector reverse flag
;                             └──────── protector reverse

        iret                                    ; return from int

;-------------------------------------------------------------------------------
;       THIS IS THE MOTOR RPM INTERRUPT ROUTINE
;-------------------------------------------------------------------------------
RPM_int:
        push    rp                              ; save current pointer
        srp     #50h                            ; point to RPM_GROUP
;/\/\/\/\/\/\/\/\/\/\/\/\/\/\/\/\/\/\/\/\/\/\/\|
        tm      P3, #00000010b                  ; test for low on P3.1
        jp      nz,RPM_EXIT
;/\/\/\/\/\/\/\/\/\/\/\/\/\/\/\/\/\/\/\/\/\/\/\|
        ld      rpm_temp_hi,T0EXT               ; read the timer extension
        ld      rpm_temp_lo,T0                  ; read the timer
        rcf                                     ; Multiply lower byte by two
        rlc     rpm_temp_lo                     ; to correct for the prescaler
        tm      IRQ, #00010000b                 ; test for a pending interrupt
        jr      z,RPMTIMEOK                     ; if not then time ok
RPMTIMERROR:
        tm      rpm_temp_lo, #10000000b         ; test for timer reload
        jr      z,RPMTIMEOK                     ; if no reload time is ok
        dec     rpm_temp_hi                     ; if reloaded then dec the hi to resync
;Home3
RPMTIMEOK:
        and     imr, #11111011b                 ; turn off the interupt for up to 500uS
        ld      RPM_DIFF_LO,rpm_past_lo         ; Calculate the period
        ld      RPM_DIFF_HI,rpm_past_hi         ; of the RPM pulse
        sub     RPM_DIFF_LO,rpm_temp_lo
        sbc     RPM_DIFF_HI,rpm_temp_hi

        cp      RPM_DIFF_HI,#18h
        jp      ult,RPM_EXIT

        ld      rpm_period_hi,RPM_DIFF_HI       ; Store the difference as the
        ld      rpm_period_lo,RPM_DI F_LO       ; period of the RPM pulse
        ld      rpm_past_lo,rpm_temp_lo         ; Store the current time
        ld      rpm_past_hi,rpm_temp_hi         ; for measuring the next pulse

        ei                                      ; Flush any pending interrupts
        di

; Update all MIN and MAX values
;-------------------------------------------------------------------------------
        srp     #REL_FORCE_GRP
        cp      RPM_PERIOD_HI,PRES_RPM_MAX_HI   ; Test for new max
        jr      ult,NotNewRPMMax                ;
        jr      ugt,NewRPMMax
        cp      RPM_PERIOD_LO,PRES_RPM_MAX_LO
        jr      ule,NotNewRPMMax

NewRPMMax:
        ld      pres_rpm_max_hi,RPM_PERIOD_HI   ; Store the new max value
        ld      pres_rpm_max_lo,RPM_PERIOD_LO

NotNewRPMMax:
        cp      RPM_PERIOD_HI,PRES_RPM_MIN_HI   ; Test for new min
        jr      ugt,NotNewRPMMin
```

```
        jr      ult,NewRPMMin
        cp      RPM_PERIOD_LO,PRES_RPM_MIN_LO
        jr      uge,NotNewRPMMin

NewRPMMin:
        ld      pres_rpm_min_hi,RPM_PERIOD_HI   ; Store the new min value
        ld      pres_rpm_min_lo,RPM_PERIOD_LO

NotNewRPMMin:
        inc     PULSECOUNTER                    ; Update the count and
        cp      PULSECOUNTER, #RPMSAMPLEWINDOW  ; test for end of window
        jr      ult,MaxAndMinDone

NextWindow:
        clr     PULSECOUNTER                    ; Reset pulse count and
        ld      past_rpm_med_hi,pres_rpm_max_hi ; calculate median &
        ld      past_rpm_med_lo,pres_rpm_max_lo ; diff values
        add     past_rpm_med_lo,pres_rpm_min_lo
        adc     past_rpm_med_hi,pres_rpm_min_hi
        rcf
        rrc     past_rpm_med_hi
        rrc     past_rpm_med_lo

        ld      past_rpm_dif_hi,pres_rpm_max_hi
        ld      past_rpm_dif_lo,pres_rpm_max_lo
        sub     past_rpm_dif_lo,pres_rpm_min_lo
        sbc     past_rpm_dif_hi,pres_rpm_min_hi
        clr     pres_rpm_max_hi                 ; Reset min and max
        ld      pres_rpm_min_hi, #0FFh          ; for proper sampling

MaxAndMinDone:
        srp     #RPM_GROUP                      ; Reset the RP
        cp      rpm_period_hi, #12              ; test for a period of at least 6.144mS
        jr      ult,SKIPC                       ; if the period is less then skip counting
        cp      STATE, #05h                     ; test for down limit state
        jr      z,CLRC                          ; if set clear the counter

TULS:
        cp      STATE, #02h                     ; test for the up limit state
        jr      nz,INCRPM                       ; if not,increment rpm state
        tm      P2, #01h                        ; UP_LIMIT - test for up limit still set
        jr      nz,INCRPM                       ; if not then set

CLRC:
        clr     RPM_COUNT                       ; clear the rpm counter
        clr     BRPM_COUNT
        ei
        jr      SKIPC

INCRPM:
        inc     RPM_COUNT                       ; increase the rpm count
        inc     BRPM_COUNT                      ; increase the rpm count

SKIPC:
        inc     RPM_ACOUNT                      ; increase the rpm count
        di
        ld      rpm_time_out, #8                ; MAX_RPM_PER - 32 ms maximum RPM period (4 ms timebase)
        ld      BRPM_TIME_OUT, #8               ; MAX_RPM_PER - 32 ms maximum RPM period (4 ms timebase)
        ei

RPM_EXIT:
        pop     rp                              ; return the rp
RSS_EXIT:
        iret                                    ; return

;--------------------------------------------------------------------------
;       THIS IS THE SWITCH TEST SUBROUTINE
;
;       STATUS
;       0 => S1 TEST
;       1 => S3 TEST
;       2 => S2 TEST
;       3 => CHARGE
;       4 => RSSTATUS -- In RS232 mode,don't scan for switches
;       5 => WALLOFF  -- Turn off the wall control LED
;
;       SWITCH DATA
;                Res B2 Mode    Comm B2 Mode    D1 Mode     Constant Name
;                -----------    ------------    -------     -------------
;       0 =>     (OPEN)         (OPEN)          (OPEN)       (None)
;       1 =>     COMMAND        STOP            (STOP)       S1
;       2 =>     LIGHT          CLOSE           CLOSE        S2
;       4 =>     Proximity      OPEN            OPEN         S3
```

A 48

```
;--------------------------------------------------------------------------
switches:
        ei
        cp      STATUS, #WALLOFF            ; test for illegal number
        jp      ugt,start                   ; if so reset
        jp      z,NoWallCtrl                ; if it is 3 then goto charge

        cp      STATUS, #3                  ; Test for the charge state
        jp      z,charge                    ; if so,jump

        cp      STATUS, #02                 ; test for S2
        jp      z,LookForS2                 ; if so then jump

        cp      STATUS, #01                 ; test for S3
        jp      z,LookForS3                 ; if so then jump

        jp      TESTFORS1                   ; else it is S1

NoWallCtrl:
        and     P3, #~00100000b             ; P3.5 - Turn off Q4 pull up
;                 └──────────── (0)

        or      P3, #10000000b              ; DIS_SW P3.7 - Turn on Q6 discharge
;                 └──────────── (1)

        inc     MODEFLASH                   ; Update the off time
        cp      MODEFLASH, #50              ; if off time hasn't expired,
        jr      ult,KeepOff                 ; keep the LED off
        ld      STATUS, #CHARGE             ; Reset the wall control
        ld      SWITCH_DELAY, #S1_DEL_EX    ; Reset the charge timer
KeepOff:
        ret

TESTFORS1:
        tm      P3, #00001000b              ; SWITCHES - (P3.3) pressed (low)?
        jp      nz,S1NotPressed             ; not pressed
        tm      P0, #10000000b              ; SecondCMD - test second S1 (P0.7) input
        jp      nz,S1NotPressed

; S1 is closed!
; Due to priority,states of S2 and S3 are unknown
        cp      S1_DEB, #0FFh               ; test for the max number
        jr      z,SKIPS1INC                 ; if at the max skip inc
        di
        inc     S1_DEB                      ; increase the debouncer
        inc     BS1_DEB                     ; increase the backup debouncer
        ei

SKIPS1INC:
        cp      S1_DEB, #8                  ; S1_MAKE, cycle count *10mS
        jr      nz,S1EXIT                   ; if not made then exit
        cp      LEARNDB, #080h              ; if learn button not held,
        jr      ult,NormalS1Cmd             ; use normal S1 functinality

; S1 pressed while learn button held sets residential B2 mode
; Stop the learn switch from entering learn mode

        or      ledport, #ledh              ; turn off the led
        ld      LEARNT, #0FFH               ; set the learn timer
        clr     CodeFlag                    ; Clear ANY code types
        ld      MODECHANGEFLAG, #0FFh       ; Flag new mode for EEPROM
        ld      FLASH_COUNTER, #06          ; Blink the worklight three times.
        ld      FLASH_DELAY, #FLASH_TIME    ;
        ld      FLASH_FLAG, #0FFh           ; set the light Flash flag
        ld      MODESETFLAG, #0FFh          ; set the Mode Set Flag
        ld      FAULTTIME, #0F6h            ; Blink Learn LED three times after a delay
        ret

NormalS1Cmd:
        tm      AOBSF, #00001000b           ; then start the safety
;                          └────────── protector reverse

        jr      z,NoSafetyDelayB2           ; delay timer
        clr     SafetyDelay                 ; start the timer Safety Delay for B2

NoSafetyDelayB2:
        di
        ld      LAST_CMD, #055h             ; set last cmd as S1
        ld      SW_DATA, #S1                ; set switch data as S1
        ld      S1_DEB, #0FFh               ; set debouncer to FFh one shot
        ld      BS1_DEB, #0FFh              ; set debouncer to FFh one shot
        ei
```

A49

```
S1EXIT:
        or      P3, #00100000b              ; turn on the charge system P3.5
;                    └──────────── (1)

        and     P3, #01111111b              ; CDIS SW
;                   └──────────── (0)

        cp      ODIFLAG, #00                ; Test for a need to be polled
        jr      z,NormTime                  ; if not,use 12 ms charge cycle

LongTime:
        ld      SWITCH_DELAY, #S1_DEL_POLL   ; Set the delay time to 12 ms
        jr      GotTime

NormTime:
        ld      SWITCH_DELAY, #S1_DEL_EX    ; set the delay time to 14mS

GotTime:
        ld      STATUS, #CHARGE             ; charge time
        ret                                 ; return from switches
;---------------------------------------------------------------------------
S1NotPressed:                               ; S1 open
        and     P3, #~00100000b             ; turn off charging sw
;                      └──────────── (0)

        or      P3, #10000000b              ; DIS_SW enable discharge
        ld      DELAYC, #16                 ; set the time delay

DELLOOP:
        dec     DELAYC
        jr      nz,DELLOOP                  ; loop till delay is up
        tm      P3, #SWITCHES               ; switch line still high
        jr      nz,TESTWL                   ; if so return later
        call    DECS2                       ; if not open line dec
        call    DECS3                       ; all debouncers
        call    DECS1
        jp      S1EXIT                      ; and exit

TESTWL:
        ld      STATUS, #S3_TEST            ; set to test for prox/close
        ret                                 ; return from switches
;---------------------------------------------------------------------------
LookForS3:
        tm      P3, #SWITCHES               ; switch line still high
        jr      nz,TESTFORS2                ; exit setting
        call    DECS2                       ; decrease the mode debouncer
        call    DECS1                       ; and the S1 debouncer
        cp      S3_DEB, #0FFH               ; test for the max
        jr      z,SKIPS3INC                 ; if at the max skip inc
        inc     S3_DEB                      ; inc debouncer

SKIPS3INC:
        cp      S3_DEB, #S3_MAKE            ; test for the make
        jp      nz,S1EXIT                   ; if not then recharge delay

; S3 was detected?
        ld      S3_DEB, #0FFh               ; set the debouncer to max
        cp      STATE, #DN_DIRECTION        ; test if we're traveling down,
        jr      nz,NormS3                   ; if no then concider this a normal S3
        ld      CableDelay, #0FFh           ; disable Cable-delay

NormS3:
        ld      SW_DATA, #S3                ; set the data as prox/close
        jp      S1EXIT                      ; then recharge
;---------------------------------------------------------------------------
TESTFORS2:
        ld      STATUS, #S2_TEST            ; set next test as mode sw
        ld      switch_delay, #S2_DEL       ; set the delay
        ret

LookForS2:
        djnz    switch_delay,S2DELEXIT
        tm      P3, #SWITCHES               ; switch line still high
        jr      nz,EXIT_ERROR               ; exit with a error setting open state
        call    DECS1                       ; decrease S1 debouncer
        cp      S2_DEB, #0FFh               ; test for the max
        jr      z,S2INCSKIP                 ; skip the incrementing
        inc     S2_DEB                      ; inc S2 debouncer

S2INCSKIP:
        cp      S2_DEB, #S2_MAKE            ; test for S2 make point
        jr      nz,S2_EXIT                  ; exit if not made
```

A50

```
GOT_A_S2:
        ld      S2_DEB, #0FFh                   ; set S2 debouncer to max
        ld      SW_DATA, #S2
        ret

S2_EXIT:
        ld      SWITCH_DELAY, #S2_DEL_EX        ; set the delay
        ld      STATUS, #CHARGE                 ; set the next test as charge

S2DELEXIT:
        ret
;---------------------------------------------------------------------------
EXIT_ERROR:

        call    DECS1                           ; decrement the debouncers
        call    DECS2                           ;
        call    DECS3                           ;
        ld      SWITCH_DELAY, #S2_DEL_EX        ; set the delay
        ld      STATUS, #CHARGE                 ; set the next test as charge
        ret
;---------------------------------------------------------------------------
charge:
        or      P3, #00100000b
;                    └────────── (1)

        and     P3, #01111111b                  ; CDIS_SW
        dec     SWITCH_DELAY
        jr      nz,charge_ret
        ld      STATUS, #S1_TEST

charge_ret:
        ret
;---------------------------------------------------------------------------
DECS1:
        cp      S1_DEB, #00h                    ; test for the min number
        jr      z,SKIPS1DEC                     ; if at the min skip dec
        di
        dec     S1_DEB                          ; decrement debouncer
        dec     BS1_DEB                         ; decrement debouncer
        ei

SKIPS1DEC:
        cp      S1_DEB, #S1_BREAK               ; if not at break then exit
        jr      nz,DECS1EXIT                    ; if not break then exit
        di
        clr     S1_DEB                          ; reset the debouncer
        clr     BS1_DEB                         ; reset the debouncer
        ei
        clr     OVERRIDE                        ; Reset the override
        ld      SafetyDelay, #0FFh              ; Reset safety delay

DECS1EXIT:
        ret                                     ; and exit
;---------------------------------------------------------------------------
DECS3:
        cp      S3_DEB, #00h                    ; test for the min number
        jr      z,SKIPS3DEC                     ; if at the min skip dec
        dec     S3_DEB                          ; decrement debouncer

SKIPS3DEC:
        cp      S3_DEB, #S3_BREAK               ; if not at break then exit
        jr      nz,DECS3EXIT                    ; if not break then exit
        clr     S3_DEB                          ; reset the debouncer
        clr     OVERRIDE                        ; Reset the override
        ld      SafetyDelay, #0FFh              ; Reset safety delay

DECS3EXIT:
        ret                                     ; and exit
;---------------------------------------------------------------------------
DECS2:
        cp      S2_DEB, #00h                    ; test for the min number
        jr      z,SKIPS2DEC                     ; if at the min skip dec
        dec     S2_DEB                          ; decrement debouncer

SKIPS2DEC:
        cp      S2_DEB, #S2_BREAK               ; test for S2 break point
        jr      nz,DECS2EXIT                    ; exit if not

CLEARS2DEB:
        clr     S2_DEB                          ; reset the debouncer

DECS2EXIT:
        ret                                     ; and exit
```

A51

```
;---------------------------------------------------------------------------
; 66    FORCE TABLE
;---------------------------------------------------------------------------
force_table_A:
S_0:     .word   7000
S_1:     .word   7000
S_2:     .word   7050
S_3:     .word   7100
S_4:     .word   7150
S_5:     .word   7200
S_6:     .word   7250
S_7:     .word   7300
S_8:     .word   7350
S_9:     .word   7386
S_10:    .word   7422
S_11:    .word   7458
S_12:    .word   7478
S_13:    .word   7498
S_14:    .word   7518
S_15:    .word   7538
S_16:    .word   7558
S_17:    .word   7578
S_18:    .word   7598
S_19:    .word   7618
S_20:    .word   7638
S_21:    .word   7658
S_22:    .word   7678
S_23:    .word   7698
S_24:    .word   7718
S_25:    .word   7738
S_26:    .word   7758
S_27:    .word   7778
S_28:    .word   7798
S_29:    .word   7818
S_30:    .word   7838
S_31:    .word   7858
S_32:    .word   7878
S_33:    .word   7898
S_34:    .word   7948
S_35:    .word   7998
S_36:    .word   8048
S_37:    .word   8048    ; 8096
S_38:    .word   8048    ; 8148
S_39:    .word   8048    ; 8198
S_40:    .word   8048    ; 8248
S_41:    .word   8048    ; 8298
S_42:    .word   8048    ; 8348
S_43:    .word   8048    ; 8398
S_44:    .word   8048    ; 8498
S_45:    .word   8048    ; 8598
S_46:    .word   8048    ; 8698
S_47:    .word   8048    ; 8798
S_48:    .word   8048    ; 8898
S_49:    .word   8048    ; 8998
S_50:    .word   8048    ; 9098
S_51:    .word   8048    ; 9298
S_52:    .word   8048    ; 9398
S_53:    .word   8048    ; 9598
S_54:    .word   8048    ; 9798
S_55:    .word   8048    ; 10114
S_56:    .word   8048    ; 10744
S_57:    .word   8048    ; 11692
S_58:    .word   8048    ; 12954
S_59:    .word   8048    ; 14532
S_60:    .word   8048    ; 16424
S_61:    .word   8048    ; 18634
S_62:    .word   8048    ; 21160
S_63:    .word   8048    ; 24000
S_64:    .word   8048    ; 24000

;;;;;;;;;;;;;;;;; Replace and adjust before calculating Checksum
         DB [ 1152 ] 0FFh

         .end
```

A52

We claim:

1. A method for facilitating control of a movable barrier operator, comprising:

during movement of a movable barrier from a first position to a second position by the movable barrier operator:

repeatedly sensing present speed of the movable barrier over a first interval of time and determining, using in combination at least two sensed speed values, at least one representative value as corresponds to the speed of the movable barrier over the first interval of time;

in a subsequent interval of time, using the at least one representative value to determine a threshold value;

comparing a first value that corresponds to a present speed of the movable barrier with the threshold value; and when the first value is within a predetermined range of values with respect to the threshold value, taking at least one predetermined action with respect to subsequent movement of the movable barrier.

2. The method of claim 1 wherein repeatedly sensing present speed of the movable barrier over a first interval of time includes detecting each time the movable barrier moves a predetermined distance.

3. The method of claim 2 wherein repeatedly sensing present speed of the movable barrier over a first interval of time includes determining how much time is required to incrementally move the predetermined distance.

4. The method of claim 1 wherein the subsequent interval of time comprises an interval of time that is temporally adjacent the first interval of time.

5. The method of claim 1 wherein using the at least one representative value to determine a threshold value includes determining a median value that corresponds to a median value of sensed speeds of the movable barrier during the first time interval.

6. The method of claim 5 wherein determining a median value includes determining a highest sensed speed value and a lowest sensed speed value of the movable barrier during the first time interval.

7. The method of claim 6 wherein determining a median value includes summing the highest and lowest sense speed values and dividing that sum by 2.

8. The method of claim 6 and further comprising clearing the highest and lowest sensed speed values upon determining the median value.

9. The method of claim 6 wherein determining a median value includes determining a median value when ten present speeds have been sensed for the movable barrier.

10. The method of claim 1 wherein using the at least one representative value to determine a threshold value includes processing the at least one representative value with at least one other value to provide the threshold value.

11. The method of claim 10 wherein processing the at least one representative value with at least one other value includes dividing the at least one representative value by a fixed amount.

12. The method of claim 11 wherein dividing the at least one representative value by a fixed amount includes dividing the at least one representative value by 256.

13. The method of claim 10 wherein processing the at least one representative value with at least one other value includes multiplying the at least one representative value by a force adjustment value.

14. The method of claim 13 wherein includes multiplying the at least one representative value by a force adjustment value includes multiplying the at least one representative value by a force adjustment value as summed with a noise adjustment value.

15. The method of claim 10 wherein processing the at least one representative value with at least one other value includes dividing the at least one representative value by 256 to provide a quotient, and multiplying the quotient by a factor comprising a force setting and a noise adjustment as summed with one another.

16. The method of claim 1 wherein comparing a first value that corresponds to a present speed of the movable barrier with the threshold value includes providing a test value that corresponds to the first value less a second value that corresponds to the at least one representative value.

17. The method of claim 16 wherein providing a test value that corresponds to the first value less a second value that corresponds to the at least one representative value includes providing a test value that equates to an absolute value of the present speed of the movable barrier less the at least one representative value.

18. The method of claim 17 wherein the at least one representative value comprises a median value of speed for the movable barrier as sensed over the first time interval.

19. The method of claim 17 wherein comparing a first value that corresponds to a present speed of the movable barrier with the threshold value includes determining whether the test value exceeds the threshold value.

20. The method of claim 1 wherein taking at least one predetermined action with respect to subsequent movement of the movable barrier includes at least halting movement of the movable barrier with respect to a present direction of movement.

21. The method of claim 20 wherein at least halting movement of the movable barrier with respect to a present direction of movement includes reversing the direction of movement of the movable barrier.

22. The method of claim 1 wherein taking at least one predetermined action with respect to subsequent movement of the movable barrier includes maintaining a count of consecutive instances when the first value is within a predetermined range of values with respect to the threshold value.

23. The method of claim 22 and further comprising, when the first value is not within the predetermined range of values with respect to the threshold value, clearing the count of consecutive instances.

24. The method of claim 22 and further comprising at least halting movement of the movable barrier when the count of consecutive instances at least equals a predetermined threshold.

25. The method of claim 24 and further comprising reversing movement of the movable barrier when the count of consecutive instances at least equals the predetermined threshold.

26. A movable barrier operator comprising:

a motor control output;

a movable barrier speed sensor input;

a control platform configured and arranged to:

during movement of the movable barrier from a first position to a second position:

repeatedly sense present speed of the movable barrier via input from the movable barrier speed sensor input over a first interval of time and determine at least representative values as correspond to the speed of the movable barrier over the first interval of time;

in a subsequent interval of time, use the at least two representative values in combination to determine a threshold value;

compare a first value that corresponds to a present speed of the movable barrier with the threshold value;

when the first value is within a predetermined range of values with respect to the threshold value, take at least one predetermined action with respect to subsequent movement of the movable barrier.

27. A method for facilitating control of a movable barrier operator, comprising:

during movement of a movable barrier from a first position to a second position by the movable barrier operator:

repeatedly sensing a first parameter representing forces applied to the movable barrier over a first interval of time and determining at least two representative values as correspond to the sensed forces on the movable barrier over the first interval of time;

in a subsequent interval of time, using the at least two representative values in combination to determine a threshold value;

comparing a first value that represents forces presently applied to the barrier with the threshold value; and when the first value is within a predetermined range of values with respect to the threshold value, taking at least one predetermined action with respect to subsequent movement of the movable barrier.

28. The method of claim 27 wherein repeatedly sensing the first parameter value of the movable barrier over a first interval of time includes detecting each time the movable barrier moves a predetermined distance.

29. The method of claim 28 wherein repeatedly sensing the first predetermined value of the movable barrier over a first interval of time includes determining how much time is required to incrementally move the predetermined distance.

30. The method of claim 28 wherein the subsequent interval of time comprises an interval of time that is temporally adjacent the first interval of time.

31. The method of claim 28 wherein using the at least one representative value to determine a threshold value includes determining a median value that corresponds to a median value of forces applied to the movable barrier during the first time interval.

32. The method of claim 31 wherein determining a median value includes determining a highest force value and a lowest force value applied to the movable barrier during the first time interval.

33. The method of claim 32 wherein determining a median value includes summing the highest and lowest sensed force values and dividing that sum by 2.

34. The method of claim 32 and further comprising clearing the highest and lowest sensed force values upon determining the median value.

* * * * *